(12) United States Patent
Matsuda et al.

(10) Patent No.: US 9,111,106 B2
(45) Date of Patent: Aug. 18, 2015

(54) DATA PROCESSING APPARATUS AND DATA STORAGE APPARATUS

(75) Inventors: Nori Matsuda, Tokyo (JP); Takashi Ito, Tokyo (JP); Mitsuhiro Hattori, Tokyo (JP); Takumi Mori, Tokyo (JP); Takato Hirano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 122 days.

(21) Appl. No.: 13/979,508

(22) PCT Filed: Jan. 13, 2011

(86) PCT No.: PCT/JP2011/050393
§ 371 (c)(1),
(2), (4) Date: Jul. 12, 2013

(87) PCT Pub. No.: WO2012/095973
PCT Pub. Date: Jul. 19, 2012

(65) Prior Publication Data
US 2013/0287210 A1 Oct. 31, 2013

(51) Int. Cl.
*G06F 21/62* (2013.01)
(52) U.S. Cl.
CPC ............ *G06F 21/62* (2013.01); *G06F 21/6272* (2013.01)
(58) Field of Classification Search
None
See application file for complete search history.

(56) References Cited

U.S. PATENT DOCUMENTS

| | | | |
|---|---|---|---|
| 7,484,092 B2 * | 1/2009 | Rajasekaran et al. | 713/165 |
| 8,429,421 B2 * | 4/2013 | Chase et al. | 713/189 |
| 8,639,947 B2 * | 1/2014 | Elovici et al. | 713/193 |
| 2004/0049682 A1 | 3/2004 | Wilson et al. | |
| 2006/0031213 A1 | 2/2006 | Wilson et al. | |
| 2007/0094511 A1 | 4/2007 | Wilson et al. | |
| 2007/0255698 A1 * | 11/2007 | Kaminaga et al. | 707/3 |
| 2008/0170688 A1 * | 7/2008 | Jung et al. | 380/201 |
| 2009/0010436 A1 | 1/2009 | Fuhr et al. | |
| 2009/0300351 A1 * | 12/2009 | Lei et al. | 713/165 |
| 2010/0121856 A1 | 5/2010 | Lei et al. | |

(Continued)

FOREIGN PATENT DOCUMENTS

| | | |
|---|---|---|
| JP | 2002 278970 | 9/2002 |
| JP | 2005 134990 | 5/2005 |

(Continued)

OTHER PUBLICATIONS

Boneh, D., et al., "Public Key Encryption with Keyword Search", EUROCRYPT'2004, Lecture Notes in Science, vol. 3027, Total 17 Pages, (2004).

Bellare, M., et al., "Deterministic and Efficiently Searchable Encryption", CRYPTO'2007, Lecture Notes in Computer Science, vol. 4622, pp. 1-43, (2007).

(Continued)

*Primary Examiner* — Benjamin Lanier
(74) *Attorney, Agent, or Firm* — Oblon, McClelland, Maier & Neustadt, L.L.P.

(57) ABSTRACT

An access terminal apparatus provides a group determination key being a decryption key to a data center apparatus previously, and then transmits grouping information generated from a keyword of storage target data and having been encrypted to the data center apparatus, with encrypted data of the storage target data and tag data of the encrypted data of the storage target data. The data center apparatus stores the encrypted data relating it to the tag data, decrypts a part of the grouping information with the group determination key, derives an index value from a bit value obtained by the decryption, and stores the derived index value and the tag data relating them with each other.

14 Claims, 29 Drawing Sheets

(56) References Cited

U.S. PATENT DOCUMENTS

2012/0297201 A1  11/2012  Matsuda et al.
2012/0324240 A1  12/2012  Hattori et al.

FOREIGN PATENT DOCUMENTS

| JP | 2006 520493 | 9/2006 |
| JP | 2007 52698 | 3/2007 |
| JP | 2009 529714 | 8/2009 |
| JP | 2010 61103 | 3/2010 |
| JP | 2010 164835 | 7/2010 |
| JP | 2010 205258 | 9/2010 |
| JP | 2010 267227 | 11/2010 |

OTHER PUBLICATIONS

Katz, J., et al., "Predicate Encryption Supporting Disjunctions, Polynomial Equations, and Inner Products", EUROCYPT 2008, Lecture Notes in Computer Science, vol. 4965, pp. 1-29, (2008).

Hattori, M., et al., "Anonymous HIBE With Wildcards and Its Application to Secure Keyword Search for Group-Oriented Multi-User System", SCIS'2010, 3 A4-2, The Institute of Electronics, Information and Communication Engineers, pp. 1-6, (2010).

Okamoto, T., et al., "Hierarchical Predicate Encryption for Inner-Products", ASIACRYPT'2009, Lecture Notes in Computer Science, vol. 5912, Total 9 Pages, (2009).

International Search Report Issued Mar. 8, 2011 in PCT/JP11/050393 Filed Jan. 13, 2011.

\* cited by examiner

| USER ID INFORMATION DATABASE | | | | |
|---|---|---|---|---|
| GROUP ID | USER ID | DIVISION INFO. | POST INFO. | TENURE |
| A DEPARTMENT | TANAKA | HEAD OFFICE /ACCOUNTING DEPARTMENT | MANAGER | FROM APRIL 2005 |
| ⋮ | ⋮ | ⋮ | ⋮ | ⋮ |

Fig. 30

$$\vec{v}_T = (\overbrace{(v_1, v_2)}^{\text{GROUP NAME}}, \overbrace{(v_3, v_4)}^{\text{USER NAME}},$$

$$\underbrace{(v_5, v_6)}_{\text{FIRST INFO.}}, \underbrace{(v_7, v_8)}_{\text{SECOND INFO.}}, \ldots, \underbrace{(v_{4+(2L-1)}, v_{4+2L})}_{\text{L-TH INFO.}}, \underbrace{(v_{4+(2L+1)}, v_{4+(2L+2)})}_{\text{KEYWORD INFORMATION}})$$

GROUPING INFORMATION

KEYWORD

Fig. 31

$$\vec{x}_T = (\overbrace{(x_1, x_2)}^{\text{GROUP NAME}}, \overbrace{(x_3, x_4)}^{\text{USER NAME}},$$

$$\underbrace{(x_5, x_6)}_{\text{FIRST INFO.}}, \underbrace{(x_7, x_8)}_{\text{SECOND INFO.}}, \ldots, \underbrace{(x_{4+(2L-1)}, x_{4+2L})}_{\text{L-TH INFO.}}, \underbrace{(x_{4+(2L+1)}, x_{4+(2L+2)})}_{\text{KEYWORD INFORMATION}})$$

GROUPING INFORMATION

KEYWORD

Fig. 32

$$\vec{v}_D = (\overbrace{(v_1, v_2)}^{\text{GROUP NAME}}, \overbrace{(v_3, v_4)}^{\text{USER NAME}})$$

Fig.33

$$\vec{x}_D = (\overbrace{(x_1, x_2)}^{\text{GROUP NAME}}, \overbrace{(x_3, x_4)}^{\text{USER NAME}})$$

DATA PROCESSING APPARATUS AND DATA STORAGE APPARATUS

TECHNICAL FIELD

The present invention relates to a technology for secure searching.

BACKGROUND ART

The secure search is a technology that performs searching of encrypted data remaining encrypted.

In recent years, as to managing data on the Internet such as cloud services, there has been attention focused on the secure search as a security technology to protect secret information even from eavesdropping by a server administrator.

There are two types of the method for realizing the secure search: the method of using deterministic encryption and the method of using probabilistic encryption.

The deterministic encryption is an encryption scheme being characterized in that, when encrypting the same keyword, the same ciphertext is obtained even how many times the keyword is repeatedly encrypted.

Therefore, it has a feature in that searching can be performed speedily by using the high-speed method realized in the conventional database.

On the other hand, it has a disadvantage in that since frequency of appearance of encrypted data can be counted, for example, when a keyword is a family name, the content of the encrypted data will be able to be inferred based on information on population ratio regarding family names generally known, and the like (for example, Non-Patent Literature 2).

By contrast, the probabilistic encryption is an encryption scheme being characterized in that, even in the case of encrypting the same keyword, a different ciphertext is generated at every encryption.

Therefore, it has a feature of high security because whether keywords are the same or not is unknown even if encrypted data are simply compared with each other and thus, inferring the keyword by counting the frequency of appearance, which is a problem of the deterministic encryption, cannot be performed.

On the other hand, since even the identity of keywords is unknown, the high-speed method realized in the conventional database cannot be used, thereby having a disadvantage in that search is slow (for example, Non-Patent Literatures 1, 3, 4, and 5).

As a method of accelerating the secure search using the probabilistic encryption, there is proposed an idea of shortening the average response time by caching search results.

This is based on focusing an attention on a feature that a general search may be performed twice or more using the same keyword, and then, this aims to accelerate searching by, though the first search takes time, caching its result and merely returning the cached result at the second and subsequent search (for example, Patent Literature 1).

CITATION LIST

Patent Literature

Patent Literature 1: JP 2005-134990

Non-Patent Literature

Non-Patent Literature 1: D. Boneh, G. D. Crescenzo, R. Ostrovsky, G. Persiano G, "Public Key Encryption with Keyword Search", EUROCRYPT' 2004, Lecture Notes in Computer Science, Vol. 3027, 2004.

Non-Patent Literature 2: M. Bellare, A. Boldyreva, A. O'Neill, "Deterministic and Efficiently Searchable Encryption", CRYPTO' 2007, Lecture Notes in Computer Science, Vol. 4622, 2007.

Non-Patent Literature 3: J. Katz, A. Sahai, B. Waters, "Predicate Encryption Supporting Disjunctions, Polynomial Equations, and Inner Products", EUROCRYPT 2008, Lecture Notes in Computer Science, Vol. 4965, 2008.

Non-Patent Literature 4: Mitsuhiro Hattori, Takumi Mori, Takashi Ito, Nori Matsuda, Takeshi Yoneda, Kazuo Ohta, "Anonymous HIBE with Wildcards and Its Application to Secure Keyword Search for Group-Oriented Multi-User System", SCIS' 2010, 3A4-2, the Institute of Electronics, Information and Communication Engineers, 2010.

Non-Patent Literature 5: Tatsuaki Okamoto, Katsuyuki Takashima, "Hierarchical Predicate Encryption for Inner-Products", ASIACRYPT' 2009, Lecture Notes in Computer Science, Vol. 5912, 2009.

SUMMARY OF INVENTION

Technical Problem

The basic flow of the secure search is as follows:

First, the user (encrypter), who performs encryption of data, generates encrypted data by performing data encryption, and simultaneously, associates a keyword, which is used to search encrypted data, with the encrypted data.

Since the associated keyword is also, of course, information related to the data, it is also encrypted so as to generate an encrypted tag. Then, the encrypted data and the encrypted tag are stored in a data center apparatus 401.

The number of encrypted tags does not need to be one, and so a plurality of tags can be associated.

In addition, keywords do not leak from encrypted tags.

The user (searcher), who performs searching, selects a keyword to be searched for, and generates a search query by using the keyword and the user's own secret key.

Since the search query is generated by randomizing the keyword by using the secret key, it is difficult to analogize the secret key from the search query itself.

Then, this search query is sent to the data center apparatus 401 to request searching.

The data center apparatus 401 stores encrypted data and encrypted tags which the user requested to be stored, while associating them with each other.

Receiving the search query from the searcher, the data center apparatus 401 searches for an encrypted tag including the same keyword as that used for generating the search query, from its own stored encrypted tags.

At this time, the data center apparatus 401 can determine whether the keyword of the encrypted tag and the keyword of the search query are identical with each other by performing a special calculation for the secure search, without extracting the keyword by decrypting the encrypted tag.

Then, encrypted data which is associated with the encrypted tag whose keyword has been determined to be the same as that of the search query is returned to the searcher.

As to the secure search, there are two types: one is the common key scheme in which the encrypter and the searcher need to be the same, and the other is the public key scheme in which anyone can be the encrypter but only limited specific users can be the searcher.

All of the conventional technologies described above are of the secure search scheme employing the public key scheme.

Non-Patent Literature 2 discloses a secure search scheme utilizing deterministic encryption.

As described above, this is characterized in that, when encrypting the same keyword, the same encrypted tag is obtained even how many times the encryption is repeated.

Since identity of keywords can be determined by comparing data bits of the encrypted tags, and size comparison can be made between encrypted tags, it is possible to generate binary-tree-structured index information that is realized for increasing speed in a conventional database. Furthermore, according to this scheme, a search query is generated by using a public key, and comparison between the encrypted tag and the search query can be performed by determining whether they are completely identical with each other as binary data. Thereby, it has a feature in that searching processing can be accelerated.

On the other hand, there is a risk that the data center apparatus 401, in which data is stored, can analogize a plain text by measuring frequency of appearance of an encrypted tag.

For example, consider the case of two kinds of messages, "Info" and "Error", being stored as a message type in a computer log file.

Here, assume that, as a result of statistics on encrypted tags, the frequency of appearance of the encrypted tag "AAAAA" is 99% and that of the encrypted tag "BBBBB" is 1%.

Generally, it can be thought that frequency of generation of "Error" is very low in a computer system that is operated correctly, and therefore, inferring that "AAAAA" indicates "Info" and "BBBBB" does "Error" can be performed.

Thus, when the appearance frequency of a stored message is known, the deterministic encryption has a risk in that the original data will be analogized even if the encryption itself is not broken.

Therefore, although the deterministic encryption has an advantage that searching can be performed at high speed, secure search on the basis of the probabilistic encryption is more recommended in many cases in the system where high confidentiality is required.

The scheme described in Non-Patent Literature 1 is a secure search scheme using ID based encryption (hereinafter, IBE: Identity-Based Encryption) which is one of the probabilistic encryption.

IBE is an encryption scheme capable of encrypting data by using an ID, such as an e-mail address and a name, as a public key.

Encrypted data can be decrypted only by a user who has a user secret key corresponding to the ID.

The user secret key is generated by a PKG (Private-Key Generator) with a master key, and is issued only to a legitimate user corresponding to the ID.

IBE having ID confidentiality where the ID used for encryption is not known from encrypted data is utilized in the secure search.

Furthermore, since IBE is the probabilistic encryption, it is also characterized in that even when the same message is encrypted by the same ID, a different ciphertext is always obtained, and therefore, even if a plurality of ciphertexts are juxtaposed, it is impossible to discern whether they have been encrypted from the same message.

First, after generating a random number, the encrypter encrypts the random number by utilizing the ID based encryption using the ID as a keyword so as to obtain an encrypted random number.

The pair of the random number and the encrypted random number is stored as an encrypted tag, with the encrypted data, in the data center apparatus.

Next, the searcher generates a user secret key based on his own master key by using the ID as a search keyword.

This user secret key, being a secret key with which the data encrypted using the keyword can be decrypted, is sent as a search query to the data center in order to request searching.

The data center extracts the encrypted random number from the stored encrypted tag, decrypts the extracted encrypted random number by using the search query (user secret key), and checks whether the random number included in the encrypted tag has been correctly decrypted.

If the keyword (ID) used when generating the encrypted random number and the keyword (ID) used when generating the search query (user secret key) are identical with each other, since the encrypted random number can be correctly decrypted, it turns out that the encrypted tag and the search query have been generated from the same keyword.

Thus, in the secure search scheme based on the probabilistic encryption, by comparing one encrypted tag and one search query, it is found that both include the same keyword.

However, as the secure search scheme is based on the probabilistic encryption, even if the encrypted tags are compared with each other, it cannot be determined whether they have been generated from the same keyword.

Therefore, the binary-tree-structured index information that is realized for increasing speed in the conventional database cannot be generated, and thus consequently all the stored encrypted tags respectively need to be compared with a search query, which causes a problem that the searching speed becomes very slow.

In contrast to the scheme described in Non-Patent Literature 1, Non-Patent Literatures 3 and 5 disclose schemes capable of using conditions such as "AND" or "OR" that enable more flexible searching.

However, similarly to Non-Patent Literature 1, all the stored encrypted tags respectively need to be compared with a search query, which causes a problem that the searching speed becomes very slow.

In contrast to the scheme described in Non-Patent Literature 1, Non-Patent Literature 4 discloses a scheme capable of sharing encrypted data in a group by extending the number of users who are able to search and decrypt to a plurality of users.

However, similarly to Non-Patent Literature 1, all the stored encrypted tags respectively need to be compared with a search query, which causes a problem that the searching speed becomes very slow.

In order to solve the problem described above, Patent Literature 1 proposes a scheme of storing a search result by the user, in a cache, and when the same keyword is searched for in the next and subsequent time, returning the search result at high speed.

This scheme is effective in the case of performing searching repeatedly by using the same keyword.

However, according to the method of Patent Literature 1, a search result can be returned to the searcher at high speed with respect to a keyword which has been searched for once, but however, it is necessary for a keyword which has not been searched for even once to search all the tags stored in the data center, as the problem described as to Non-Patent Literature 1.

Therefore, there is a problem in that when a search keyword is the one specified for the first time, it needs enormous time to obtain a search result in the database that stores a vast number of tags.

The present invention primarily aims to solve the problems as described above. It is an object of the present invention to realize a configuration, in the secure search using probabilistic encryption, that can perform searching processing of encrypted data speedily and safely even if the keyword has not been searched for even once.

Solution to Problem

According to one aspect of the present invention, a data processing apparatus connected to a data storage apparatus that stores a plurality of encrypted data and tag data being related to each of the plurality of encrypted data and being collated when the plurality of encrypted data are searched, the data processing apparatus includes a keyword specification unit that specifies a keyword of storage target data being a target to be stored in the data storage apparatus, as a storage keyword; an allowed bit position specification unit that specifies a bit position where disclosure of a bit value to the data storage apparatus is allowed, as an allowed bit position; an index derive bit sequence generation unit that generates a bit sequence from the storage keyword by performing a generation procedure, as a storage index derive bit sequence; and a concealing processing unit that performs concealing processing to disclose the bit value at the allowed bit position in the storage index derive bit sequence to the data storage apparatus, and to conceal bit values at other than the allowed bit position in the storage index derive bit sequence from the data storage apparatus, and that causes the data storage apparatus to derive a storage index value, which is to be attached to the tag data by the data storage apparatus when the tag data to be related to encrypted data of the storage target data is stored, from the bit value disclosed at the allowed bit position in the storage index derive bit sequence.

Advantageous Effects of Invention

According to one aspect of the present invention, it is possible to disclose a bit value at an allowed bit position in a storage index derive bit sequence generated from a storage keyword to a data storage apparatus, and to cause the data storage apparatus to derive a storage index value, which is to be added to tag data when storing the tag data, from a disclosed bit value.

Thereby, the data storage apparatus can store tag data to which a storage index value is attached. Therefore, even if a keyword has not been searched for even once, it is possible to perform searching of encrypted data speedily by using the storage index value.

Furthermore, since bit values at other than the allowed bit position are kept secret, it is possible, with respect to a storage keyword, to limit the amount of information leakage to the data storage apparatus.

BRIEF DESCRIPTION OF DRAWINGS

FIG. 30 shows an example of generation of a tag ID predicate vector according to the second embodiment;
FIG. 31 shows an example of generation of a tag ID attribute vector according to the second embodiment;
FIG. 32 shows an example of generation of a decrypter ID predicate vector according to the second embodiment;
FIG. 33 shows an example of generation of a decrypter ID attribute vector according to the second embodiment.

DESCRIPTION OF EMBODIMENTS

Embodiment 1

In first and second embodiments, there will be described a structure which enables a data center apparatus to generate an index by additionally attaching partial information on a keyword to an encrypted tag, in a secure search scheme using probabilistic encryption.

Furthermore, in the first and second embodiments, there will be described a structure where the secure search using probabilistic encryption can be safely performed at high speed, which is given by a scheme of additionally disclosing partial information on a keyword when the search processing becomes slow because the number of registered encrypted data increases.

Figure 1:
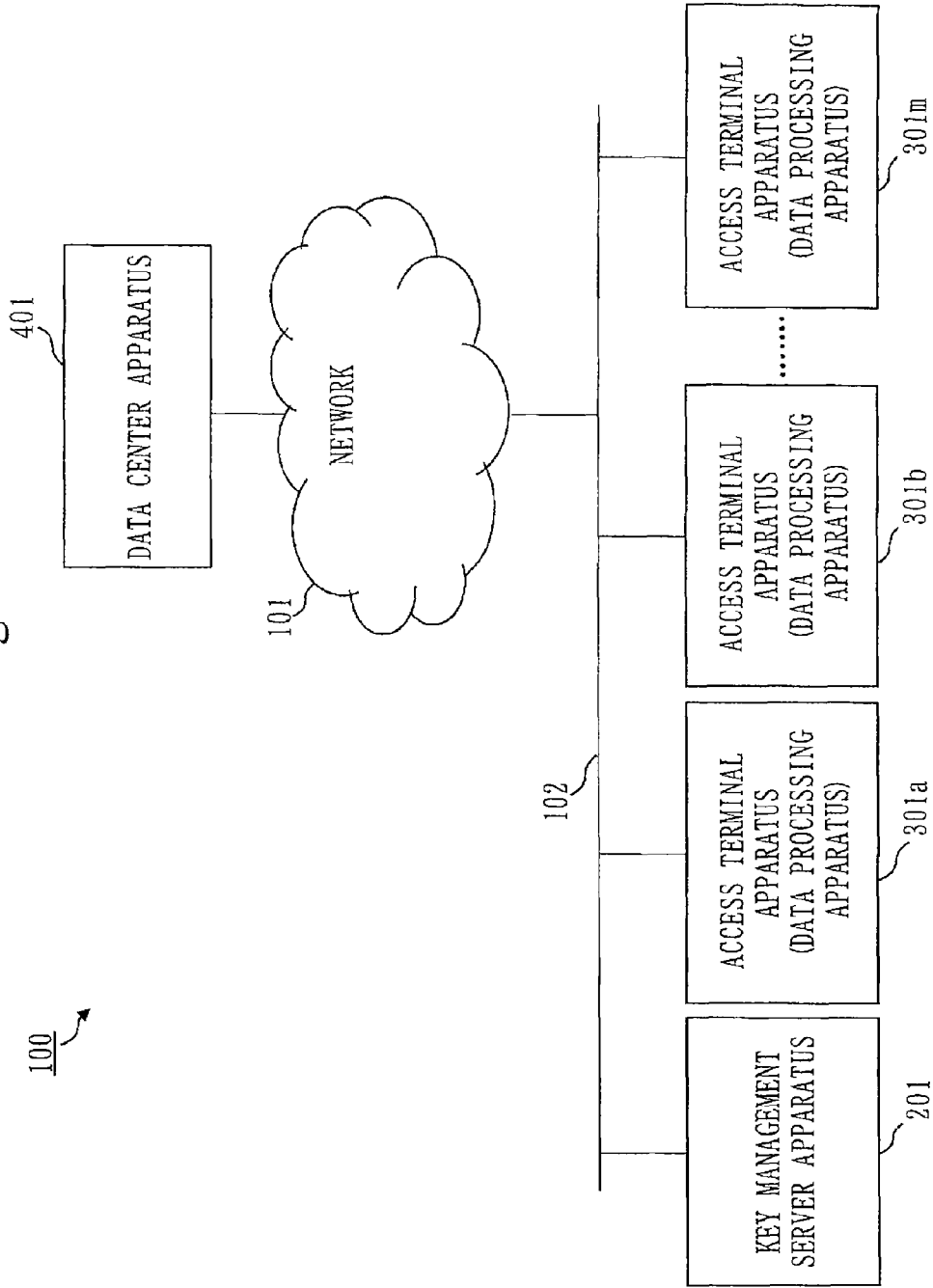
FIG. 1 shows a configuration example of a secure search system according to a first embodiment.

FIG. 1 shows a configuration example of a secure search system 100.

The secure search system 100 includes a key management server apparatus 201, access terminal apparatuses 301 (301a to 301m), and a data center apparatus 401.

The key management server apparatus 201 and the access terminal apparatuses 301 are connected to an in-house LAN (Local Area Network) 102.

The in-house LAN 102 is connected to the data center apparatus 401 through a network 101.

The access terminal apparatus 301 is an example of a data processing apparatus, and the data center apparatus 401 is an example of a data storage apparatus.

The access terminal apparatus 301 may be briefly expressed as an access terminal, and the data center apparatus 401 may also be as a data center.

The key management server apparatus 201 generates a public parameter to be used in common by all the users (the users of the access terminal apparatuses 301) for performing processing of encryption and so on, and a master key to be used for issuing a user secret key to the user.

Furthermore, the key management server apparatus 201 manages each user's ID (Identification), and issues a user secret key to the user based on the ID.

The access terminal apparatus 301 is, for example, a PC (Personal Computer) utilized by a user in an enterprise.

The access terminal apparatus 301 generates storage target data to be stored in the data center apparatus 401, encrypts the generated storage target data, and stores the encrypted data in the data center apparatus 401. Also, the access terminal apparatus 301 searches encrypted data accumulated in the data center apparatus 401, decrypts encrypted data extracted from the data center apparatus 401 and edits decrypted data.

The data center apparatus 401 is a server apparatus having a large-capacity storage device that stores encrypted data generated in the enterprise.

Since the data is stored in an encrypted state, the content of it cannot be read in the data center apparatus 401.

The network 101 is a communication channel that connects the in-house LAN 102 and the data center apparatus 401.

For example, the Internet etc. is a typical example of the network 101.

The in-house LAN 102 is a communication channel installed in the enterprise. Various servers and personal computers used in the enterprise are connected to the in-house LAN 102.

In addition, if the enterprise owns offices in a plurality of buildings, the communication channel has a complicated configuration through routers, dedicated lines, etc.

Now, before explaining the internal structure of each apparatus in detail, the outline of the secure search system 100 according to the present Embodiment will be described.

The access terminal apparatus 301 generates tag data (hereafter, may also just be called a tag) by encrypting a random number by using a keyword (an example of a storage keyword) of storage target data, as an encryption key.

Tag data is data to be collated in searching encrypted data.

Furthermore, the access terminal apparatus 301 specifies a bit position where disclosure of the bit value to the data center apparatus 401 is allowed, as an allowed bit position.

The access terminal apparatus 301 generates a predetermined bit sequence (an example of a storage index derive bit sequence) by performing a predetermined calculation for the keyword of the storage target data.

The access terminal apparatus 301 performs concealing processing that discloses the bit value at the allowed bit position in the bit sequence to the data center apparatus 401 and conceals bit values at other than the allowed bit position in the bit sequence from the data center apparatus 401.

The access terminal apparatus 301 causes the data center apparatus 401 to derive an index value (an example of a storage index value) from the disclosed bit value at the allowed bit position in the bit sequence. The index value is to be attached to tag data by the data center apparatus 401 when the data center apparatus 401 stores the tag data to be corresponding to encrypted data of the storage target data.

This index value is used, in the data center apparatus 401, for specifying the tag data to be collated with a trap door (encrypted search keyword) included, in the search request when a search request is sent from one of the access terminal units 301.

Specifically, the concealing processing for the bit sequence is achieved by providing a decryption key from the access terminal apparatus 301 to the data center apparatus 401 and encrypting the bit sequence.

The access terminal apparatus 301 generates, for each allowed bit position, a group determination key (an example of an allowed bit decryption key) which is a decryption key used for decrypting the encrypted bit at the allowed bit position, and transmits the group determination key to the data center apparatus 401.

According to the present Embodiment, since the allowed bit position is specified per bit, when, for example, the access terminal apparatus 301 discloses bit values of three high order bits to the data center apparatus 401, three group determination keys each being corresponding to each bit are transmitted to the data center apparatus 401 in order.

Furthermore, the access terminal apparatus 301 encrypts a bit sequence generated from the keyword of storage target data.

More specifically, the access terminal apparatus 301 encrypts a bit sequence by an encryption scheme in which the encrypted bit at the allowed bit position is decrypted with a group determination key and encrypted bits at other than the allowed bit position are not decrypted with the group determination key.

The encrypted bit sequence is referred to as grouping information.

The access terminal apparatus 301 transmits the encrypted data of the storage target data, tag data, and grouping information to the data center apparatus 401.

The data center apparatus 401 stores the encrypted data to be related with the tag data.

The data center apparatus 401 decrypts the encrypted bit at the allowed bit position in the grouping information with a group determination key, generates an index value from the bit value acquired by the decryption, and stores the tag data and the index value relating them with each other.

The "group" of the group determination key and the grouping information means a group of tag data.

For example, if the allowed bit position is three high order bits, and the index value acquired by decrypting the three high order bits of grouping information of a certain tag data is "011", the tag data is classified into a group to which other tag data whose acquired index value is "011" is classified.

When performing searching of encrypted data stored in the data center apparatus 401, the access terminal apparatus 301 generates a trap door by encrypting the keyword to be searched for (an example of a search keyword), and also generates a predetermined bit sequence (an example of a search index derive bit sequence) from the search keyword in the same generation procedure as that of the bit sequence in storing the encrypted data.

The access terminal apparatus 301 generates grouping information by encrypting a bit sequence by the encryption scheme in which the encrypted bit at the allowed bit position is decrypted with a group determination key and encrypted bits at other than the allowed bit position are not decrypted with the group determination key.

Then, the access terminal apparatus 301 transmits a search query (an example of a search request) including the trap door and grouping information to the data center apparatus 401.

In addition, the access terminal apparatus 301 that registers encrypted data with the data center apparatus 401 and the access terminal apparatus 301 that requests the data center apparatus 401 to perform searching of encrypted data do not need to be the same.

When receiving a search query from the access terminal apparatus 301, the data center apparatus 401 decrypts the encrypted bit at the allowed bit position in grouping information included in the search query, with the group determination key so as to derive an index value (an example of a search index value).

Next, the data center apparatus 401 selects tag data to which the same index value as the derived index value has been given, as an object to be collated with the trap door.

For example, when an index value of "011" has been obtained by decrypting grouping information with a group determination key, the stored tag data with the index value "011" is selected.

Based on the result of collating the trap door with the tag data, the data center apparatus 401 specifies tag data which has been generated by using the same keyword as the one used for generating the trap door, extracts encrypted data corresponding to the specified tag data, and transmits the extracted encrypted data to the access terminal apparatus 301 which is the transmission source of the search request.

The outline of operations in the secure search system 100 according to the present Embodiment has been described above. Hereafter, there will be explained internal structure of the key management server apparatus 201, the access terminal apparatus 301, and the data center apparatus 401, and detailed operation of each apparatus.

Figure 2:
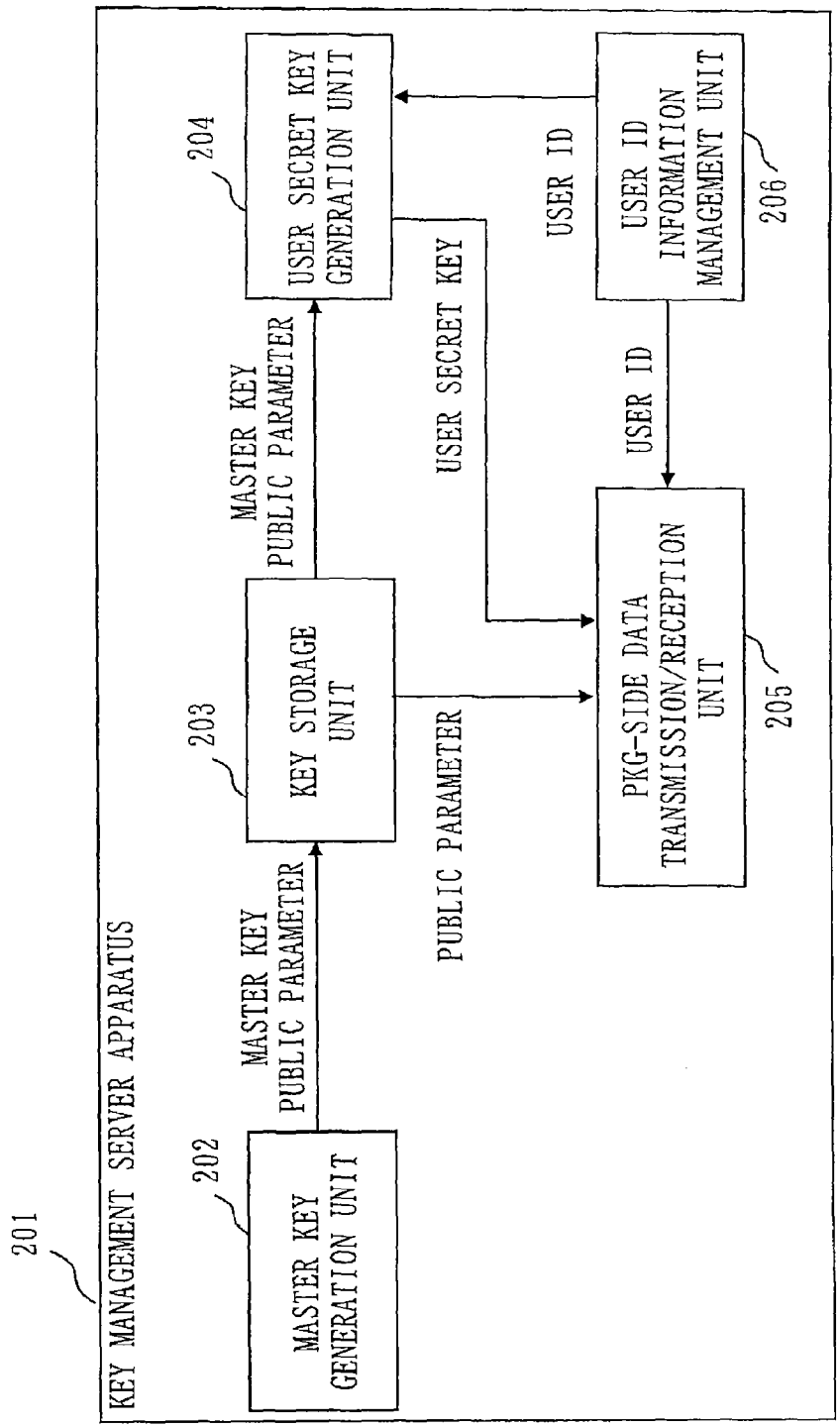
FIG. 2 shows a configuration example of a key management server apparatus according to the first embodiment.

FIG. 2 is a functional block diagram showing a configuration of the key management server apparatus 201.

The key management server apparatus 201 includes a master key generation unit 202, a key storage unit 203, a user secret key generation unit 204, a PKG-side data transmission/reception unit 205, and a user ID information management unit 206.

On the basis of the key length utilized in the system, the master key generation unit 202 generates a public parameter to be used in common by all the users who utilize the secure search, and a master key based on which a user secret key is to be generated.

The key storage unit 203 stores the master key and the public parameter generated by the master key generation unit 202, in the storage device.

The user secret key generation unit 204 generates a user secret key from the master key by using ID uniquely assigned to the user, and sends it to the user.

The PKG-side data transmission/reception unit 205 is a communication function for sending a public parameter to the access terminal apparatus 301 used by the user and the data center apparatus 401.

The PKG-side data transmission/reception unit 205 is used for transmitting a user secret key to the access terminal apparatus 301.

The PKG-side data transmission/reception unit 205 may transmit a user ID to the access terminal apparatus 301 at the user's request in order to disclose user ID information to the user in the enterprise.

The user ID information management unit 206 manages attribute information, such as a name, a division to which a user belongs, a login ID, and an e-mail address, as user ID, in the storage device.

The user ID information management unit 206 manages not only the attribute information at the current time but also the past attribute information, as a history.

Figure 3:
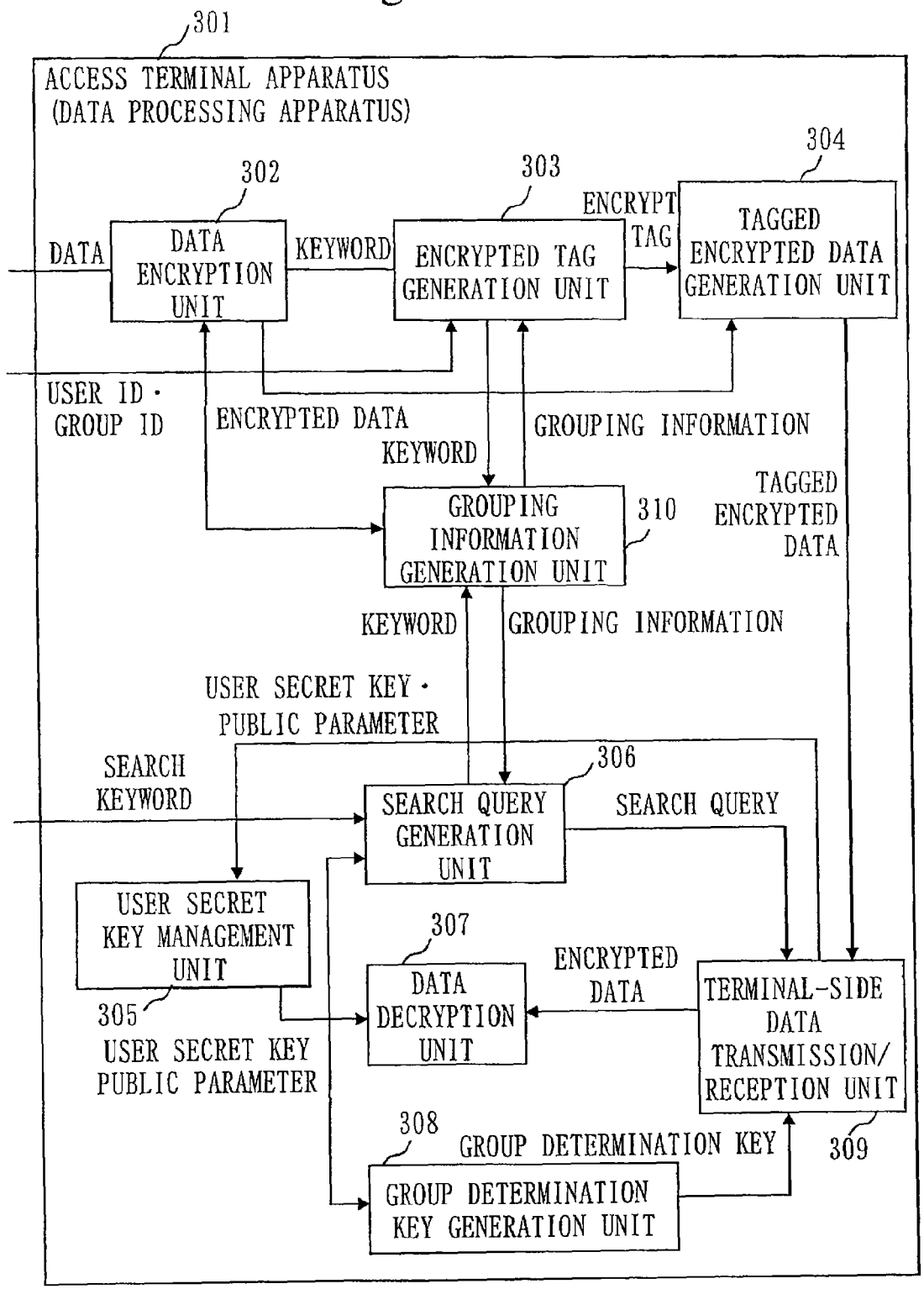
FIG. 3 shows a configuration example of an access terminal apparatus according to the first embodiment.

FIG. 3 is a functional block diagram showing a configuration of the access terminal apparatus 301.

The access terminal apparatus 301 includes a data encryption unit 302, an encrypted tag generation unit 303, a tagged encrypted data generation unit 304, a user secret key management unit 305, a search query generation unit 306, a data decryption unit 307, a group determination key generation unit 308, a terminal-side data transmission/reception unit 309, and a grouping information generation unit 310.

The data encryption unit 302 receives storage target data and user ID stored in the data center apparatus 401 from the user or application, and encrypts the storage target data by using ID based encryption so as to obtain encrypted data of the storage target data.

The data encryption unit 302 extracts a plurality of keywords (storage keyword) to be used for searching later from the storage target data, and receives a keyword to be associated with data from the user.

Thus, the data encryption unit 302 specifies the keyword (storage keyword) of the storage target data by extracting the keyword from the storage target data or receiving the keyword from the user, and therefore it is equivalent to an example of a keyword specification unit.

The encrypted tag generation unit 303 generates a plurality of tags (tag data) from a plurality of keywords associated with the storage target data by the data encryption unit 302, the user ID, and a random number generated by the encrypted tag generation unit 303.

Furthermore, the encrypted tag generation unit 303 generates a plurality of encrypted tags by combining the tags and grouping information generated by the grouping information generation unit 310 to be described later.

The tagged encrypted data generation unit 304 generates tagged encrypted data by combining the encrypted data generated by the data encryption unit 302 and a plurality of encrypted tags generated by the encrypted tag generation unit 303, and requests the data center apparatus 401 to store the tagged encrypted data.

The user secret key management unit 305 stores the user secret key which has been individually issued to the user and the public parameter, in the storage device.

The search query generation unit 306 generates a trap door by encrypting the keyword to be searched for, which is specified by the user, using the user secret key and the public parameter stored in the user secret key management unit 305, and, further, generates a search query by combining the trap door and grouping information generated by the grouping information generation unit 310, and sends the search query to the data center apparatus 401.

Thus, the search query generation unit 306, according to the direction of the user, specifies the keyword (search keyword) based on which the data center apparatus 401 performs searching of encrypted data, and therefore it is equivalent to an example of the keyword specification unit.

The data decryption unit 307 decrypts encrypted data received from the data center apparatus 401 by using the user secret key and the public parameter stored in the user secret key management unit 305.

The group determination key generation unit 308 generates a group determination key (an example of the allowed bit decryption key), which is used for generating an index value for accelerating searching, by using the user secret key and the public parameter stored in the user secret key management unit 305, and sends the group determination key to the data center apparatus 401 through the terminal-side data transmission/reception unit 309 to be described later.

More specifically, the group determination key generation unit 308 specifies an allowed bit position where disclosure of the bit value to the data center apparatus 401 is allowed in grouping information, and generates a group determination key that is a decryption key for decrypting the encrypted bit at the allowed bit position.

The generated group determination key is transmitted to the data center apparatus 401 by the terminal-side data transmission/reception unit 309 to be described later. Then, in the data center apparatus 401, the encrypted bit at the allowed bit position in the grouping information is decrypted with the group determination key.

Thus, the group determination key generation unit 308 specifies the allowed bit position, and therefore it is equivalent to an example of an allowed bit position specification unit.

Furthermore, the group determination key generation unit 308 discloses the bit value at the allowed bit position in the grouping information to the data center apparatus 401 by providing the group determination key to the data center apparatus 401, and causes the data center apparatus 401 to derive an index value (an example of the storage index value) which is to be attached to tag data by the data center apparatus 401 when storing the tag data to be related with encrypted data of the storage target data, from the disclosed bit value at the allowed bit position in the grouping information.

Thus, as well as the grouping information generation unit 310 to be described later, the group determination key generation unit 308 is equivalent to an example of a concealing processing unit.

In addition, as will be described later, since, in the data center apparatus 401, an allowed bit position is managed to be related with the hierarchical structure of a node, the allowed bit position will also be expressed hereinafter as a hierarchy.

For example, the n-th high order bit position is expressed as the n-th hierarchical layer.

The terminal-side data transmission/reception unit 309 receives the public parameter and the user secret key from the key management server apparatus 201.

The terminal-side data transmission/reception unit 309 transmits the group determination key.

The terminal-side data transmission/reception unit 309 transmits the generated tagged encrypted data (an example of a storage request) to the data center apparatus 401.

The terminal-side data transmission/reception unit 309 sends the search query (an example of a search request) to the data center apparatus 401, or receives encrypted data being a search result from the data center apparatus 401.

The terminal-side data transmission/reception unit 309 is an example of an allowed bit decryption key transmission unit, a storage request transmission unit, and a search request transmission unit.

The grouping information generation unit 310 generates grouping information to be used for generating an index value by the data center apparatus 401.

As described above, when a search request is sent from one of the access terminal units 301, this index value is used, in the data center apparatus 401, for specifying tag data to be collated with the trap door included in the search request.

The grouping information generation unit 310 generates a predetermined bit sequence (an example of the storage index derive bit sequence) by performing a predetermined calculation for the keyword of the storage target data.

Then, the grouping information generation unit 310 encrypts the bit sequence by an encryption scheme in which the encrypted bit at the allowed bit position is decrypted with a group determination key and encrypted bits at other than the allowed bit position are not decrypted with the group determination key.

The encrypted bit sequence serves as grouping information.

Thus, the grouping information generation unit 310 generates the bit sequence (an example of the storage index derive bit sequence) from the keyword of the storage target data and performs encryption processing to keep the bit sequence secret by encryption, thereby it is equivalent to an example of an index derive bit sequence generation unit, and further, as well as the group determination key generation unit 308 described above, it is equivalent to an example of the concealing processing unit.

The grouping information generation unit 310 generates grouping information not only when storing the storage target data but also when performing searching of encrypted data.

The grouping information generation procedure itself in searching encrypted data is the same as that in storing storage target data.

The only difference is that although grouping information in storing storage target data is generated from the keyword (storage keyword) of storage target data, grouping information in searching data is generated from the keyword (search keyword) for search directed by the user.

Figure 4:
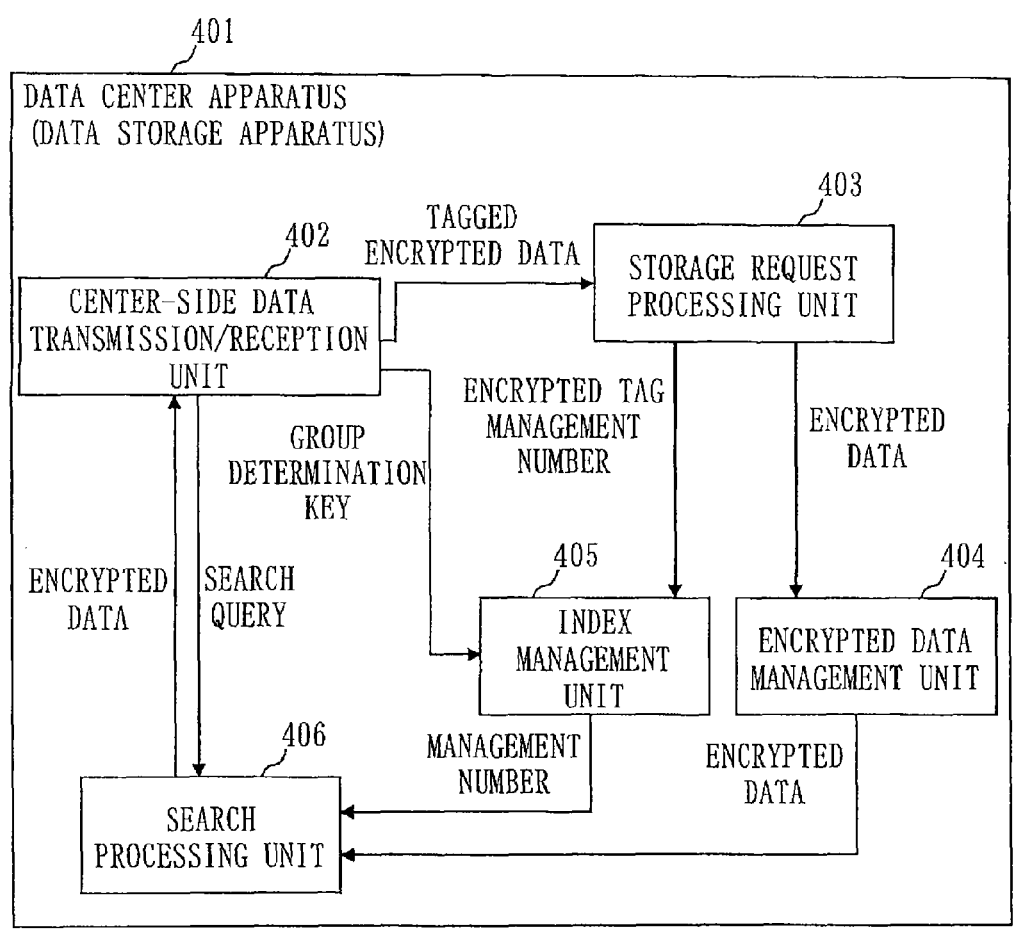
FIG. 4 shows a configuration example of a data center apparatus according to the first embodiment.

FIG. 4 is a functional block diagram showing a configuration of the data center apparatus 401.

The data center apparatus 401 includes a center-side data transmission/reception unit 402, a storage request processing unit 403, an encrypted data management unit 404, an index management unit 405, and a search processing unit 406.

The center-side data transmission/reception unit 402 receives a group determination key from the access terminal apparatus 301.

Furthermore, the center-side data transmission/reception unit 402 receives tagged encrypted data from the access terminal apparatus 301.

Furthermore, the center-side data transmission/reception unit 402 receives a search query from the access terminal apparatus 301, and transmits encrypted data as a response.

Furthermore, the center-side data transmission/reception unit 402 performs receiving a public parameter from the key management server apparatus 201.

The center-side data transmission/reception unit 402 is equivalent to an example of a storage request reception unit and a search request reception unit.

The storage request processing unit 403 performs storage processing of tagged encrypted data by analyzing received tagged encrypted data, decomposing the tagged encrypted data into encrypted data and a plurality of encrypted tags, providing the encrypted data to the encrypted data management unit 404 and providing the encrypted tags to the index management unit 405 while relating the encrypted tags with the encrypted data.

The encrypted data management unit 404 stores the encrypted data received from the access terminal apparatus 301, the public parameter, received from the key management server apparatus 201 or the like, in the storage device.

The encrypted data management unit 404 stores the encrypted data received from the access terminal apparatus 301, relating the encrypted data with the tag.

The index management unit 405 stores a group determination key received from the access terminal apparatus 301.

Therefore, the index management unit 405 is equivalent to an example of an allowed bit decryption key management unit.

The index management unit 405 generates an index value in a data structure suitable for searching for encrypted tag received from the access terminal apparatus 301, and stores the encrypted tag relating the encrypted tag to the index value.

More specifically, the index management unit 405 decrypts the encrypted bit at the allowed bit position in grouping information with the group determination key, derives an index value from the bit value obtained by the decryption, and stores the derived index value and the encrypted tag relating them with each other.

Furthermore, when receiving a search query from the access terminal apparatus 301, the index management unit 405 decrypts the encrypted bit at the allowed bit position in the grouping information included in the search query with a group determination key, derives an index value from the bit value obtained by the decryption, and extracts an encrypted tag related to the same index value as the derived index value.

When newly receiving a group determination key, the index management unit 405 reconfigures index information in which encrypted tag is stored.

The search processing unit 406 performs collation processing between a search query received from the access terminal apparatus 301 and a tag in the encrypted tag extracted from the index management unit 405.

The search processing unit 406 determines, by this collation processing, whether the keyword included in the tag and the keyword included in the search query are identical.

Then, the search processing unit 406 acquires encrypted data associated with a tag that was hit in search from the encrypted data management unit 404, and returns the encrypted data to the access terminal apparatus 301 through the center-side data transmission/reception unit 402.

Next, processing of system initial setting will be described based on FIG. 5.

The system initial setting is processing performed in the key management server apparatus 201 and executed once before utilizing the secure search system 100.

First, in Step S501, the master key generation unit 202 determines L (L is an arbitrary integer), being a maximum number of hierarchical-tree layers of an index value generated using grouping information.

If the total number of keywords associated with N pieces of data is M, it is possible to reduce the search time to be proportional to $M/2^L$ by using an index value, whereas a search time proportional to M is needed in the conventional system.

Then, the maximum number of hierarchical-tree layers L is determined considering the maximum number of data to be stored, the number of keywords to be associated with the data, the processing time of an existing secure search scheme, the processing time of an existing encryption scheme, and a response time required when performing searching.

The maximum number of hierarchical-tree layers L is equivalent to the maximum number of allowed bit positions.

Next, in Step S502, the master key generation unit 202 determines an existing secure search scheme of probabilistic encryption, an existing encryption scheme A for generating grouping information, and an existing encryption scheme B for encrypting a data body, to be used in the present secure search system 100.

In the present Embodiment, a group-oriented multi-user secure search system described in Non-Patent Literature 4 is used as the existing secure search system, and hierarchical ID-based encryption is used as the existing encryption scheme A for generating grouping information and as the existing encryption scheme B for encrypting a data body.

Then, a method of using the existing secure search scheme is determined.

As to the existing secure search scheme used in the present Embodiment, the master key generation unit 202 determines the number of tag ID hierarchical layers and the structure of tag ID hierarchy.

Figure 12:
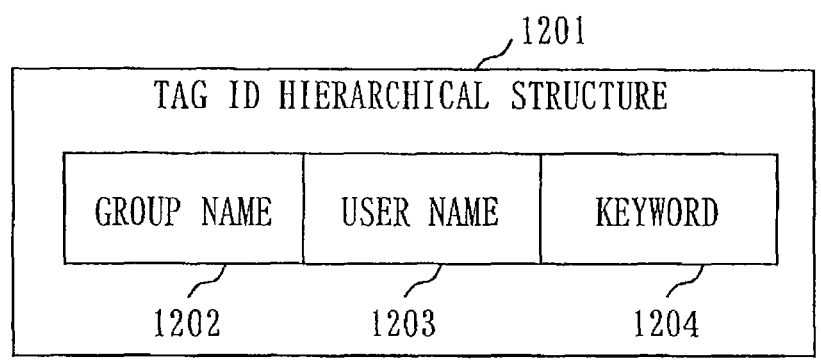
FIG. 12 shows an example of a tag ID hierarchical structure according to the first embodiment.

For example, as shown in the tag ID hierarchical structure of FIG. 12, the master key generation unit 202 determines that a tag ID has a structure of three hierarchical layers: a group name section to store the name of a group such as a department and a division to which a user who is able to search belongs, a user name section to store the name of a user, and a keyword section to set a keyword associated with data, and the like.

The master key generation unit 202 determines a method of using the existing encryption scheme A to generate grouping information.

In the existing encryption scheme A used in the present Embodiment, the master key generation unit 202 determines the number of grouping information ID hierarchical layers and the structure of grouping information ID hierarchy.

Figure 13:
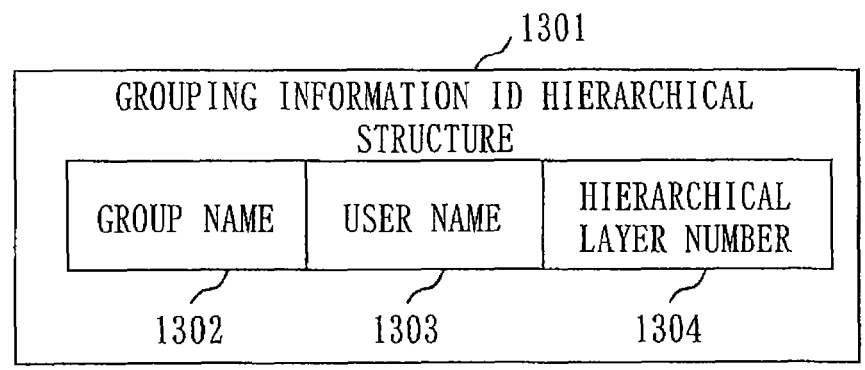
FIG. 13 shows an example of a grouping information ID hierarchical structure according to the first embodiment.

For example, it is determined to use the grouping information ID hierarchical structure as shown in FIG. 13.

In the grouping information ID hierarchical structure of FIG. 13, the group name section and the user name section are the same as those of the tag ID hierarchical structure of FIG. 12, but, as a different point, a hierarchical layer number is stored instead of a keyword.

By putting a hierarchical tree layer number of an index value (that is, an allowed bit position number) as the hierarchical layer number, a grouping information generation key corresponding to each layer of the tree hierarchy is generated.

As described later, the grouping information generation key is an encryption key used when generating grouping information in the access terminal apparatus 301.

Similarly, the master key generation unit 202 determines a method of using the existing encryption scheme B to encrypt a data body.

In the present Embodiment, the master key generation unit 202 determines a decrypter ID hierarchical layer number and the structure of decrypter ID hierarchy.

Figures 14, 15:
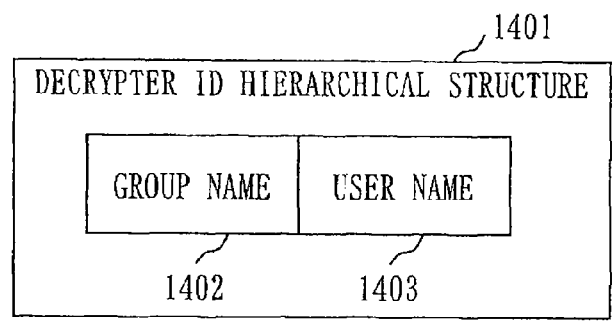
FIG. 14 shows an example of a decrypter ID hierarchical structure according to the first embodiment.
FIG. 15 shows an example of a user ID information database according to the first embodiment.

For example, the decrypter ID hierarchical structure is determined as shown in FIG. 14.

In the decrypter ID hierarchical structure of FIG. 14, the group name section and the user name section are the same as those of the tag ID hierarchical structure of FIG. 12.

In Step S503, the user ID information management unit 206 configures a user ID information database to store a user ID and attribute information.

In the user ID information database, there are stored information necessary to generate a user secret key and information necessary for the access terminal apparatus 301 to specify a group name/user name of a counterpart when the access terminal apparatus 301 encrypts data.

For example, as shown in FIG. 15, a department name being a group ID, a name being a user ID, information on a division to which a user belongs, information on a post, tenure of division/post, and the like are stored in the user ID information database.

Furthermore, not only the latest situation but also all the past history may be stored in the user ID information database.

In Step S504, the master key generation unit 202 generates a master key for secure search and a public parameter for secure search by performing a master key generation algorithm of the existing secure search scheme used by the system.

Similarly, the master key generation unit 202 generates a master key for grouping information and a public parameter for grouping information by performing a master key generation algorithm of the existing encryption scheme A, and a master key for encryption and a public parameter for encryption by performing a master key generation algorithm of the existing encryption scheme B.

Henceforth, the master key for secure search, the master key for grouping information, and the master key for encryption will be collectively called a master key, and the public parameter for secure search, the public parameter for grouping information, and the public parameter for encryption will be collectively called a public parameter.

In Step S505, the key storage unit 203 stores the master key and the public parameter generated by the master key generation unit 202, in the storage device.

In Step S506, the PKG-side data transmission/reception unit 205 discloses the public parameter stored in the key storage unit 203 to the access terminal apparatus 301.

By performing the steps described above, the setup of the present secure search system has been completed.

The contents of the user ID information database generated in S503 are updated at each time of personnel reshuffling, joining the company or leaving the company of a user, in the system operation.

Figure 6:
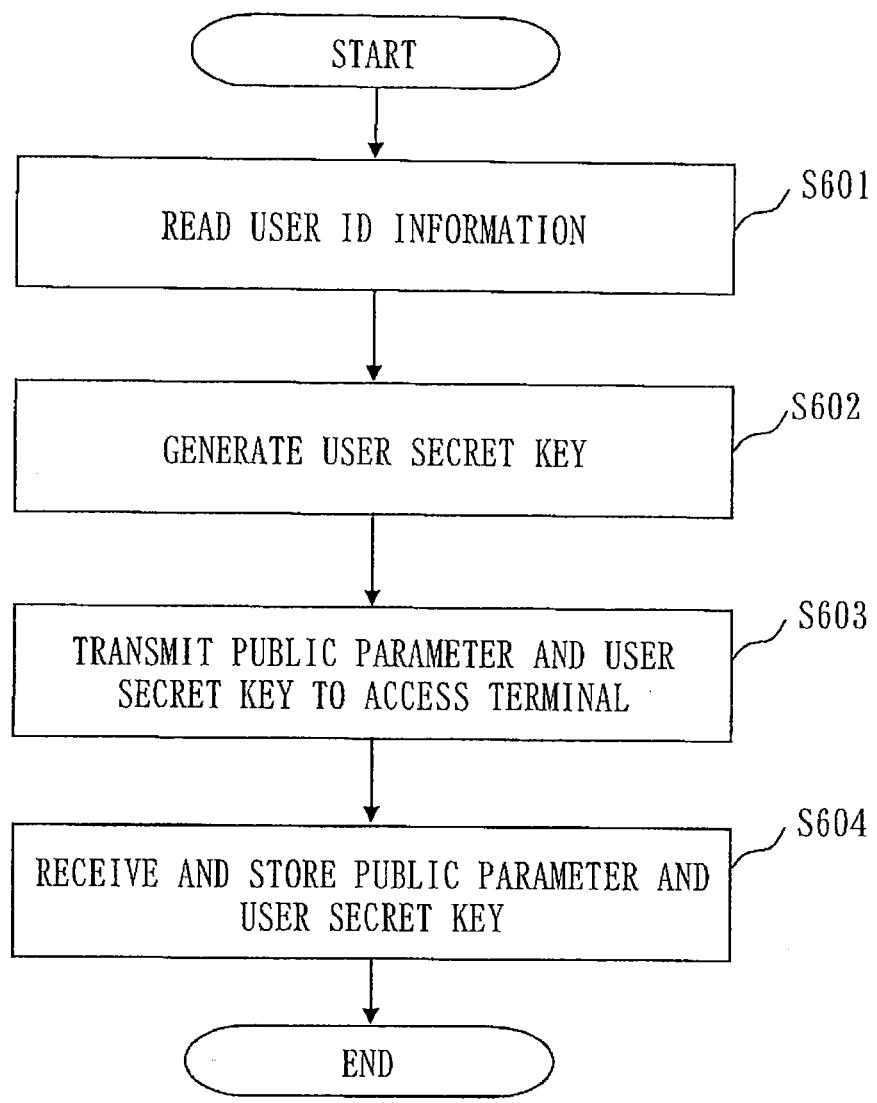
FIG. 6 is a flowchart showing an example of user secret key issue processing according to the first embodiment.

Next, processing of issuing a user secret key will be explained based on FIG. 6.

The user secret key issue processing is processing mainly performed by the key management server apparatus 201 and the access terminal apparatus 301, and executed when a new user is added, a group name to which a user belongs changes, and the like.

First, in Step S601, the user secret key generation unit 204 of the key management server apparatus 201 acquires a group name and a user name from the user ID information database held by the user ID information management unit 206.

In Step S602, the user secret key generation unit 204 generates a user secret key for secure search used for generating a search query, a user secret key for grouping information used for generating a group determination key, and a user secret key for encryption used for decrypting encrypted data.

In the existing secure search scheme, a tag ID hierarchical structure needs to be specified when a user secret key for secure search is generated. The user secret key for secure search can be generated by setting the group name and the user name acquired in S601 in the group name section and the user name section respectively and specifying a delegatable element (an element which can be specified by the access terminal apparatus 301) as a keyword.

In the existing encryption scheme A, when a user secret key for grouping information is generated, a grouping information hierarchical structure needs to be specified. The user secret key for grouping information can be generated by setting the group name and the user name acquired in S601 in the group name section and the user name section respectively and specifying a delegatable element (an element which can be specified by the access terminal apparatus 301) as a hierarchical layer number.

In the existing encryption scheme B, when a user secret key for encryption is generated, a decrypter ID hierarchical structure needs to be specified. The user secret key for encryption can be generated by setting the group name and the user name acquired in S601 in the group name section and the user name section respectively.

The three keys generated above, namely the user secret key for secure search, the user secret key for grouping information, and the user secret key for encryption, will be collectively called a user secret key.

In Step S603, the PKG-side data transmission/reception unit 205 transmits the user secret key generated in S602 and the public parameter stored in the key storage unit 203 to the access terminal apparatus 301.

In Step S604, the access terminal apparatus 301 stores the user secret key and the public parameter, received from the key management server apparatus 201 in S603, in the user secret key management unit 305.

By performing the steps described above, the key management server apparatus 201 can issue a user secret key to a user who operates the access terminal apparatus 301.

Next, data encryption processing will be described based on FIGS. 7 and 8.

Data encryption processing is processing mainly performed by the access terminal apparatus 301 and the data center apparatus 401, and executed when encrypting storage target data to be stored in the data center apparatus 401.

First, in Step S701, the access terminal apparatus 301 receives a group name and a user name (examples of user information on a user who is able to access storage target data) of a user who is able to search and decrypt encrypted data of storage target data, from a user who operates the access terminal apparatus 301, and inputs them in the data encryption unit 302, the encrypted tag generation unit 303, and the grouping information generation unit 310.

The number of group names or user names to be received is not necessarily to be one. When there are a plurality of users who are able to decrypt, a plurality of group names or user names can be received.

In the existing secure search scheme, the existing encryption scheme A, and the existing encryption scheme B used in the present Embodiment, it is also possible to receive a wildcard that indicates anyone can be sufficient as a group name or a user name.

In Step S702, the data encryption unit 302 receives storage target data from the user, and determines a keyword to be associated with the storage target data.

The keyword may be extracted from the storage target data automatically, or received from the user.

The number of keywords does not necessarily need to be one, and therefore, a plurality of them may be associated with.

In Step S703, the data encryption unit 302 encrypts the storage target data received in S702 by using the group name and the user name received in S701.

Specifically, the data encryption unit 302 generates a session key at random, and encrypts the storage target data with the session key by using common key encryption, such as AES (Advanced Encryption Standard) and Camellia (registered trademark), to generate an encrypted data body.

Next, the data encryption unit 302 specifies the group name and the user name received in S701 as a group name and a user name of the decrypter ID hierarchical structure, and by using this as a public key for encryption, encrypts the session key by the existing encryption scheme B so as to generate an encrypted session key.

Then, the data encryption unit 302 generates encrypted data by combining the two encryption results described above.

Figure 16:
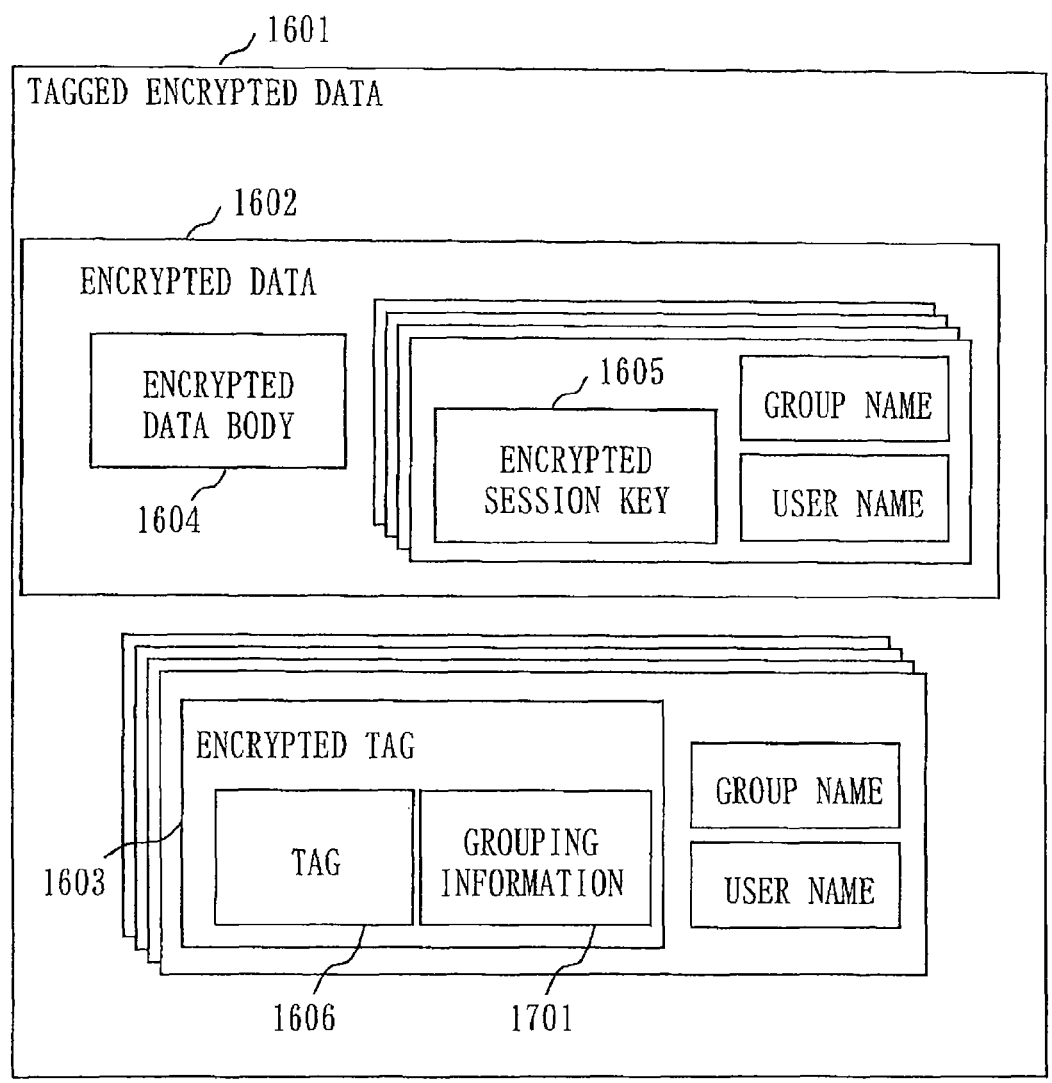
FIG. 16 shows an example of tagged encrypted data according to the first embodiment.

The data structure of the generated encrypted data is shown in FIG. 16.

If the data encryption unit 302 receives a plurality of group names and user names in S701, the data encryption unit 302 needs to generate an encrypted session key for each of all the sets of a group name and a user name.

In Step S704, the grouping information generation unit 310 receives a keyword (keyword of storage target data) for generating an encrypted tag, and generates grouping information for each keyword.

Figure 5:
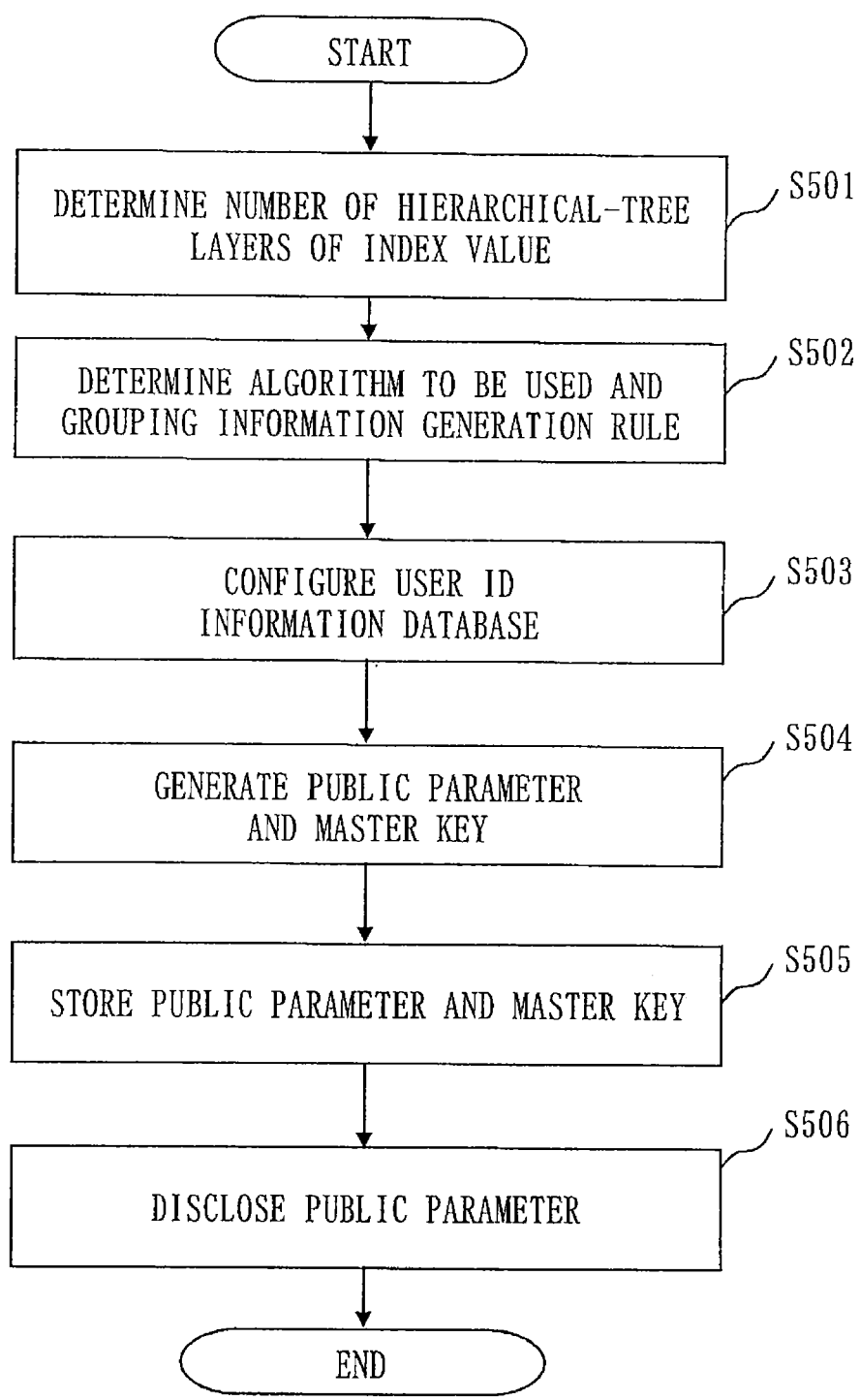
FIG. 5 is a flowchart showing an example of system initial setting processing according to the first embodiment.

Specifically, the grouping information generation unit 310 specifies the group name and user name received in S701 as a group name and a user name of the grouping information ID hierarchical structure (FIG. 13), and sets the numbers from 1 to L (the maximum number of hierarchical-tree layers of index information determined in S501 in FIG. 5) as a character string in the hierarchical layer number. Thereby, the grouping information generation unit 310 generates L number of grouping information generation keys.

The grouping information ID hierarchical structure for which 1 is set in the hierarchical layer number serves as a grouping information generation key of the first hierarchical layer, and the grouping information ID hierarchical structure for which L is set in the hierarchical layer number serves as a grouping information generation key of the L-th hierarchical layer.

Next, the grouping information generation unit 310 generates a bit sequence of L bits based on the keyword.

The grouping information generation unit 310 may generate, for example, a hash value of the keyword by using a hash function such as SHA-2, and extract arbitrary L bits from the hash value.

Therefore, L bits may be sequentially selected from the hash value, or alternatively, may be non-sequentially selected, such as the first bit, the third bit, the sixth bit, and the eleventh bit, from the hash value.

However, it is necessary to select L bits at the same bit position, for grouping information which is generated when performing search.

The grouping information generation unit 310 encrypts the first bit of the extracted bit sequence with grouping information generation key of the first hierarchical-layer by using the existing encryption scheme A so as to generate encrypted first information, and encrypts the second bit of the extracted bit sequence with the grouping information generation key of the second hierarchical-layer by using the existing encryption scheme A so as to generate encrypted second information.

The encryption is performed for all the bits down to the L-th bit in order, and then, they collectively serve as grouping information.

Thus, the grouping information generation unit 310 encrypts the L bits of the hash value of the keyword with L grouping information generation keys, to each of which user information on a user who is allowed to access storage target data is reflected, so as to generate grouping information.

Figure 17:
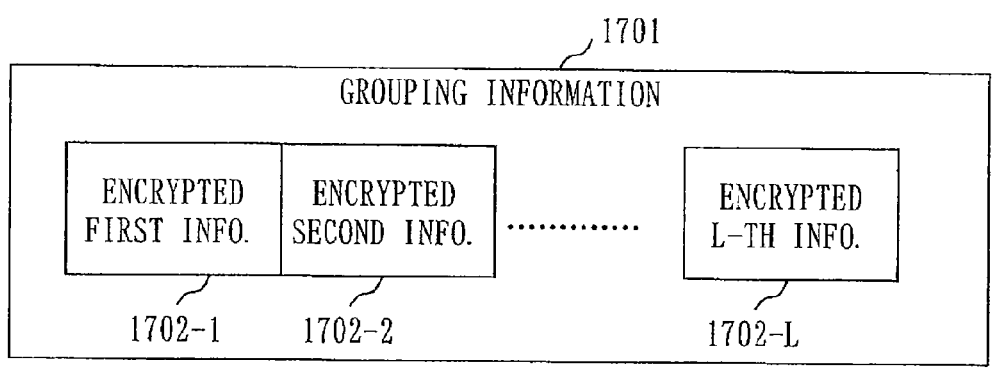
FIG. 17 shows an example of grouping information according to the first embodiment.

The configuration of the generated grouping information is shown in FIG. 17.

If the data encryption unit 302 receives a plurality of group names and user names in S701, the data encryption unit 302 generates grouping information for each of all the sets of a group name and a user name.

In Step S705, the encrypted tag generation unit 303 encrypts the keyword, to generate an encrypted tag.

Specifically, the encrypted tag generation unit 303 specifies the group name and the user name received in S701 as a group name and a user name in the keyword section of the tag ID hierarchical structure, and the keyword determined in S702 in the keyword section of the tag ID hierarchical structure. Then, using this tag ID hierarchical structure as an encryption key, the encrypted tag generation unit 303 encrypts a random number to generate a tag by the existing secure search scheme.

The encrypted tag generation unit 303 combines this tag and the grouping information generated from the same keyword in S704 to obtain an encrypted tag.

The structure of the generated encrypted tag is shown in FIG. 16.

Since the processing described above is for one keyword, it is to be executed for all the keywords associated with the data.

If the data encryption unit 302 receives a plurality of group names and user names in S701, the data encryption unit 302 generates an encrypted tag for each of all the sets of a group name and a user name.

In Step S706, the tagged encrypted data generation unit 304 generates tagged encrypted data by combining the encrypted data generated in S703 and the encrypted tag generated in S705, and transmits the tagged encrypted data, as a storage request, to the data center apparatus 401 through the terminal-side data transmission/reception unit 309.

At this time, the group name and the user name received in S701 are also transmitted in order to facilitate storing the tagged encrypted data in the data center apparatus 401.

FIG. 16 shows the structure of tagged encrypted data in which a group name and a user name are included.

In Step S707, the storage request processing unit 403 of the data center apparatus 401 decomposes the tagged encrypted data received from the access terminal apparatus 301, and extracts encrypted data and a plurality of encrypted tags.

Then, the encrypted data is stored in the encrypted data management unit 404.

The encrypted data management unit 404 stores the encrypted data separately for each set of a group name and a user name included in the tagged encrypted data in S706, and gives a management number to the stored encrypted data so that the encrypted data may be uniquely specified by the management number later.

If the encrypted data is associated with a plurality of group names and user names, the encrypted data is stored associated with each set of a group name and a user name.

If the encrypted data is associated with a plurality of group names and user names, it is possible to save the capacity of the disk by storing only one encrypted data and only reference information with respect to the others.

Figure 18:
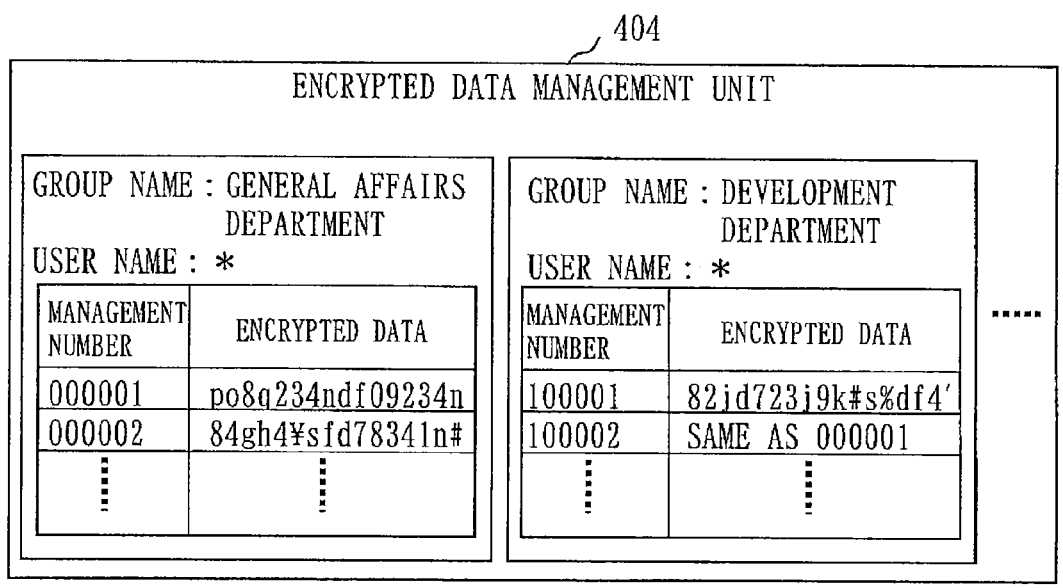
FIG. 18 shows an example of storage contents of an encrypted data management unit according to the first embodiment.

FIG. 18 shows an example of storage of encrypted data.

As shown in FIG. 18, the encrypted data, for which the group name is "general affairs department" and the user name is "*" (wildcard), and the management number are collectively managed and stored, and, further, the encrypted data, in which the group name is "development department" and the user name is "*", and the management number are collectively managed and stored.

If there is data to be disclosed to both the general affairs department and the development department, for example, the encrypted data body is stored associated with the management number 000002, and a pointer to refer to the management number 000002 is stored in the management number 100002 as encrypted data.

In Step S708, the storage request processing unit 403 transmits a plurality of encrypted tags acquired in S706, with the management number of the corresponding encrypted data, to the index management unit 405.

The index management unit 405 stores the received encrypted tags and the management number separately for each set of a group name and a user name included in the tagged encrypted data in S706.

Since encrypted tag storage processing in the index management unit 405 is complicated, details will be described with reference to FIG. 8.

Figure 19:
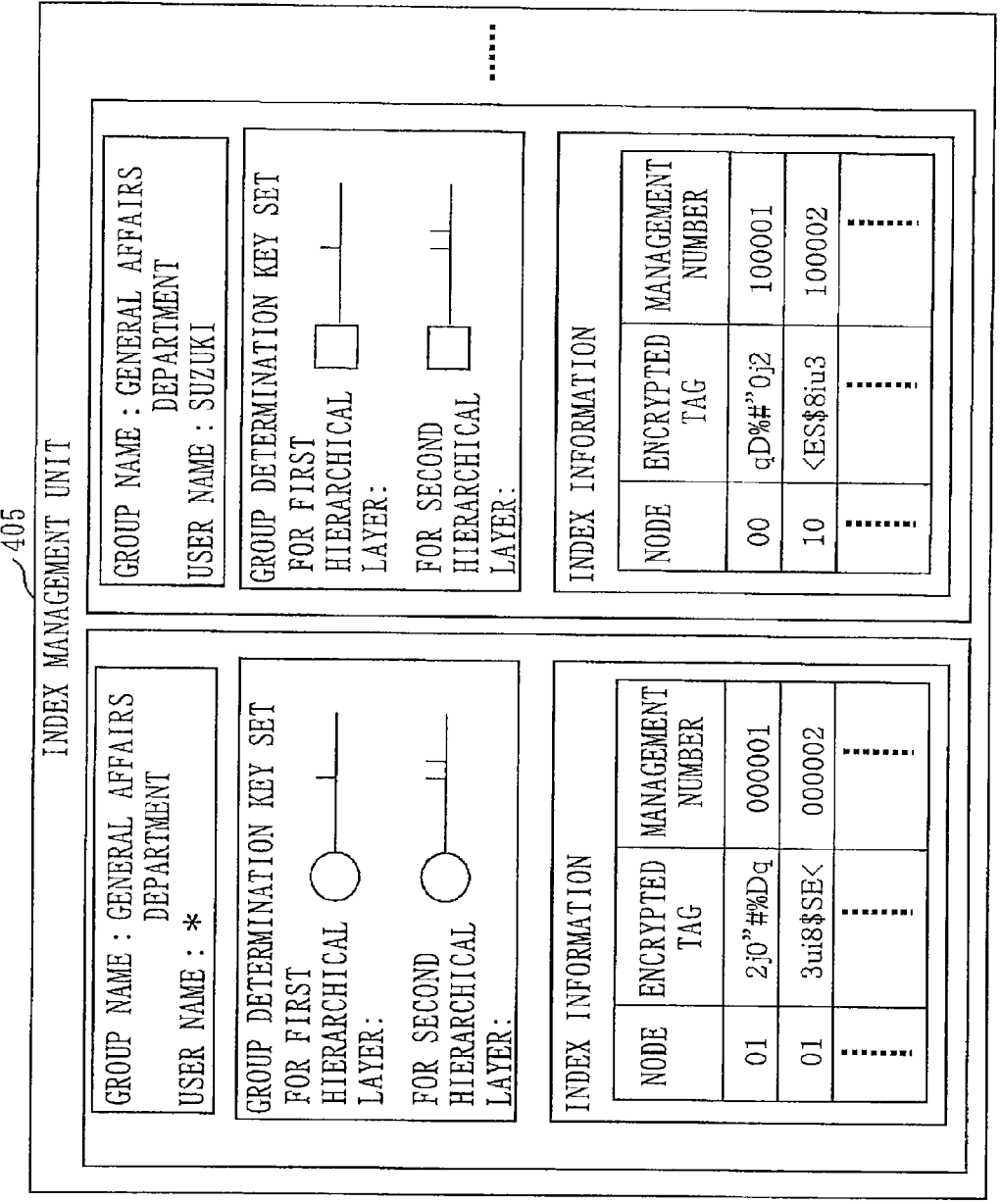
FIG. 19 shows an example of storage contents of an index management unit according to the first embodiment.

As shown in the example of FIG. 19, the index information should also be managed for each set of a group name and a user name.

In the index information of FIG. 19, the group determination key for the first hierarchical layer in the group determination key set is a decryption key for decrypting encrypted first information (FIG. 17) in grouping information, that is a decryption key for decrypting the encrypted bit at the first bit of the allowed bit position.

Similarly, the group determination key for the second hierarchical layer in the group determination key set is a decryption key for decrypting encrypted second information (FIG. 17) in grouping information, that is a decryption key for decrypting the encrypted bit at the second bit of the allowed bit position.

The node in the index information is an index value to be related to an encrypted tag (tag+grouping information).

For example, a node "01" indicates that the bit value acquired by decrypting encrypted first information of grouping information is "0", the bit value acquired by decrypting encrypted second information is "1", and "01" is obtained by connecting them.

That is, in the example of FIG. 19, disclosure of bit values is allowed for only two high order bit positions, and only two group determination keys are provided for the data center apparatus 401 by the access terminal apparatus 301. Therefore, the index value is 2 bits.

Figure 8:
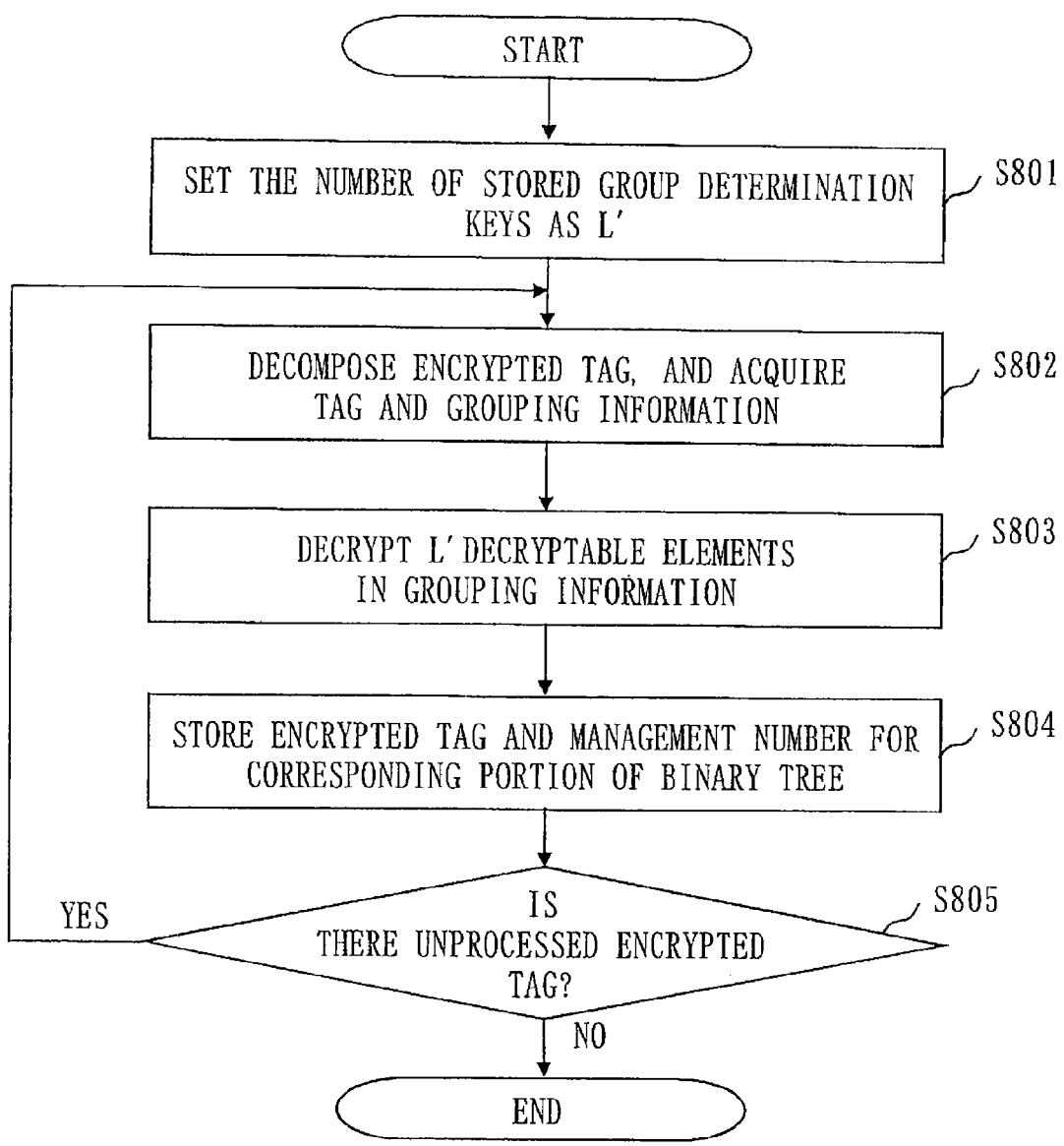
FIG. 8 is a flowchart showing an example of storage processing of an encrypted tag according to the first embodiment.

In the flow of FIG. 8, first, in Step S801, the index management unit 405 searches a plurality of index information which is managed for each set of a group name and a user name, specifies index information (including index information in which a wildcard is used) corresponding to encrypted data which can be accessed by the group name and user name received in S706, and extracts group determination keys having been received from the access terminal apparatus 301.

Here, since the group determination keys have been assigned one by one to each hierarchical layer (each allowed bit position), the group determination keys are disclosed one by one from the first hierarchical layer by the access terminal apparatus 301 as described later. Then, in this case, let us assume that totally L' (L'<=L) number of group determination keys have been stored.

Figure 7:
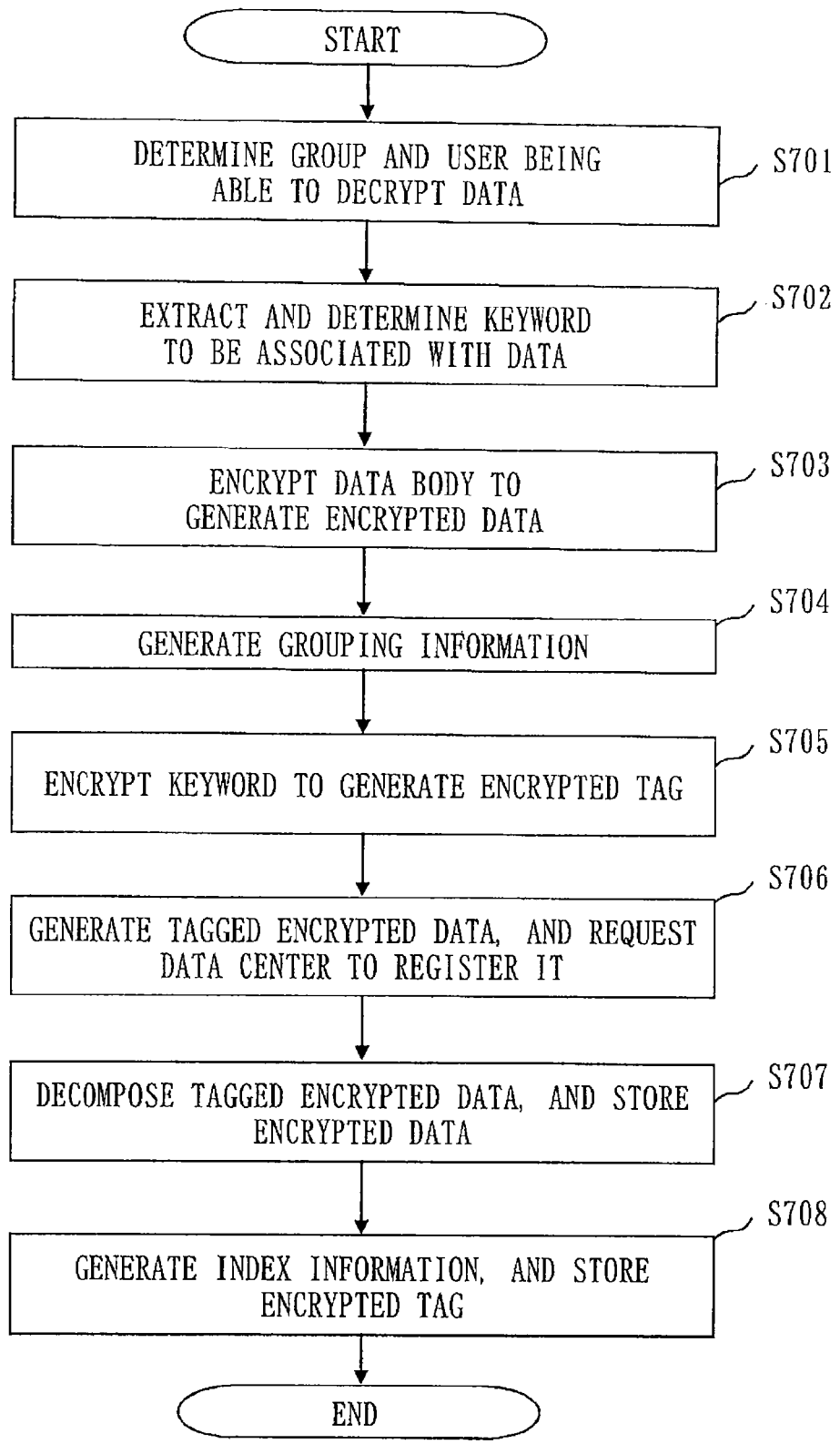
FIG. 7 is a flowchart showing an example of data encryption processing according to the first embodiment.

Generation of a group determination key by the access terminal apparatus 301, transmission of the group determination key from the access terminal apparatus 301 to the data center apparatus 401, and storage of the group determination key in the data center apparatus 401 are performed asynchronously to the flows shown in FIGS. 7 and 8. In this case, let us assume that L' group determination keys were generated by the access terminal apparatus 301 and have already been stored in the index management unit 405 of the data center apparatus 401.

Figure 11:
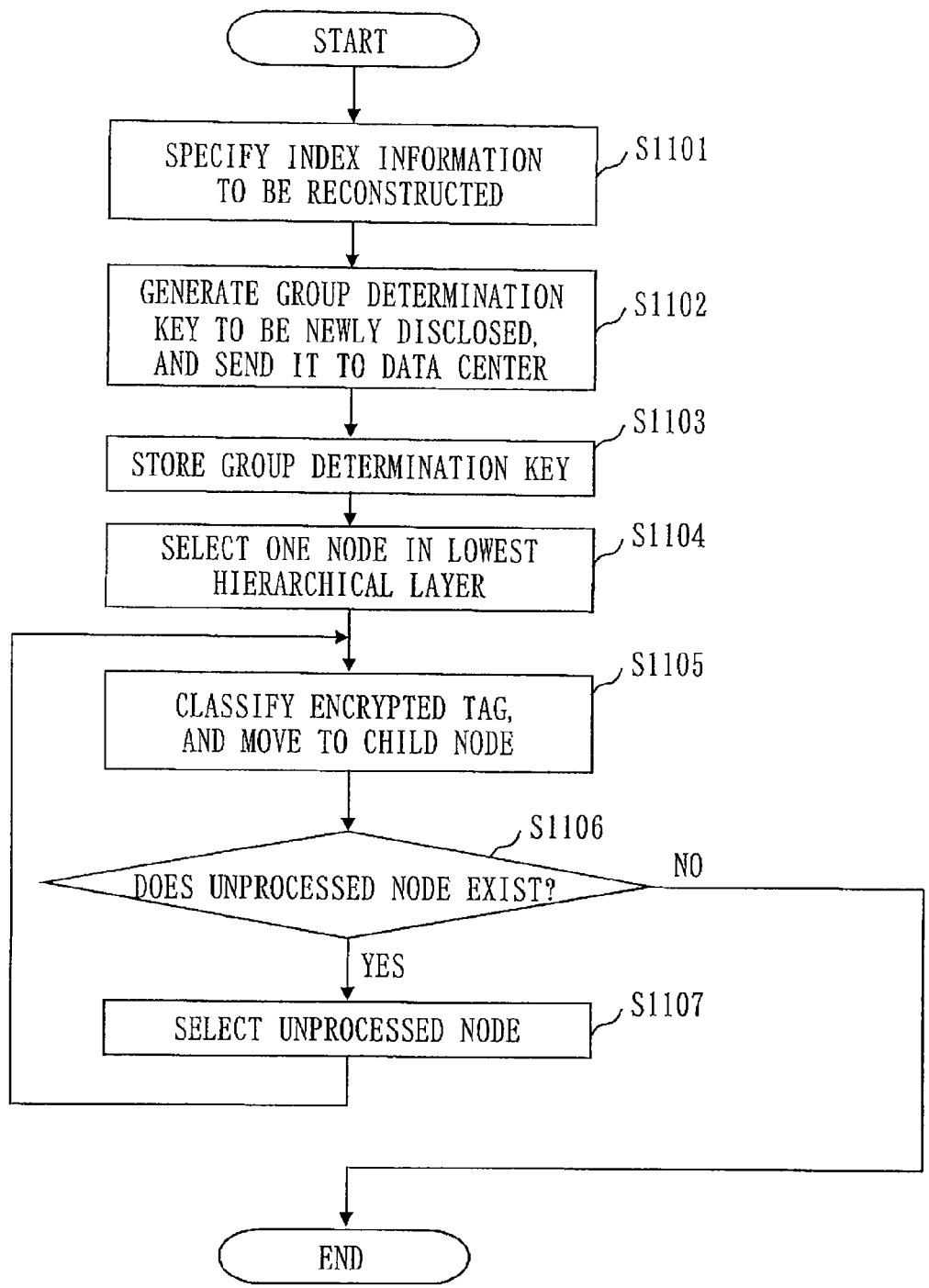
FIG. 11 is a flowchart showing an example of index reconstruction processing according to the first embodiment.

Details of generation of group determination keys by the access terminal apparatus 301 and storage of group determination keys in the data center apparatus 401 are described later with reference to FIG. 11.

In Step S802, the index management unit 405 extracts one unstored encrypted tag from a plurality of encrypted tags received in S707, and decomposes it into a tag and grouping information.

In Step S803, the index management unit 405 decomposes the grouping information in order to extract encrypted first information to encrypted L-th information (FIG. 17).

Then, the index management unit 405 decrypts the encrypted first information to the encrypted L'-th information by respectively using a group determination key for the first hierarchical layer to a group determination key for the L'-th hierarchical layer so as to obtain first information to L'-th information.

In Step S804, the index management unit 405, based on the first information to the L'-th information extracted in S803, uses the first information for determining the first hierarchical node from the 0-th hierarchical node, and uses the second information for determining the second hierarchical node from the first hierarchical node.

The index management unit 405 specifies a node concerned in the binary tree corresponding to the group name and user name received in S705, and stores the encrypted tag extracted in S802 and the management number received in S707 to be associated with the specified node.

Figure 20:
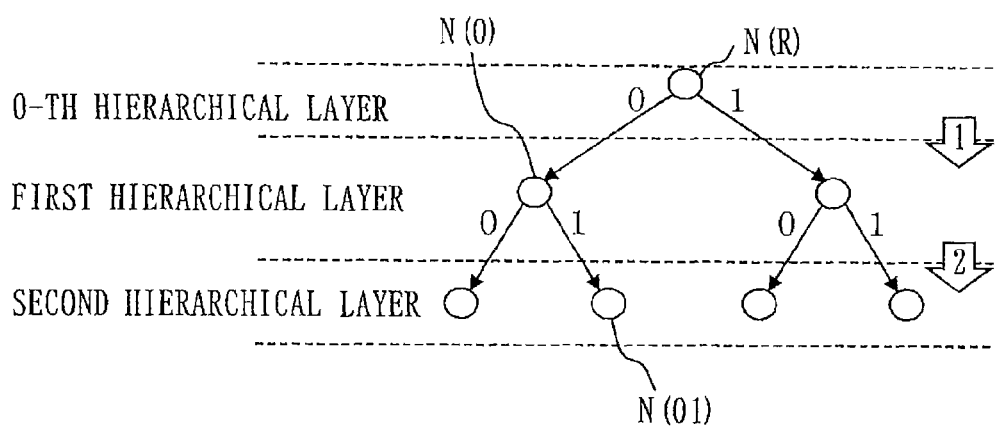
FIG. 20 shows an example of a node structure of a binary tree according to the first embodiment.

For example, as shown in FIG. 20, first, from the root node (N (R)) as a starting point, a child node at the right side or left side is extracted depending upon whether the first information is 0 or 1.

Similarly, a child node at the right side or left side is extracted depending upon whether the second information is 0 or 1.

This processing is executed by using all the information stored.

"1" inside the arrow at the right of FIG. 20 indicates that a node in the first hierarchical layer is selected based on the first information, and "2" inside the arrow indicates that a node in the second hierarchical layer is selected based on the second information.

For example, if the first information is 0 and the second information is 1, the node 01 (N (01)) shown in FIG. 20 is detected as a node concerned, and an encrypted tag and a management number are stored associated with the node 01.

FIG. 19 shows examples of index information in which there are stored, in a tabular form, numbers (index values) representing the nodes, formed by arranging the first information to the L'-th information (L'=2 in the case of FIG. 19), encrypted tags, and management numbers of corresponding encrypted data.

In Step S805, the index management unit 405 determines whether there remains an encrypted tag for which the processing from S802 to S804 has not yet been performed in a plurality of encrypted tags received in S707.

If there remains an unprocessed encrypted tag, it returns to the processing of S802, and if there is nothing remaining, the flow ends.

By performing the steps described above, the access terminal apparatus 301 can encrypt data and request the data center apparatus 401 to store the encrypted data, and the data center apparatus 401 can store received tagged encrypted data.

Figure 9:
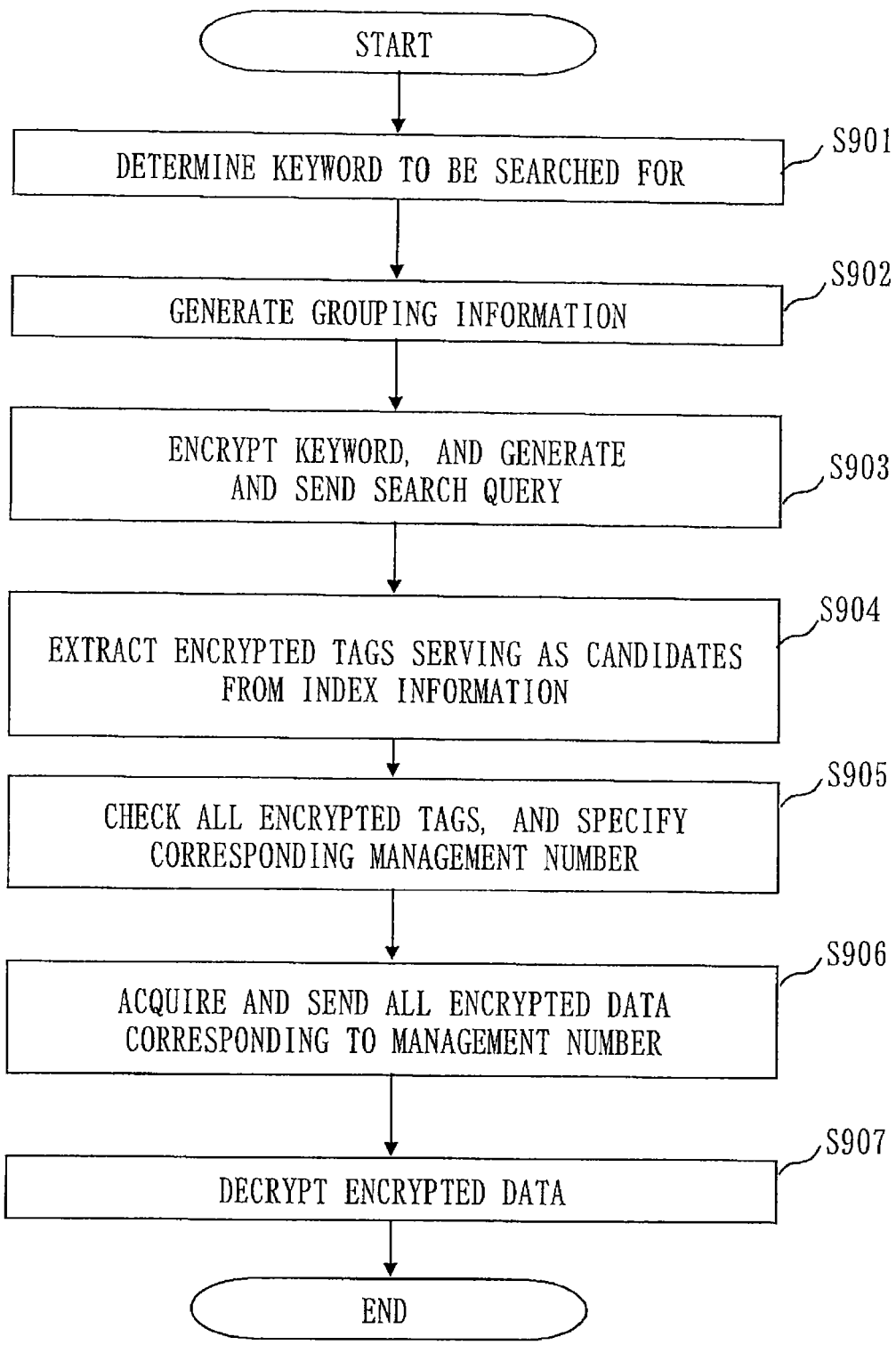
FIG. 9 is a flowchart showing an example of search processing of encrypted data according to the first embodiment.

Next, based on FIG. 9, search processing of encrypted data will be described.

Encrypted data search processing is mainly performed by the access terminal apparatus 301 and the data center apparatus 401, and executed when acquiring encrypted data stored in the data center apparatus 401.

In Step S901, the search query generation unit 306 of the access terminal apparatus 301 receives a keyword to be search for, from a user who operates the access terminal apparatus 301.

The search query generation unit 306 notifies the grouping information generation unit 310 of the received search keyword.

In Step S902, the grouping information generation unit 310 generates grouping information from the search keyword notified by the search query generation unit 306.

This processing is the same as processing of Step S704.

The grouping information generation unit 310 inputs a group name and a user name (that is, the name of a group to which a user who is going to perform searching of encrypted data belongs, and the name of the user) of the access terminal apparatus 301, and generates L grouping information generation keys by specifying the inputted group name and user name in the group name and user name of the grouping information ID hierarchical structure (FIG. 13) and setting the numbers from 1 to L, as a character string, in the hierarchical layer number.

Next, the grouping information generation unit 310 generates a bit sequence of L bits from the search keyword by using a hash function such as SHA-2, for example.

As to extraction of the L bits from the hash value, the grouping information generation unit 310 extracts a hash value at the same bit position as that of used when storing encrypted data.

Furthermore, the grouping information generation unit 310 encrypts the first bit of the extracted bit sequence with a first hierarchical-layer grouping information generation key by using the existing encryption scheme A so as to generate an encrypted first information, and encrypts the second bit of the extracted bit sequence with a second hierarchical-layer grouping information generation key by using the existing encryption scheme A so as to generate encrypted second information. The encryption is performed for all the bits down to the L-th bit in order, and then, they collectively serve as grouping information.

In Step S903, the search query generation unit 306 generates a search query by using the search keyword received in S901 and the user secret key stored in the user secret key management unit 305.

Specifically, the search query generation unit 306 generates a trap door by using the user secret key for secure search and the search keyword as input and by extracting a search query generation function of the existing secure search scheme.

Next, the search query generation unit 306 generates a search query by combining the grouping information generated in S902 and the trap door.

Figure 21:
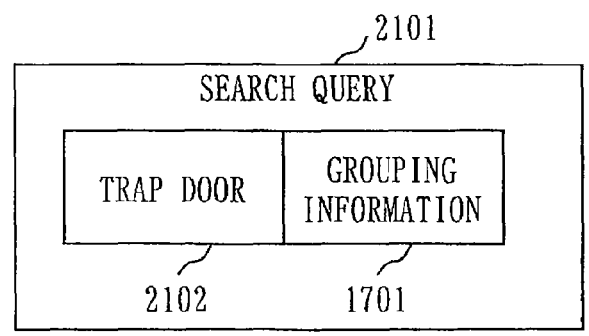
FIG. 21 shows an example of a search query according to the first embodiment.

The structure of the generated search query is shown in FIG. 21.

The search query generation unit 306 transmits the generated search query to the data center apparatus 401 through the terminal-side data transmission/reception unit 309.

At this time, the group name and the user name of the user are also transmitted.

In Step S904, the search processing unit 406 of the data center apparatus 401 extracts the trap door and the grouping information from the search query received from the access terminal apparatus 301 through the center-side data transmission/reception unit 402, and acquires all the encrypted tags that serve as search candidates from the index information (FIG. 19).

Figure 10:
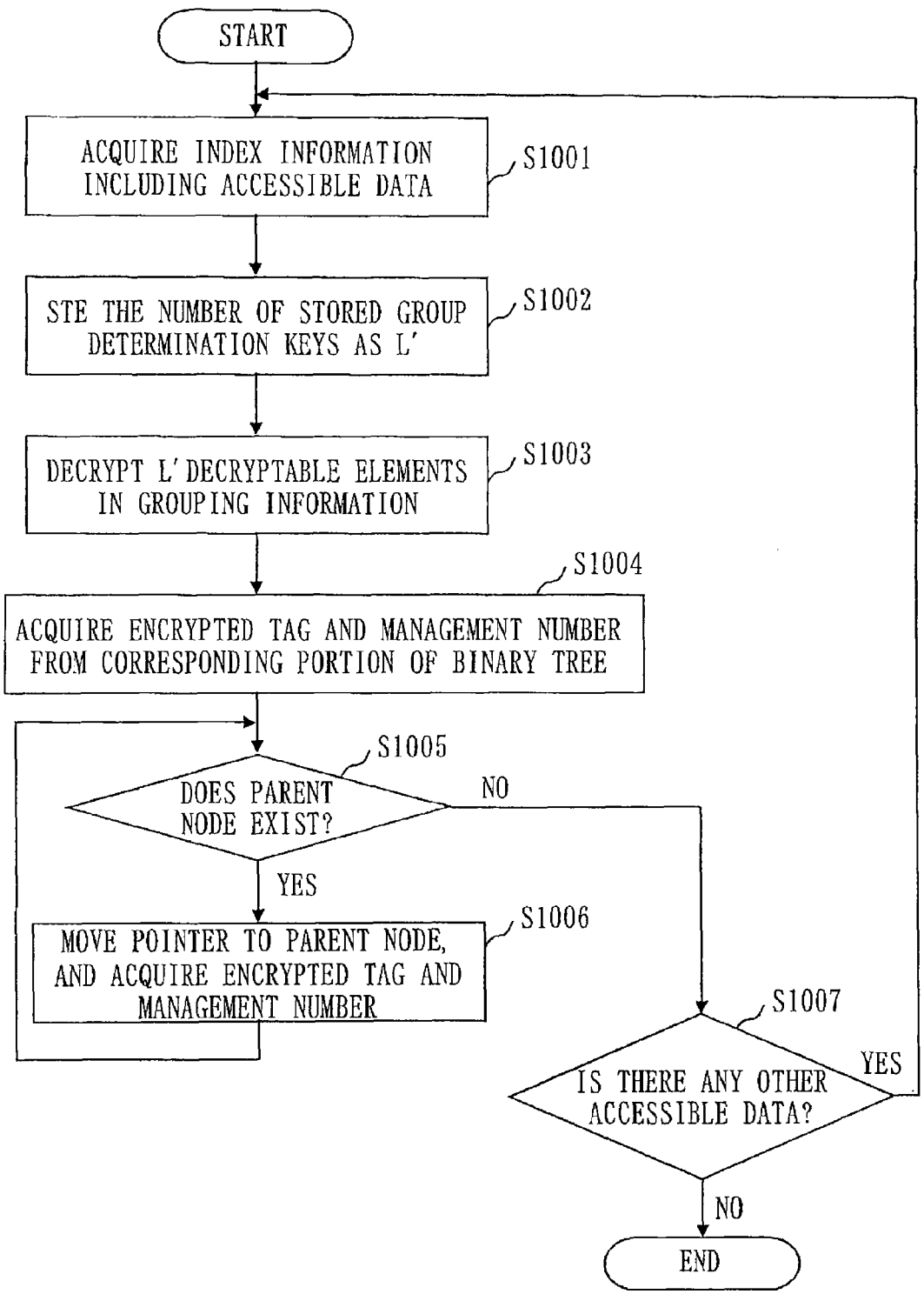
FIG. 10 is a flowchart showing an example of acquisition processing of an encrypted tag according to the first embodiment.

Since encrypted tag acquisition processing in the index management unit 405 is complicated, details will be explained with reference to FIG. 10.

In Step S1001, the index management unit 405 performs searching of a plurality of index information managed for each set of a group name and a user name, and specifies index information corresponding to encrypted data which can be accessed by using the group name and user name received with the search query in S903.

The index management unit 405 specifies unprocessed index information as index information being an object to be processed.

Step S1002 and Step 1003 are respectively the same as Step S801 and Step S803.

That is, the index management unit 405 decomposes grouping information in order to extract encrypted first information to encrypted L-th information (FIG. 17).

Then, the index management unit 405 decrypts the encrypted first information to the encrypted L'-th information by respectively using a group determination key for the first hierarchical layer to a group determination key for the L'-th hierarchical layer so as to obtain first information to L'-th information.

In Step S1004, the index management unit 405 specifies a node corresponding to the grouping information extracted in S903, in the binary tree by using the step shown in Step S804, and sets up a pointer indicating "in processing" at the specified node.

Then, the index management unit 405 extracts all the sets of an encrypted tag and a management number associated with the node pointed to by the pointer, and sends them to the search processing unit 406.

That is, the index management unit 405 specifies a node number being the same value as the value (index value) obtained from a bit value indicated by each of the first information to the L'-th information, in the index information specified in S1001. Then, the index management unit 405 extracts all the sets of an encrypted tag and a management number corresponding to the specified node number, and sends them to the search processing unit 406.

For example, in the example of FIG. 19, assume that a search query was transmitted from a user who belongs to the general affairs department. In S1001, index information of group name: general affairs department and user name:* is selected. If the index value acquired by decrypting the grouping information in the search query is "01", a set of an encrypted tag "2j0" #% Dq" and a management number "000001" and a set of an encrypted tag "3ui8$SE<" and a management number "000002" are extracted.

In Step S1005, the index management unit 405 checks whether a parent node exists for the node currently pointed to by the pointer.

If existing, it goes to Step S1006, and if not existing, it goes to Step S1007.

For example, if the pointer is pointing to the root node, since a parent node does not exist, it goes to processing of Step S1007.

S1005 and S1006 are processing for dealing with the case of receiving a search query in the midst of index reconstruction processing to be described below using FIG. 11.

That is, in the index reconstruction processing, in the case of receiving a search query before all the groups of the encrypted tag and the management number are relocated to a new node number (node number of the (L'+1)th hierarchical layer), it becomes necessary to perform searching not only with respect to the node number of the (L'+1)th hierarchical layer but also with respect to the node number (parent node) of the L'-th hierarchical layer for which relocation has not been completed. Therefore, the processing of S1005 and S1006 is performed.

In Step S1006, the index management unit 405 moves the pointer to the parent node of the node currently being pointed to by the pointer, extracts all the sets of the encrypted tag and the management number associated with the node being pointed to by the pointer, and sends them to the search processing unit 406.

For example, when the pointer is pointing to the node 01 (N (01)) of FIG. 20, a set of the encrypted tag and the management number of the node 0 (N (0)) being a parent node is extracted.

Then, it goes to processing of S1005.

In Step S1007, the index management unit 405 determines whether there is any index information for which the processing from Step S1002 to S1006 has not yet been performed in the index information corresponding to the accessible encrypted data specified in S1001.

If existing, it goes to processing of Step S1001, and if not existing, the flow ends.

By what is described above, the processing of acquiring all the encrypted tags that serve as search candidates from the index information performed in Step S904 is completed.

In Step S905, the search processing unit 406 extracts a tag from the encrypted tag acquired in S904, and determines whether the keyword included in the tag and the keyword included in the trap door extracted in S904 are identical with each other by using determination processing of the existing secure search technology.

Since the determination processing of the existing secure search technology can compare only one tag and one trap door, this processing is performed for all the encrypted tags acquired in S904.

The search processing unit 406 specifies a management number associated with the encrypted tag which has been determined to be identical as a result of the determination processing.

In Step S906, the search processing unit 406 acquires all the encrypted data corresponding to the management number specified in S905 from the encrypted data management unit 404, and sends them to the access terminal apparatus 301 through the center-side data transmission/reception unit 402.

In Step S907, the data decryption unit 307 of the access terminal apparatus 301 decrypts the encrypted data received from the data center apparatus 401 in S906 with the user secret key for encryption stored in the user secret key management unit 305 by decryption processing of the existing encryption scheme.

This is performed for all the encrypted data.

By performing the steps described above, the access terminal apparatus 301 is able to receive a search keyword from the user, acquire encrypted data including the keyword from the data center apparatus 401, and read the data after decrypting the acquired encrypted data.

Next, based on FIG. 11, index reconstruction processing at the time of addition to the number of hierarchical layers of an index tree will be described.

The index reconstruction processing is mainly performed by the access terminal apparatus 301 and the data center apparatus 401.

In Step S1101, the group determination key generation unit 308 of the access terminal apparatus 301 receives a group name and a user name from a user, as information for specifying index information to be reconstructed.

Since, in the data center apparatus 401, index information is managed for each set of names of group and user name to which encrypted data is disclosed, it is possible to uniquely specify index information to be reconstructed, by using the group name and the user name received there.

In Step S1102, the group determination key generation unit 308 extracts a user secret key for grouping information and the number of hierarchical layers of the group determination key having already been issued, from the user secret key management unit 305.

The group determination key generation unit 308 specifies the (L'+1)th hierarchical layer of the group determination key to be newly issued.

That is, the group determination key generation unit 308 specifies the (L'+1)th bit being a new allowed bit position.

Since the user secret key for grouping information was issued in a state where the group name and the user name in the grouping information ID hierarchical structure (FIG. 13) had been specified, the group determination key generation unit 308 generates a group determination key corresponding to the (L'+1)th hierarchical layer by newly specifying a hierarchical layer number (L'+1) and performing a key delegation function of the existing encryption scheme.

The group determination key generation unit 308 transmits the generated group determination key to the data center apparatus 401 through the terminal-side data transmission/reception unit 309, with the group name and the user name received in S1101 being associated with the index information to be reconstructed.

To generate a group determination key corresponding to the new (L'+1)th hierarchical layer and to transmit it to the data center apparatus 401, which is performed by the group determination key generation unit 308, is equivalent to designate a new allowed bit position and to allow to decrypt the encrypted bit at the new allowed bit position.

In Step S1103, the index management unit 405 of the data center apparatus 401 specifies corresponding index information and a group determination key set based on the group name and the user name received in S1102, and stores the received group determination key for the (L'+1)th hierarchical layer and the corresponding hierarchical layer number (L'+1) in the group determination key set.

In Step S1104, the index management unit 405 extracts the index information specified in S1103, and selects one node from the nodes in the lowest hierarchical layer (hierarchical layer number L') of the extracted index information.

In Step S1105, the index management unit 405 extracts the encrypted tag and the management number associated with the L'-th hierarchical node selected in Step S1104 or S1107, and further extracts grouping information from the encrypted tag.

The index management unit 405 acquires the (L'+1)th information for relocating the encrypted tag to the (L'+1)th hierarchical layer, by decrypting encrypted (L'+1)th information of the grouping information with a group determination key for the (L'+1)th hierarchical layer, based on the existing encryption scheme.

The index management unit 405 determines, based on the (L'+1)th information, a child node to which the encrypted tag and the management number are to be relocated, among child nodes of the selected L'-th hierarchical node, and stores the encrypted tag and the management number to be newly associated with the (L'+1)th hierarchical node after deleting the association with the L'-th hierarchical node.

This is performed for all the encrypted tags associated with the selected L'-th hierarchical layer.

Figure 22:
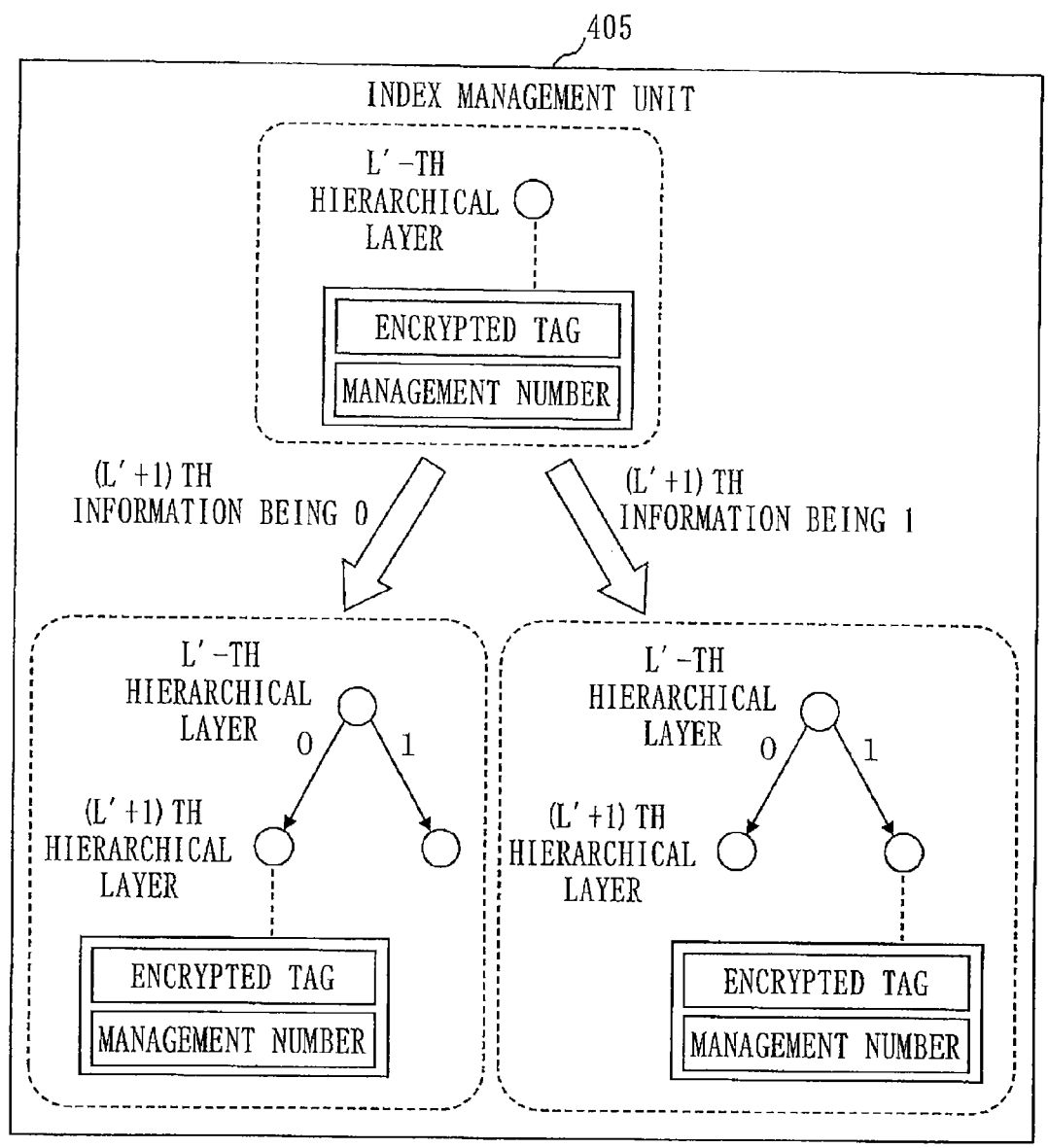
FIG. 22 shows an example of index reconstruction processing according to the first embodiment.

A conceptual illustration of this processing is shown in FIG. 22.

In Step S1106, the index management unit 405 checks whether a node for which the processing of Step S1105 has not yet been performed exists in the nodes of the L'-th hierarchical layer.

If an unprocessed node exists, it goes to Step S1107, and if there is no unprocessed node, the flow ends.

In Step S1107, the index management unit 405 selects a node for which the processing of Step S1105 has not yet been performed from the nodes in the L'-th hierarchical layer, and then, it goes to processing of Step S1105.

As shown in FIG. 19, the index management unit 405 stores encrypted tags relating each tag to a node number.

Grouping information is included in the encrypted tag.

In the example of FIG. 19, only two high order bits of grouping information are decrypted, and the third and subsequent bits are kept in secrecy.

If the access terminal apparatus 301 allows to disclose three high order bit values of grouping information, a group determination key for decrypting the third bit (that is, a group determination key for the third hierarchical layer) is transmitted to the data center apparatus 401 from the access terminal apparatus 301.

Referring to the example of index information in FIG. 19, wherein the group name: general affairs department and the user name: *, an explanation will be described. The encrypted bit of the third bit (that is, encrypted third information) of grouping information included in the encrypted tag ("2j0"#% Dq") of the record in the first line is decrypted with a group determination key for the third hierarchical layer so as to acquire a decrypted value of the third bit (that is, third information).

As a result, if, for example, the decrypted value of the third bit is "0", "010" is set as a new node number. A set of the encrypted tag "2j0" #% Dq" and the management number "000001" is related to this new node number "010.

The same processing is also performed for other records.

For example, if a new node number "011" is obtained by decrypting the encrypted bit of the third bit of the grouping information with respect to the record in the second line of the index information, wherein the group name: general affairs department and the user name: *, the tag of the record in the first line and the tag of the record in the second line belong to different groups.

Thus, when the number of bits of a node number increases, the number of tags included in each group decreases, and therefore, the time necessary for processing to collate a trap door with a tag at the time of receiving a search query can be reduced.

By performing the steps described above, the access terminal apparatus 301 newly generates a group determination key and requests the data center apparatus 401 to reconstruct index information, and the data center apparatus 401 reconstructs index information under its management and increases the number of hierarchical layers of the index information by one layer.

As described above, as an encrypted tag includes grouping information which was generated from a keyword, and the data center apparatus 401 receives a group determination key from a user according to necessity, it becomes possible to perform grouping of encrypted tags in accordance with the keyword by using the grouping information.

When performing searching, since grouping information has been generated according to a keyword included in a search query, and the data center apparatus 401 uses the grouping information and the group determination key according to necessity, the data center apparatus 401 can uniquely specify the group of encrypted tags related to a keyword to be searched for.

Therefore, it becomes unnecessary to perform determination processing of the existing secure search technology for all the encrypted tags, so that what is necessary is to perform the determination processing of the existing secure search technology for only encrypted tags belonging to a specific group. Thus, the time for performing secure search can be greatly reduced.

For example, in a situation where L' group determination keys are disclosed to the data center apparatus 401, since it is possible to divide M encrypted tags into 2^L' groups, M/2^L' encrypted tags are averagely included in each group.

Therefore, search processing is accelerated to 2^L' times the speed according to the present Embodiment.

It is configured such that information used for grouping has previously been divided and encrypted per bit, etc. and group determination keys are disclosed by a user, so that the data center apparatus 401 can acquire the information for performing grouping.

Therefore, the user can adjust the layer of grouping according to the number of group determination keys to be disclosed.

For example, in a situation where L' group determination keys are disclosed, let us assume that search time becomes time T as the number of stored encrypted data increases, and therefore, impediments occur in the operation.

Then, since encrypted tags can be divided into double groups by newly disclosing group determination keys corresponding to the (L'+1)th hierarchical layer, search time can be reduced to T/2.

In the meantime, in the world of cryptography algorithm development, that encrypted data cannot be grouped by a keyword included in the encrypted data is evaluated as being cryptography with high security.

Therefore, a user who would like to protect the confidentiality of data does not desire the data center apparatus 401 to unnecessarily perform grouping of encrypted data.

According to the present Embodiment, depending upon a user request layer for security and a response time in search processing, a user himself or herself can control to provide a minimum necessary group determination key only, to the data center apparatus 401.

Therefore, even when information of L bits has been added as grouping information, the balance between security and rapidity can be adjusted by the user, by adjusting the number of group determination keys to be disclosed.

Furthermore, since only a legitimate user who has a user secret key can adjust the number of group determination keys to be disclosed, it is possible to prevent fraud from lowering security, such as fraudulently generating or disclosing a group determination key by a third party.

The scheme described in the present Embodiment is an extension scheme that improves search performance by adding grouping information to tags used for existing secure search.

Therefore, the system described in the present Embodiment can be applied not only to the existing secure search scheme described in the present Embodiment but also to various proposed existing secure search schemes to improve their search performance.

An example applied to the scheme of Non-Patent Literature 4 is described in the present Embodiment. According to the present Embodiment, it is possible to accelerate the search speed of secure search without losing a feature that encrypted data can be shared in a group, which is realized by Non-Patent Literature 4.

Similarly, for example, the present Embodiment can be applied to the scheme described in Non-Patent Literature 1, the scheme described in Non-Patent Literature 3, or all the existing secure search schemes.

Furthermore, the system described in the present Embodiment is a high speed system not dependent on what is used as the existing secure search scheme, the existing encryption scheme A or the existing encryption scheme B.

Thus, it is also possible to use RSA (registered trademark) (Rivest Shamir Adleman) encryption, and the like, which are generally used.

In the present Embodiment, there has been described a method of accelerating the secure search technology based on probabilistic encryption.

Generally, from a viewpoint of search time for secure search, the scheme based on deterministic encryption is faster, but however, it has a problem that a plain text is able to be inferred by analyzing frequency of appearance of encrypted data.

On the other hand, as to the scheme based on probabilistic encryption, since frequency of appearance of encrypted data has no relation to frequency of appearance of a keyword, it is safe against the inference of a plain text by analyzing frequency of appearance, but it has a problem that search processing takes a lot of time.

However, since the present Embodiment is based on probabilistic encryption, it has an advantage in that searching is performed at high speed, whereas security remains against the analysis by frequency of appearance.

Furthermore, encrypted data or indexes are generated and managed for each set of a group name and a user name.

Therefore, when a user performs searching, it is not necessary to perform searching of index information which includes encrypted data that the user is not allowed to read, thereby greatly improving the search processing.

The disclosure range of encrypted data is determined by a group name and a user name. Generally, it is expected that the number of encrypted data stored for each disclosure range may be different from each other.

In the present Embodiment, disclosure of a group determination key is performed for an index associated with a set of a group name and a user name.

Therefore, the balance between security and rapidity can be adjusted for each disclosure range.

When acquiring an encrypted tag to be a search target from index information by using grouping information included in a search query, not only an encrypted tag associated with a node corresponding to the grouping information but also encrypted tags associated with all nodes higher order than the node are search targets.

Therefore, even if a search query is received while index information is being reconstructed after additionally receiving a group determination key, it is possible to perform checking without excluding the encrypted tag to be a search target.

Since Non-Patent Literature 4 employing hierarchical ID-based encryption is used when generating grouping information, it is possible to reduce the communication volume used for sending a grouping information generation key to a user.

Specifically, for generating L grouping information generation keys, it is only necessary to send a group name, a user name, and a maximum number of hierarchical layers L, and to set the received values in the grouping information ID hierarchical structure in the access terminal apparatus 301, and therefore, the communication cost can be reduced.

Since a plurality of group names and user names are received when generating encrypted data, even if there are a plurality of users and groups as disclosure destinations, it is possible according to the present system to disclose encrypted data to a plurality of disclosure destinations and increase the search speed without depending on the number of disclosure destinations.

Since a keyword to be associated with encrypted data may be automatically extracted from a text, may be specified by a user, or may be generated by combining both of them, it is possible to add a keyword which would be specified at the time of searching, as intended by the user.

Since it is configured such that high-speed common key encryption such as AES and Camellia (registered trademark) can be used in encrypting data, even if data has a large size, such as video data and music data, it is possible to perform encryption at high speed.

Since the key management server apparatus 201 has a user ID information database, even if a user does not know a group name or user name of a user who is able to decrypt encrypted data, a proper group name or user name can be acquired based on another information, such as an e-mail address known by the user. Therefore, it is possible to prevent a disclosure range of encrypted data from being set mistakenly.

Besides, it can help to generate grouping information or an encrypted tag.

(Non-Binary Tree Also Applicable)

In the present Embodiment, an example of configuring binary-tree-structured index information has been described.

However, there is no need to restrict to an index generated in a binary tree structure. As long as an index is generated from grouping information, it may be in a more general tree structure, or in a hash table structure.

Besides, it is not necessary to store a binary tree which is generated as index information in a disk while maintaining its structure. As shown as an example, it may be given an assigned node number and stored in a tabular form, or may be stored in other data format.

(No Need to Restrict Grouping Information to 1 Bit)

In the present Embodiment, encrypted i-th information of grouping information is generated by encrypting the i-th bit of a bit sequence generated from a keyword.

However, it is not necessary to perform encryption per bit. Encrypted i-th information may be generated using information of two or more bits.

For example, it is also possible to generate encrypted i-th information by generating a bit sequence of 2L bits from a keyword and encrypting its (2i−1)th bit and 2i-th bit.

(Information Used for Grouping Information)

In the present Embodiment, an example is described in which 1-bit information, such as 0 or 1, is included in encrypted i-th information of grouping information.

However, it is sufficient if a left-side child node or a right-side child node of a binary tree is selected by using encrypted i-th information of grouping information. Therefore, it does not necessarily need to be 1-bit information of 0 or 1.

For example, it is possible to previously generate encrypted i-th information by specifying an arbitrary value as the i-th information, and, in the case of an even number, it may be assigned as a left-side child node, and in the case of an odd number, it may be assigned as a right-side child node.

Otherwise, it is also possible to previously generate encrypted i-th information by specifying a value between 0 and 100 as the i-th information, and in the case of less than 50, it may be assigned as a left-side child node, and in the case of 50 or more, it may be assigned as a right-side child node.

Thus, a value specified as the i-th information may be any information as long as it is associated with a child node determination method.

(Group Determination Key May be Based on Embodiment 2)

In the present Embodiment, information of "0"/"1" for selecting a left-side child node or a right-side child node of a binary tree is acquired by decrypting encrypted i-th information of grouping information with a group determination key.

However, it does not necessarily need to be what is described above. For example, as described in the second embodiment, it is also possible to have a scheme in which the i-th information is generated at the data center apparatus 401 side by using a group determination key (for an encrypted tag) and a group determination key (for a search query).

In this case, even the value which is set as grouping information is not known by the data center apparatus 401. Accordingly, even if it is a hash value of a keyword, it is difficult to infer the keyword, thereby increasing the security.

(No Need to Encrypt all Grouping Information)

In the present Embodiment, all the bits are encrypted when generating grouping information. However, it is also possible to send information still in a plain text without encrypting a part or all of it.

For example, in the case of the number of group determination keys held by the data center apparatus 401 side being known, even if corresponding bits are encrypted, they will be decrypted at the data center apparatus 401 side. Therefore, it is also possible to send them remaining in a plain text.

(Non-Hash Value Also Applicable)

In the present Embodiment, as it has been exemplified, a hash function such as SHA-2 is used when generating a bit sequence of L bits from a keyword. However, any algorithm is preferable as long as a bit sequence of L bits can be obtained from it.

For example, a hash function other than SHA-2 may be used, or alternatively, a keyed hash such as HMAC, common key encryption such as AES, or public key encryption such as RSA (registered trademark) encryption may also be used.

When using a keyed hash, common key encryption, or public key encryption, a hash key, a common key, or a secret key needs to be distributed in addition to a grouping information generation key.

It is also possible to generate a random number of L bits by a pseudo random number generation algorithm, using a keyword as a seed of a random number.

In addition, a correspondence table between a keyword and an L-bit sequence may also be used.

Particularly, when using a correspondence table of an L-bit sequence, since generation frequency of the L-bit sequence can be equalized in consideration of appearance frequency of a keyword, it can be expected that security may be further improved.

(The Number of Group Determination Keys to be Disclosed)

In the present Embodiment, there is described an example based on an assumption that a user discloses a group determination key one by one. However, there is no need to restrict to one by one each time. Thus, it is also possible to disclose two or three group determination keys at a time.

(Time to Generate Group Determination Key)

In the present Embodiment, a grouping information ID hierarchical structure has previously been defined before using the system, and then, when a user generates grouping information, a group name, a user name, and a hierarchical layer number are specified to generate a grouping information generation key.

However, grouping information generation keys may be collectively issued before using the system, at the time of issuing a user secret key, or the like.

Particularly, when using AES, RSA (registered trademark) encryption, or the like as the existing encryption scheme, it is necessary to generate grouping information generation key before performing encryption.

(No Restriction to the Number of ID Hierarchical Layers)

In the present Embodiment, there is described an example of specifying a user or a group being able to decrypt and search, by using two kinds of information, a group name and a user name, in the tag ID hierarchical structure, the grouping information ID hierarchical structure, and the decrypter ID hierarchical structure.

However, there is no need to restrict to these two kinds. For example, three kinds, a department name, a division name, and a name may be used, or only a name may also be used.

It is also possible to specify a recipient by using more information.

(No Need to Use ID in Common)

In the present Embodiment, there is described an example of setting the same values as a group name and setting the same value as a user name when generating tagged encrypted data between the tag ID hierarchical structure, the grouping information ID hierarchical structure, and the decrypter ID hierarchical structure.

However, it is also possible to set, not the same value, but different values.

For example, in the case of generating a group determination key by an administrator, not by a user, the group name and the user name of the user being the disclosure destination should be previously set in the tag ID hierarchical structure and the decrypter ID hierarchical structure, and the group name and the user name of the administrator who is able to generate a group determination key should be specified in the grouping information ID hierarchical structure.

When intending to allow the user only to perform searching and not intending to allow him or her to decrypt encrypted data itself, the group name and the user name of the user should be set in the tag ID hierarchical structure, and the group name and the user name of another user who is able to decrypt should be set in the decrypter ID hierarchical structure.

(Hierarchization of Key Management Server Apparatus 201)

In the present Embodiment, an example of there being one key management server apparatus 201 is described, but, however, there is no need to restrict to one.

For example, in the scheme of Non-Patent Literature 4 or other secure search scheme, there exists a description that a key management server apparatus also has a hierarchical structure, and functions are separately operated by a plurality of apparatuses.

It is also possible that the key management server apparatus of the present Embodiment has a hierarchical structure to be utilized.

(Non-ID Based Encryption Also Applicable)

In the present Embodiment, there is described an example of using the existing secure search scheme, the existing encryption scheme A, and the existing encryption scheme B based on ID based encryption.

However, there is no need to restrict to the scheme based on ID based encryption. Common key encryption such as AES, Camellia (registered trademark) or HMAC, or public key encryption such as RSA (registered trademark) encryption can also be used.

(Public Parameter can be Used in Common)

In the present Embodiment, there is described an example of using the existing secure search scheme, the existing encryption scheme A, and the existing encryption scheme B based on ID based encryption, and using public parameters being different from each other.

However, it is also possible to use a part of information of a public parameter, such as an elliptic curve to be used, in common. Therefore, it is acceptable to standardize what can be standardized.

(The Number of Keywords)

In the present Embodiment, the case of using one search keyword is described. However, it does not necessarily need to restrict to one search keyword.

For example, in the case of there being a plurality of search keywords, it is also possible to generate a search query for each keyword and transmit all the search queries to the data center apparatus 401.

At that time, it is also possible to transmit arbitrary conditions, such as to acquire encrypted data which was determined to be "hit" by one search query or to acquire encrypted data which was "hit" by both the search queries A and B.

(No Need to Check Tags)

In the present Embodiment, all the encrypted tags acquired from the index management unit 405 are collated with search queries.

However, with respect to encrypted data that was determined to be "hit" in searching, it does not necessarily need to check encrypted tags associated with the encrypted data since afterwards. Besides in the case that returning ten results is sufficient as search results, if search results more than the specified number are found, it does not necessarily need to check the subsequent encrypted tags.

(Necessity or Unnecessity of User ID Information Database)

In the present Embodiment, a user ID information database is provided in the key management server apparatus 201, and a user secret key is generated based on the data therein.

However, the user ID information database is not indispensable. A user ID may be specified by the administrator of the key management server apparatus 201 when issuing a user secret key, or may be received from the access terminal apparatus 301.

(Assumption of "Access Terminal Apparatus 301=User", IC Card Usage)

The present Embodiment is described on the assumption that the access terminal apparatus 301 is operated by one user.

However, it is also possible to have a structure in which the access terminal apparatus 301 is not exclusively used by one user, but used by a plurality of persons.

In that case, since one user secret key is assigned to each user in the user secret key management unit 305, it is desirable to keep a plurality of user secret keys and to determine which user secret key should be used, after authenticating an operator by the access terminal apparatus 301.

Furthermore, it is also possible to store and manage a user secret key in an employee ID card, and the like.

In that case, the user secret key management unit 305 is a function equivalent to an IC card. However, in the case of performing all processing that uses a user secret key by an IC card, a part of processing of the search query generation unit 306, the data decryption unit 307, and the group determination key generation unit 308 may be performed by the IC card according to necessity.

(Encryption Scheme for Data Body)

In the present Embodiment, there is described an example of automatically using AES or Camellia (registered trademark) when encrypting data. The method to be used may be determined in advance in the system, or may be set by the user.

(Search Result Returning Method)

In the present Embodiment, there is described an example of returning all the encrypted data that was hit as a result of search. However, it does not necessarily need to return all the encrypted data once at the time of search.

For example, it is also possible to return some of hit encrypted data, or alternatively, return only the number or only the list of encrypted data.

(System Configuration Variation)

In the present Embodiment, there is described an example where the key management server apparatus 201 and the access terminal apparatus 301 are in a company and the data center apparatus 401 exists as an external service connected to the Internet, etc.

However, the present invention is not limited to such a system configuration.

For example, the data center apparatus 401 may be in a company, and the key management server apparatus 201 and the access terminal apparatus 301 may be connected to a network outside the company.

In the present Embodiment, it has been described that the grouping information generation unit 310 of the access terminal apparatus 301 extracts a bit sequence of L bits, where the number L is the same as the maximum number of hierarchical layers of nodes of index information, from a hash value of a storage keyword, and encrypts the extracted bit sequence of L bits by the ID-based encryption scheme so as to generate grouping information.

In other words, the grouping information generation unit 310 (the index derive bit sequence generation unit, the concealing processing unit) generates a storage index derive bit sequence by extracting a bit sequence, whose number of bits is the same as the maximum number specified as allowed bit positions, from a bit sequence of random numbers uniquely obtained from the storage keyword, and encrypts the generated storage index derive bit sequence by the ID-based encryption scheme.

In the present Embodiment, it has also been described that the grouping information generation unit 310 may sequentially extract L bits from a hash value of the storage keyword, or alternatively may non-sequentially extract L bits, such as the first bit, the third bit, the sixth bit, and the eleventh bit.

In other words, when generating the storage index derive bit sequence, the grouping information generation unit 310 may extract sequential bits, whose number is the same as the maximum number specified as the allowed bit positions, from the bit sequence of random numbers uniquely obtained from the storage keyword, or may extract non-sequential bits, whose number is the same as the maximum number specified as the allowed bit positions.

In the present Embodiment, it has been described that the grouping information generation unit 310 generates grouping information by encrypting each bit of a bit sequence of L bits by using a different grouping information generation key for each bit.

In other words, the grouping information generation unit 310 uses a different encryption key per unit of bit for encryption of the storage index derive bit sequence.

In the present Embodiment, it has been described that the grouping information generation unit 310 can generate L grouping information generation keys by specifying a wildcard for at least one of a group name and a user name of the grouping information ID hierarchical structure (FIG. 13).

In other words, the grouping information generation unit 310 defines user information on a user who is allowed to access storage target data by using a wildcard, and encrypts the storage index derive bit sequence with an encryption key to which the user information defined using the wildcard is reflected.

In the present Embodiment, it has been described that, when the encrypted data management unit 404 stores the encrypted data of the storage target associating the encrypted data with an encrypted tag, the index management unit 405 of the data center apparatus 401 decrypts grouping information with a group determination key, and stores a node number obtained by the decryption and the encrypted tag associating them with each other.

In other words, when the encrypted data management unit 404 stores the encrypted data of the storage target associating the encrypted data with tag data, the index management unit 405 decrypts an encrypted bit at an allowed bit position in an encrypted bit sequence with an allowed bit decryption key, derives an index value from a bit value obtained by the decryption, and stores the derived index value and the tag data relating them with each other.

In the present Embodiment, it has been described that, on receiving a search query, the index management unit 405 extracts a set of an encrypted tag and a management number, which are corresponding to a node obtained by decrypting grouping information, and furthermore, extracts all the sets of an encrypted tag and a management number, which are associated with a parent node of the node concerned, and sends them to the search processing unit 406.

In other words, the index management unit 405 decrypts an encrypted bit at an allowed bit position in an encrypted bit sequence included in a search request, derives an index value from a bit value obtained by the decryption at the allowed bit position, extracts tag data corresponding to an index value being the same as the derived index value, derives an index value from bit values obtained by decrypting encrypted bits at allowed bit positions except for the lowest order allowed bit position in the allowed bit positions, and extracts tag data corresponding to an index value being the same as the derived index value.

Embodiment 2

In the first embodiment, hierarchical ID-based encryption is used as the existing encryption scheme A for generating grouping information. Now, there will be described an embodiment in which grouping information can be included in a tag itself by using inner-product predicate encryption of Non-Patent Literature 5.

First, the outline of the inner-product predicate encryption of Non-Patent Literature 5 will be explained.

In the inner-product predicate encryption, an arbitrary message can be encrypted by using a vector called an attribute vector as a public key.

A vector called a predicate vector is embedded in a user secret key. As to this predicate vector, a different vector is used for each user in many cases.

Only when an inner-product of an attribute vector embedded in encrypted data and a predicate vector embedded in a user secret key is 0 (zero), the encrypted data can be decrypted with the user secret key.

When an inner-product is not 0, decryption cannot be correctly performed in this scheme.

In the conventional ID based encryption, an ID is used as a public key, and an ID is embedded also in a user secret key.

Only when the IDs are identical, encrypted data can be decrypted with the user secret key.

Therefore, it is possible to regard the inner-product predicate encryption as a generalized ID based encryption.

Furthermore, since the inner-product predicate encryption is characterized in that a logical expression, such as "AND" or "OR", can be evaluated by using an inner-product of vectors, it also has a feature of being able to specify decryption conditions more flexibly than the ID based encryption.

Since a configuration example of the secure search system 100 in the present Embodiment is the same as that of FIG. 1 of the first embodiment, description of it will be omitted.

Furthermore, since functional blocks of the key management server apparatus 201 and the data center apparatus 401 are the same as those of FIGS. 2 and 3 of the first embodiment, description of them will be omitted.

Figure 23:
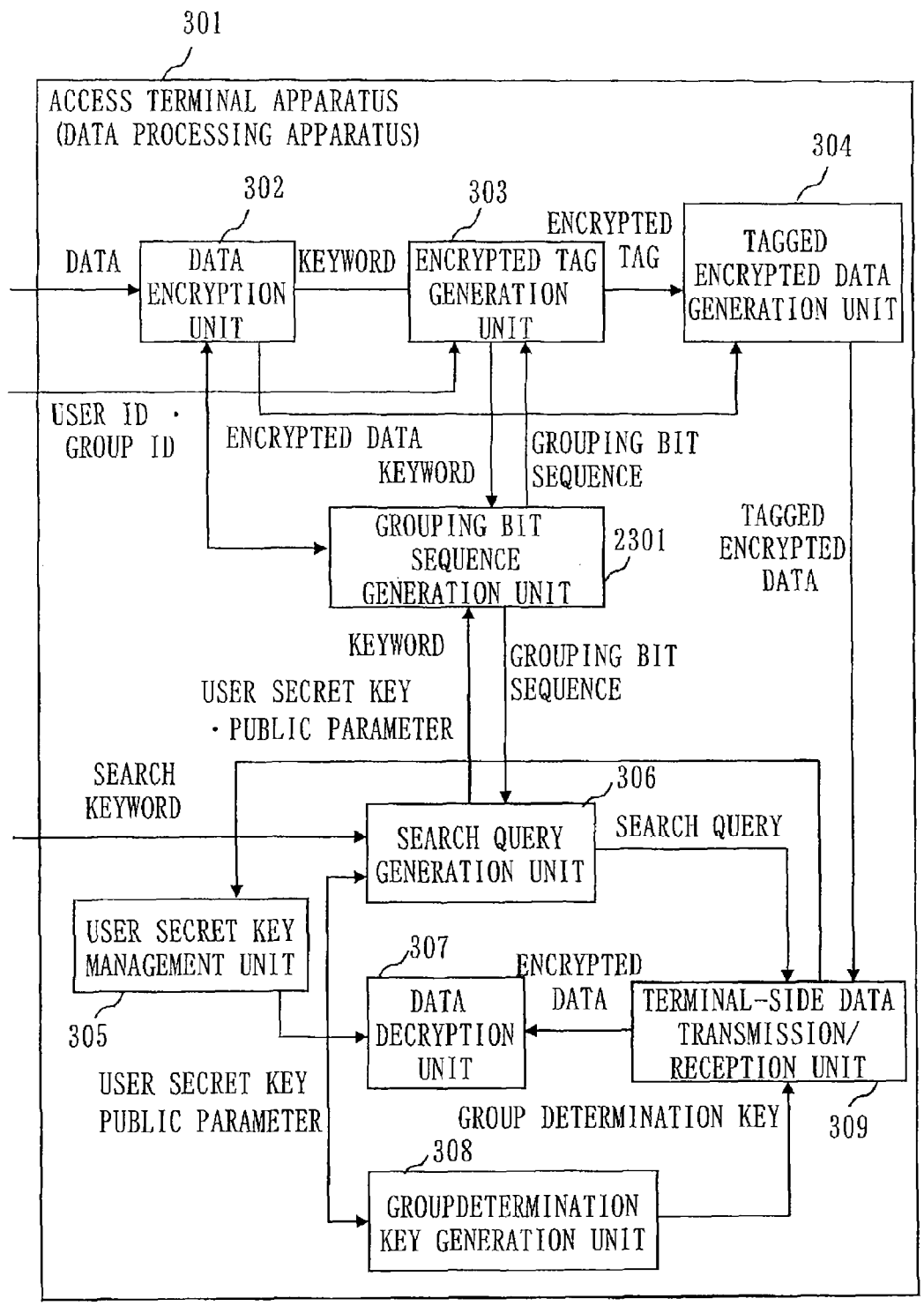
FIG. 23 shows a configuration example of an access terminal apparatus according to a second embodiment.

FIG. 23 is a functional block diagram showing a configuration of the access terminal apparatus 301.

The data encryption unit 302, the encrypted tag generation unit 303, the tagged encrypted data generation unit 304, the user secret key management unit 305, the search query generation unit 306, the data decryption unit 307, and the terminal-side data transmission/reception unit 309 are the same as those shown in FIG. 3 of the first embodiment.

A grouping bit sequence generation unit 2301 generates, from a keyword, a grouping bit sequence of a keyword to be included in an encrypted tag and a search query.

The grouping bit sequence generation unit 2301 is a component corresponding to the grouping information generation unit 310 of the first embodiment, thereby is equivalent to an example of the index derive bit sequence generation unit and an example of the concealing processing unit.

The group determination key generation unit 308 generates a group determination key to be sent to the data center apparatus 401 in order to generate an index value, by using a user secret key and a public parameter managed by the user secret key management unit 305.

The group determination key is composed of two kinds of keys: a group determination key (for an encrypted tag) used for grouping of encrypted tags, and a group determination key (for a search query) used for determining which group's encrypted tag a search query is referring to.

Also in the present Embodiment, the group determination key generation unit 308 is equivalent to an example of the allowed bit position specification unit and an example of the concealing processing unit.

Next, a processing flow of system initial setting will be described.

Although the processing flow itself is similar to the method described in the first embodiment, due to difference of algorithms of the existing secure search scheme or the existing encryption scheme, the contents of the processing are a little different.

Thus, using the flow of processing in FIG. 5 of the first embodiment, explanation will be given focusing on the difference.

First, since the processing of Step S501 is the same as that of the first embodiment, description of it will be omitted.

In Step S502, the master key generation unit 202 determines to use the inner-product predicate encryption described in Non-Patent Literature 5, as an existing secure search scheme and an existing encryption scheme used by the secure search system 100.

The existing secure search scheme is used for generating an encrypted tag including grouping information, and the existing encryption scheme is used for encrypting a data body.

As a method to use the existing secure search scheme, the number of tag ID hierarchical layers, a tag ID hierarchical structure and a structure of a vector given to inner-product predicate encryption are determined.

Figure 29:
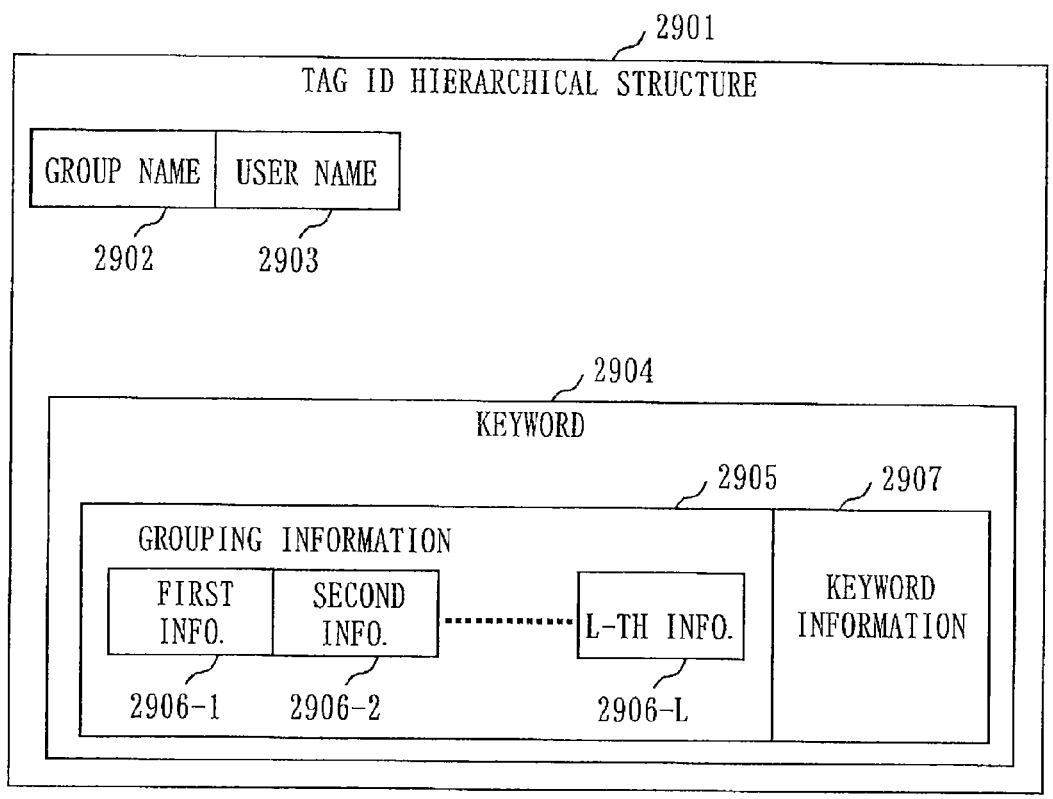
FIG. 29 shows an example of a tag ID hierarchical structure according to the second embodiment.

For example, as shown in the tag ID hierarchical structure of FIG. 29, it is determined that a tag ID has a structure of three hierarchical layers: a group name section to store the name of a group such as a department and a division to which a user who is able to search belongs, a user name section to store the name of a user, and a keyword section to set a keyword associated with data, and the like.

It is also determined that the keyword section is composed of two elements, grouping information and keyword information, and the grouping information is composed of elements, from the first information to the L-th information, and the like.

Based on an assumption that when all elements of the tag ID hierarchical structure are identical, it results in a hit in the search, correspondingly to this, a generation method of a tag ID predicate vector and a tag ID attribute vector is determined.

An example of generation of a tag ID predicate vector $v_T$ is shown in FIG. 30, and an example of generation of a tag ID attribute vector $x_T$ is shown in FIG. 31.

For example, when deriving an element of a vector from a group name of the tag ID hierarchical structure, a tag ID predicate vector should be $(v1, v2)=(1, -\text{"group name"})$, and a tag ID attribute vector should be $(x1, x2)=(\text{"group name"}, 1)$.

When calculating an inner product of both the vectors, the inner product value is 0 only when the group names are identical. When the group names are different from each other, the inner product value is other than 0 (zero).

Similarly, the user name, the i-th information, and residual bit information are to be related to the value of the vector.

As an exception, when an element is a wildcard, the vector is $(0, 0)$.

For example, when the wildcard is specified as the user name, a tag ID predicate vector should be $(v3, v4)=(0, 0)$, and a tag ID attribute vector should be $(x3, x4)=(0, 0)$.

When the wildcard is specified as other element, the element can be related to the vectors similarly.

When each parameter is related to the vectors in the manner shown in the figures, each parameter described in the master key generation algorithm (Setup) of Non-Patent Literature 5 is as follows: $n=6+2L$, $d=3+L$, $\mu1=2$, $\mu2=4$, ..., $\mu(3+L)=6+2L$.

The master key generation unit 202 determines a decrypter ID hierarchical layer number and a decrypter ID hierarchical structure, as a method to use the existing encryption scheme for encrypting storage target data.

In the present Embodiment, let us assume that the number of decrypter ID hierarchical layers is two and the decrypter ID hierarchical structure is composed of a group name and a user name similar to the first embodiment.

Based on an assumption that when all elements of the decrypter ID hierarchical structure are identical, it results in a hit in the search, correspondingly to this, a generation method of a decrypter ID predicate vector and a decrypter ID attribute vector is derived.

An example of generation of a decrypter ID predicate vector $v_D$ is shown in FIG. 32, and an example of generation of a decrypter ID attribute vector $x_D$ is shown in FIG. 33.

The derivation method of each element of a vector is the same as the case of a tag ID.

In that case, each parameter described in the master key generation algorithm of Non-Patent Literature 5 is as follows: $n=4$, $d=2$, $\mu1=2$, and $\mu2=4$.

Since Step S503 is the same as that of the first embodiment, description of it will be omitted.

In Step S504, the master key generation unit 202 performs a master key generation algorithm of the existing secure search scheme for the present system so as to generate a master key for secure search and a public parameter for secure search.

Similarly, the master key generation unit 202 performs a master key generation algorithm of the existing encryption scheme so as to generate a master key for encryption and a public parameter for encryption.

Henceforth, the master key for secure search and the master key for encryption will be collectively called a master key, and the public parameter for secure search and the public parameter for encryption will be collectively called a public parameter.

Since Steps S505 and S506 are the same as those in the first embodiment, description of them will be omitted.

By performing the steps described above, the setup of the present secure search system has been completed.

Next, a processing flow of issuing a user secret key will be described.

Although the processing flow itself is similar to the method described in the first embodiment, due to difference of algorithms of the existing secure search scheme or the existing encryption scheme, the contents of the processing are a little different.

Thus, using the flow of processing in FIG. 6 of the first embodiment, explanation will be given focusing on the difference.

Since Step S601 is the same as that of the first embodiment, description of it will be omitted.

In Step S602, the user secret key generation unit 204 generates a user secret key for secure search used for generating a search query, and a user secret key for encryption used for decrypting encrypted data.

In the existing secure search scheme, a tag ID hierarchical structure needs to be specified when a user secret key for secure search is generated. The user secret key generation unit 204 sets the group name and the user name acquired in S601 in the group name section and the user name section respectively, and specifies all the elements in the keyword section as delegatable elements.

The user secret key for secure search can be generated by generating a tag ID predicate vector by vectorizing the tag ID hierarchical structure, in which the above values are set, based on the vector generation rule determined in Step S502, and by performing a user secret key generation algorithm (GenKey) of the existing secure search scheme.

Similarly, a decrypter ID hierarchical structure needs to be specified when a user secret key for encryption is generated in the existing encryption scheme. The user secret key generation unit 204 generates a user secret key for encryption by setting the group name and the user name acquired in S601 in the group name section and the user name section respectively, by generating a decrypter ID predicate vector by vectorizing the decrypter ID hierarchical structure, in which the above values are set, based on the vector generation rule determined in Step S502, and by performing a user secret key generation algorithm of the existing encryption scheme.

The above generated user secret key for secure search and user secret key for encryption will be collectively called as a user secret key.

Since Steps S603 and S604 are the same as those in the first embodiment, description of them will be omitted.

By performing the steps described above, the key management server apparatus 201 can issue a user secret key to a user who operates the access terminal apparatus 301.

Figure 24:
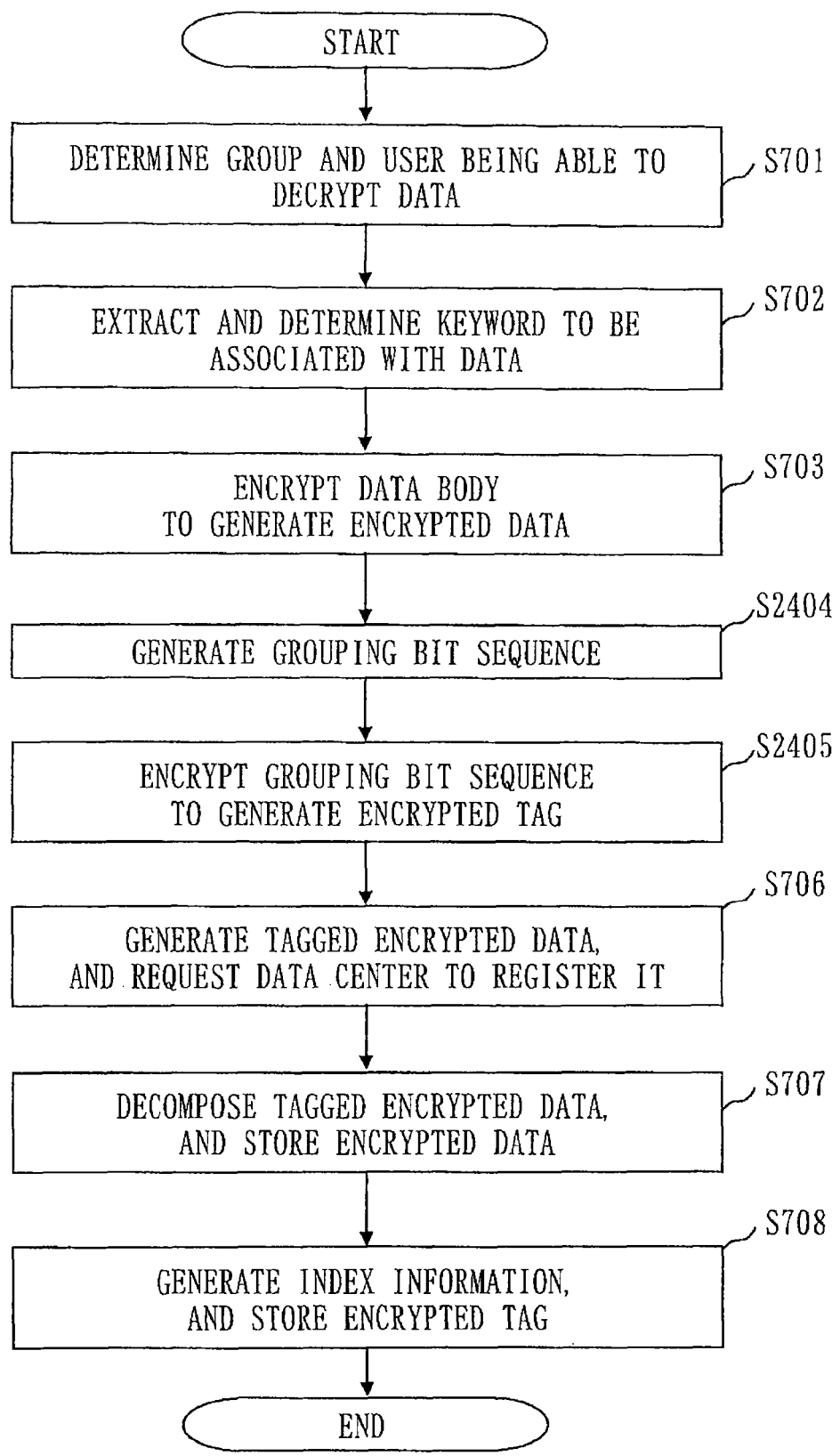
FIG. 24 is a flowchart showing an example of data encryption processing according to the second embodiment.
Figure 25:
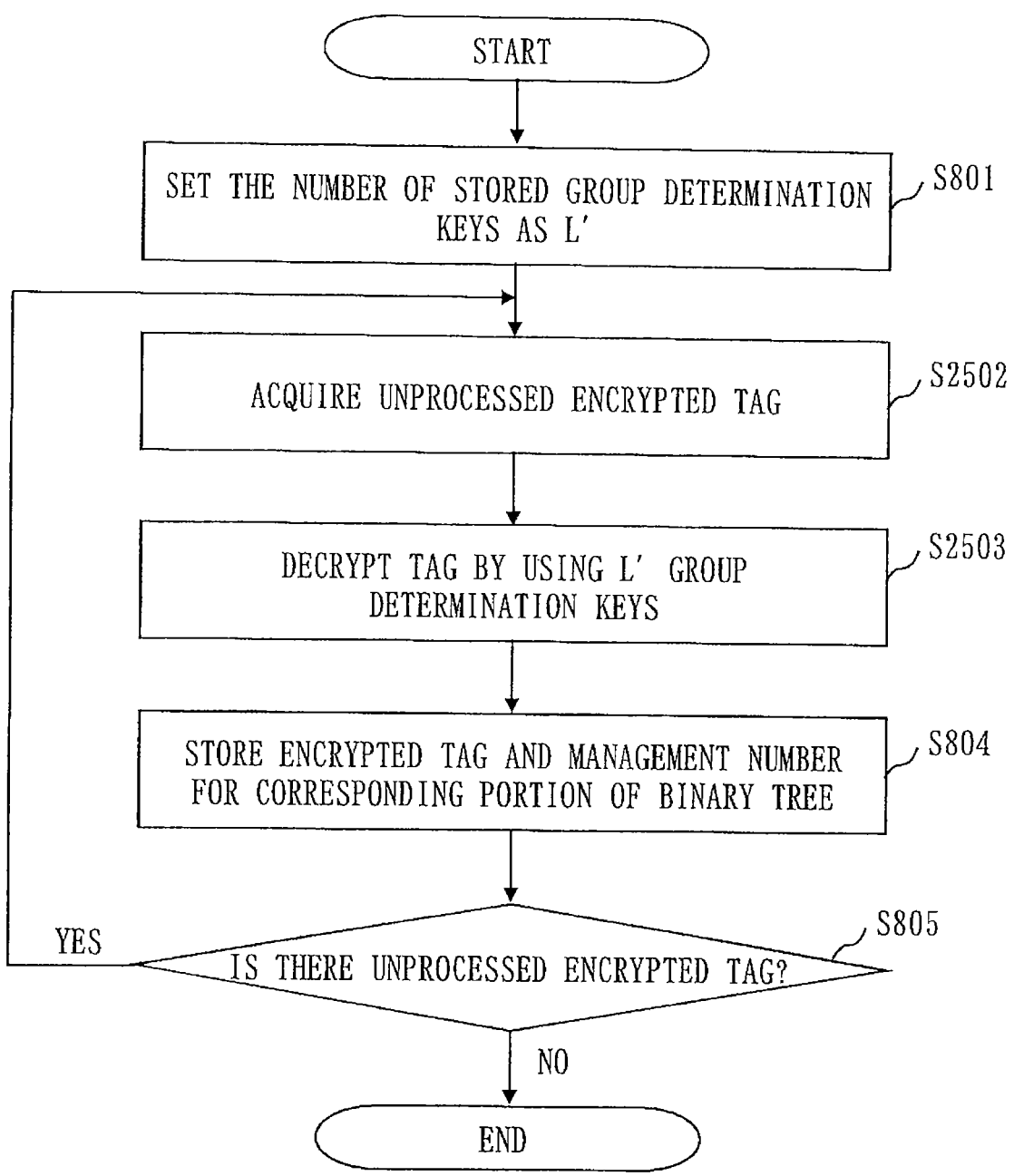
FIG. 25 is a flowchart showing an example of storage processing of an encrypted tag according to the second embodiment.

The flow of data encryption processing will be described with reference to FIGS. 24 and 25.

Although the processing flow itself is similar to the method described in the first embodiment, due to difference of algorithms of the existing secure search scheme or the existing encryption scheme, the contents of the processing are a little different.

Thus, explanation will be given focusing on the difference from the processing flow described in the first embodiment.

Since Steps S701, S702 and S703 are the same as those of the first embodiment, description of them will be omitted.

In Step S2404, the grouping bit sequence generation unit 2301 receives a keyword to be associated with data, and generates a grouping bit sequence for each keyword.

Specifically, the grouping bit sequence generation unit 2301 generates a bit sequence of L bits and arbitrary keyword information, based on the keyword.

For example, a hash value of a keyword is generated by using a hash function such as SHA-2, and arbitrary L bits are extracted from the generated hash value to generate a bit sequence of L bits. Then, keyword information can be generated by treating a bit sequence of arranged remaining bits or the whole of hash values is used as keyword information.

In Step S2405, the encrypted tag generation unit 303 generates an encrypted tag by encrypting a grouping bit sequence.

Specifically, the encrypted tag generation unit 303 respectively specifies the group name and the user name received in S701 in the group name section and the user name section of the tag ID hierarchical structure, and the grouping bit sequence generated in S2404 in the keyword section, generates a tag ID attribute vector from the tag ID hierarchical structure in which the above values are set, and generates a tag by an encryption algorithm (Enc) of the existing secure search scheme.

This tag is specified as an encrypted tag.

Although a method of generating a tag for secure search is not explicitly described in Non-Patent Literature 5, it is generally known to perform as described below so as to generate the tag.

First, a random number R is selected, and by encrypting this random number R by using a tag ID attribute vector, a ciphertext C is obtained.

A set of the random number R and the ciphertext C serves as a tag.

Since what is described above is processing for one keyword, this processing is performed for all the keywords associated with data.

In the case of receiving a plurality of group names and user names in S701, an encrypted tag is generated for each of all the groups of a group name and a user name.

In Step S706, the tagged encrypted data generation unit 304 generates tagged encrypted data by combining the encrypted data generated in S703 and the encrypted tag generated in S2405, and sends the tagged encrypted data to the data center apparatus 401, as a storage request.

At this time, in order to facilitate storing the tagged encrypted data in the data center apparatus 401, the tagged encrypted data generation unit 304 sends both the group name and the user name received in S701.

Figure 34:
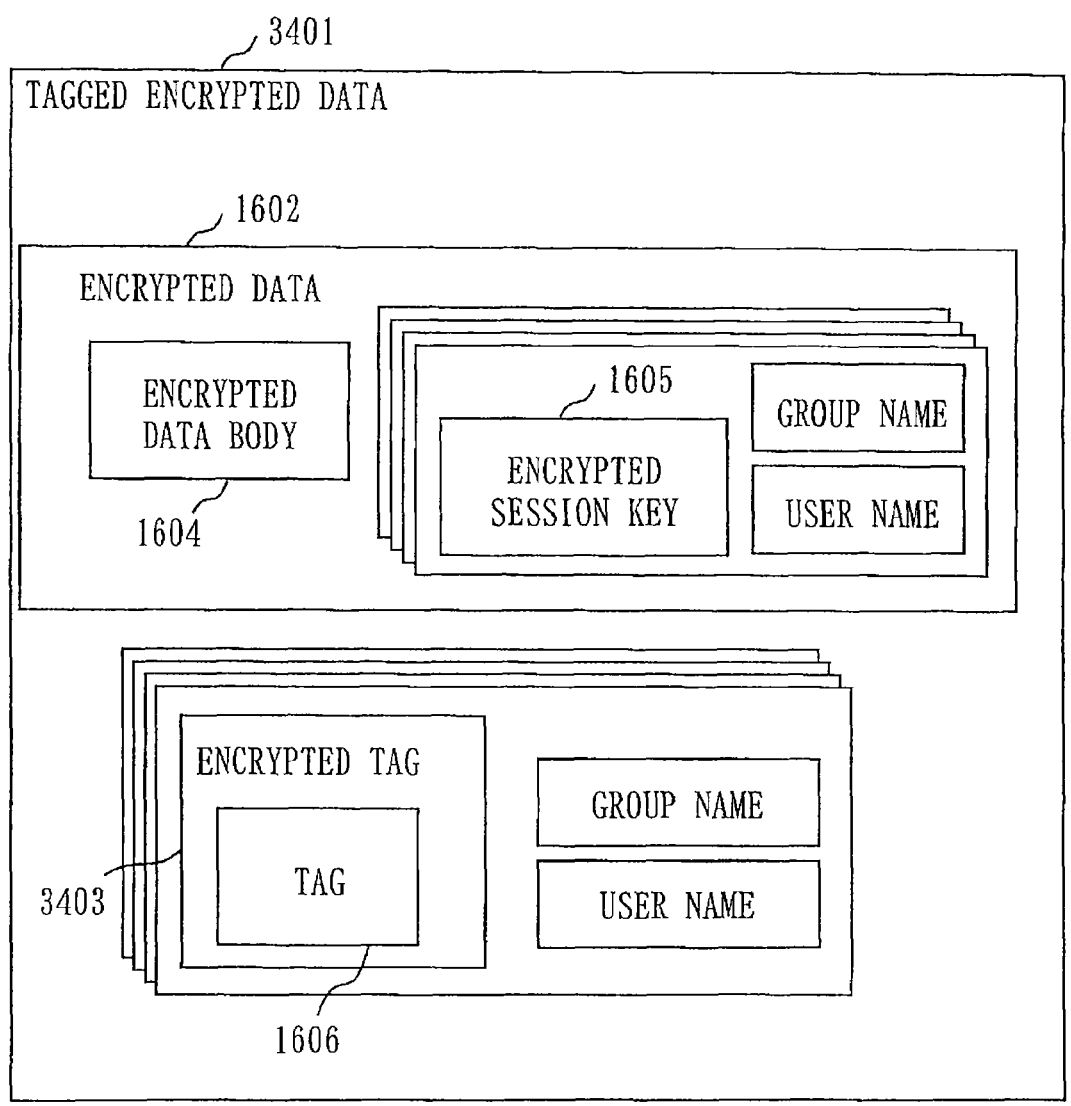
FIG. 34 shows an example of tagged encrypted data according to the second embodiment.

Since the generation processing of an encrypted tag in Step S2405 has been changed a little, in the tagged encrypted data shown in FIG. 34, the configuration of an encrypted tag has been changed from that shown in FIG. 16 of the first embodiment.

Since the processing of Step S707 is the same as that of the first embodiment, description of it will be omitted.

Next, the processing of Step S708 will be described in detail with reference to FIG. 25.

Similarly to the first embodiment, index information should also be managed for each group name and user name.

Since the processing of Step S801 is the same as that of the first embodiment, description of it will be omitted.

In Step S2502, the index management unit 405 extracts one unstored encrypted tag (=tag) from a plurality of encrypted tags received in S707.

In Step S2503, the index management unit 405 decrypts a tag by using each group determination key (for an encrypted tag) in the L' group determination keys extracted in Step S801.

Specifically, for example, the index management unit 405 decrypts a ciphertext C of a tag (R, C) with a group determination key (for an encrypted tag) corresponding to the first hierarchical layer. When the decryption result is the same as the random number R, the first information shall be 0, and when it is not the same, the first information shall be 1.

By performing the same procedure, the first information to the L'-th information are determined.

Since the processing of Steps S804 and S805 are the same as those of the first embodiment, description of them will be omitted.

By performing the steps described above, the access terminal apparatus 301 can encrypt data, and request the data center apparatus 401 to store it, and the data center apparatus 401 can store the received tagged encrypted data.

Figure 26:
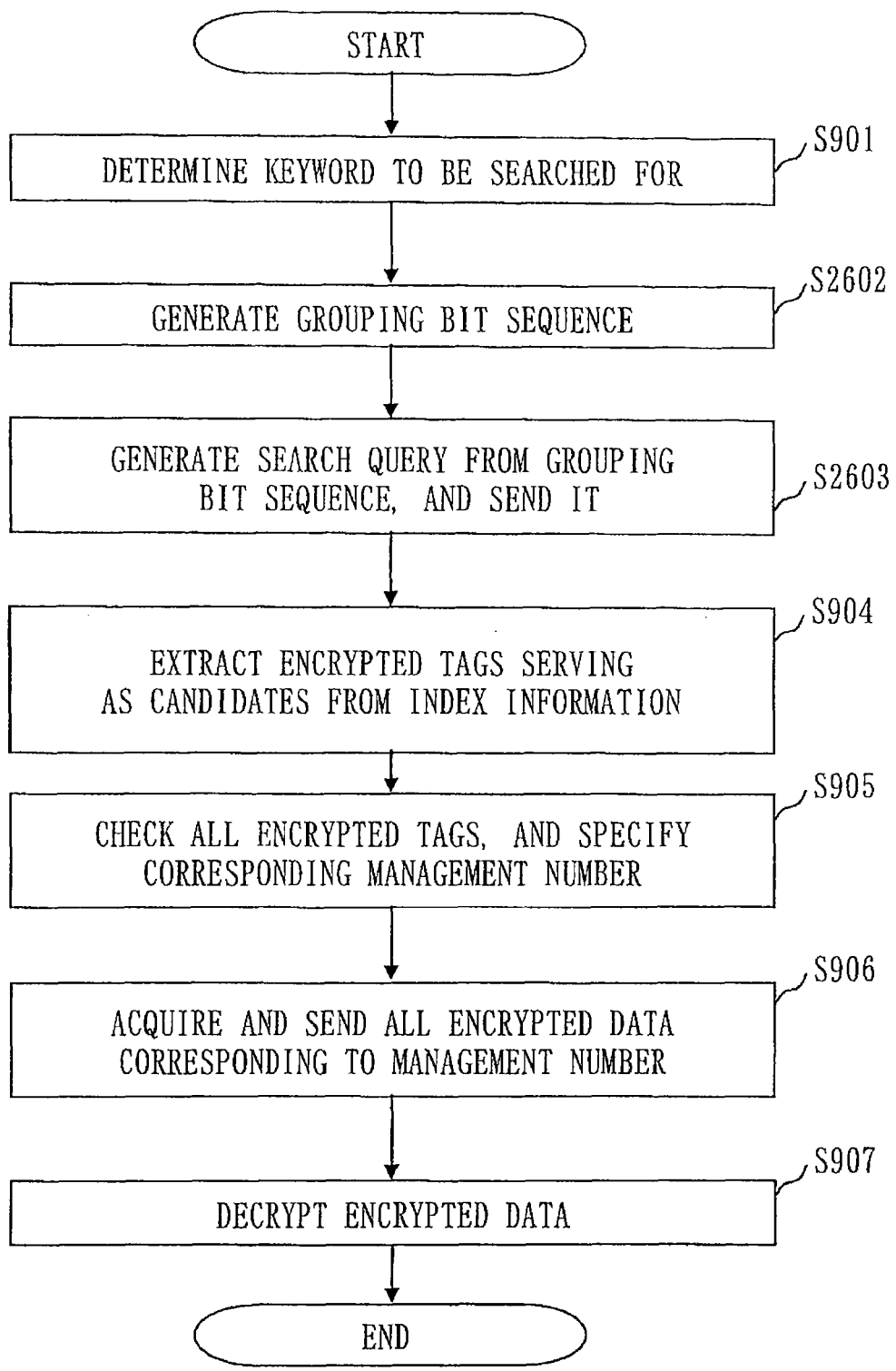
FIG. 26 is a flowchart showing an example of search processing of encrypted data according to the second embodiment.
Figure 27:
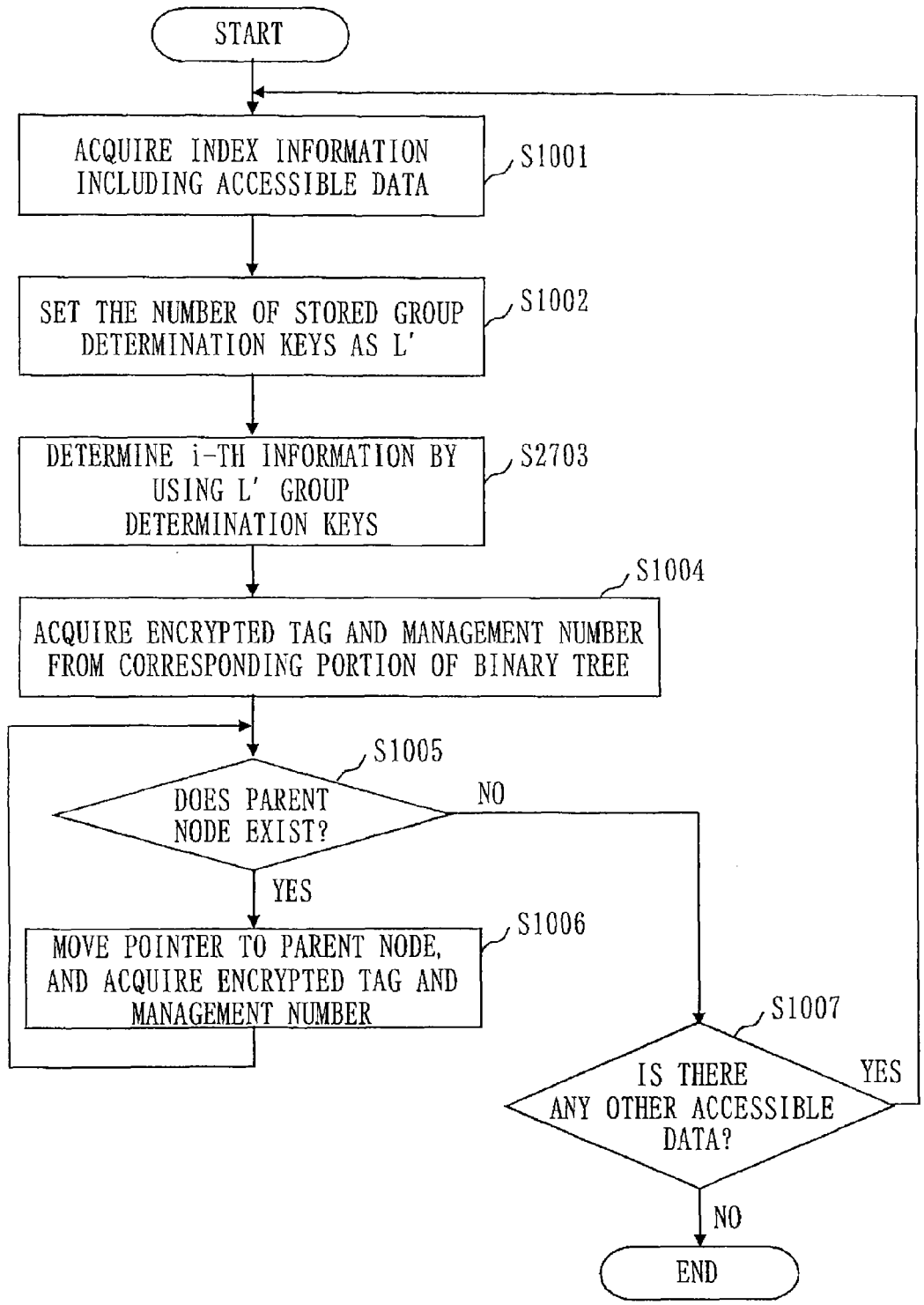
FIG. 27 is a flowchart showing an example of acquisition processing of an encrypted tag according to the second embodiment.

Next, search processing of encrypted data will be described based on FIGS. 26 and 27.

Although the processing flow itself is similar to the method described in the first embodiment, due to difference of algorithms of the existing secure search scheme or the existing encryption scheme, the contents of the processing are a little different.

Thus, explanation will be given focusing on the difference from the processing flow described in the first embodiment.

Since Step S901 is the same as that of the first embodiment, description of it will be omitted.

In Step S2602, the grouping bit sequence generation unit 2301 generates a grouping bit sequence from the search keyword received in S901.

Since this processing is the same as that of Step S2404, description of it will be omitted.

In Step S2603, the search query generation unit 306 generates a search query by using the grouping bit sequence received in S2602 and the user secret key stored in the user secret key management unit 305.

Specifically, with respect to a user secret key for secure search, values have been set as the group name and the user name in the tag ID hierarchical structure, but no value has been set in the keyword section, and therefore, a user can set a value later.

Then, the search query generation unit 306 treats a secret key as a trapdoor, wherein the secret key is generated by performing a search query generation function (Delegate function) of the existing secure search scheme, based on input of a tag ID predicate vector generated by specifying a grouping bit sequence being a value to be set in the keyword section, and a user secret key for secure search.

This trap door is in the state where values are set in all the elements shown in the tag ID hierarchical structure.

This trap door will be treated as a search query.

The generated search query is sent to the data center apparatus 401.

At this time, user's own group name and user name are also transmitted.

In Step S904, the search processing unit 406 extracts the trap door from the search query received in S903, and acquires all the encrypted tags that serve as search candidates from index information.

Since acquisition processing of an encrypted tag in the index management unit 405 is complicated, it will be explained in detail with reference to FIG. 27.

Since Steps S1001 and S1002 are the same as those in the first embodiment, description of them will be omitted.

In Step S2703, the index management unit 405 decrypts each group determination key (for a search query) of L' group determination keys extracted in Step S801, by using a trap door.

Specifically, for example, since a group determination key (for a search query) corresponding to the first hierarchical layer is composed of (R, C), the index management unit 405 decrypts a ciphertext C by using a trapdoor. When the decryption result is the same as the random number R, the first information shall be 0, and when it is not the same, the first information shall be 1.

By performing the same procedure, the first information to the L'-th information are determined.

In Step S1004, the index management unit 405 specifies a corresponding node in the binary tree by using the procedure shown in Step S804, and sets up a pointer indicating "in process" at the specified node.

All the sets of an encrypted tag and a management number associated with the node pointed to by the pointer are extracted, and sent to the search processing unit 406.

Since Steps S1005, S1006, and S1007 are the same as those in the first embodiment, description of them will be omitted.

By the above, the processing of acquiring all the encrypted tags that serve as search candidates from the index information performed in Step S2604 is completed.

In Step S905, the search processing unit 406 extracts a tag from the encrypted tag acquired in S904, and determines whether the keyword included in the tag and the keyword included in the trap door extracted in S904 are identical with each other by using determination processing of the existing secure search technology.

Specifically, the search processing unit 406 decrypts a ciphertext C in a tag (R, C) by using a trap door. When the decryption result is the same as the random number R, it is determined that the keywords are identical, and when the decryption result is not the same as the random number R, it is determined that the keywords are not identical.

Since the determination processing of the existing secure search technology can compare only one tag and one trap door, this processing is performed for all the encrypted tags acquired in S904.

Then, a management number associated with an encrypted tag which is determined to be identical as a result of the determination processing is specified.

Since Steps S906 and S907 are the same as those of the first embodiment, description of them will be omitted.

By performing the steps described above, the access terminal apparatus 301 is able to receive a search keyword from a user, acquire encrypted data including the keyword from the data center apparatus 401, decrypt it and read it.

Figure 28:
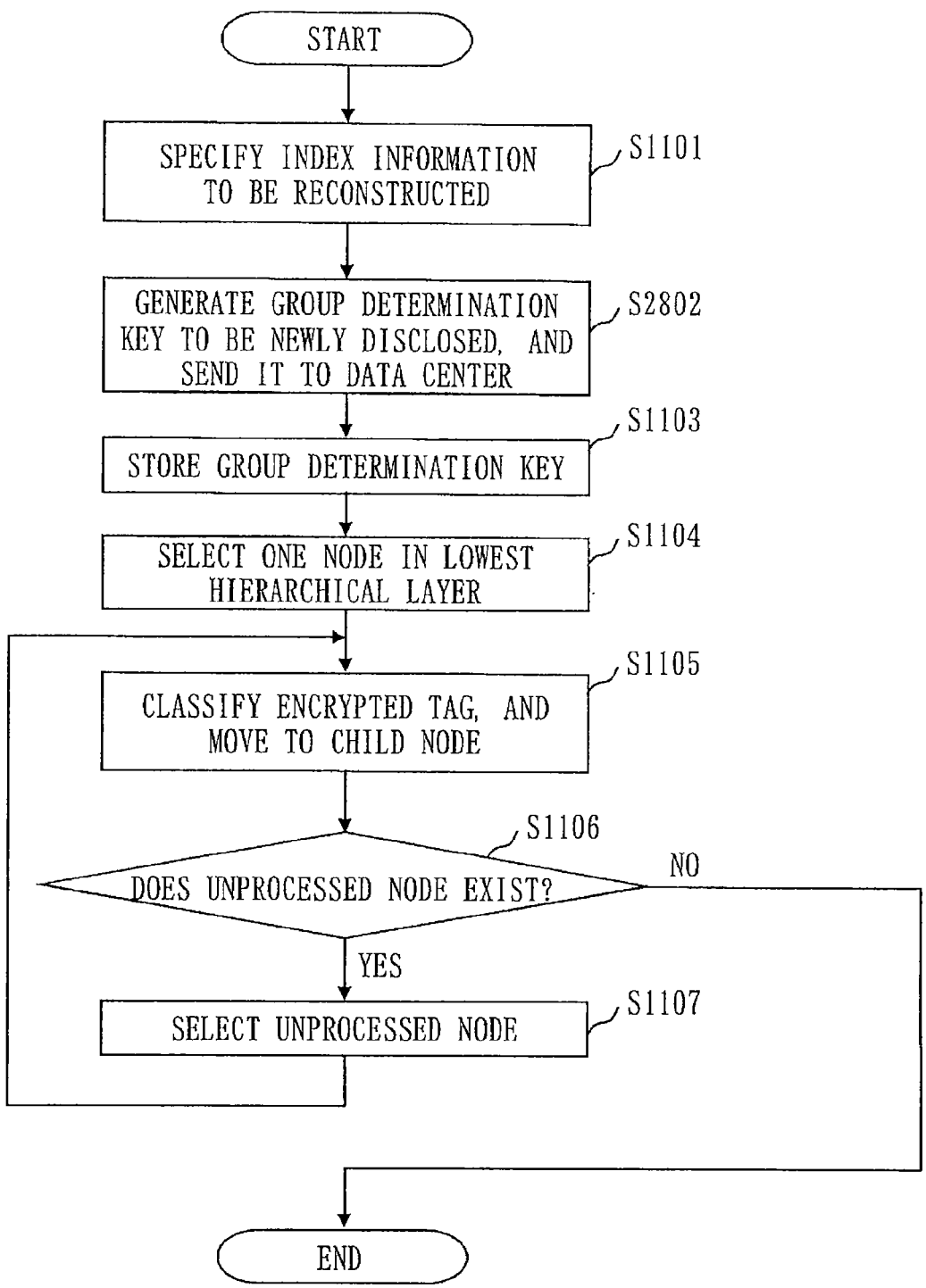
FIG. 28 is a flowchart showing an example of index reconstruction processing according to the second embodiment.

Next, based on FIG. 28, index reconstruction processing at the time of addition to the number of hierarchical layers of an index tree will be described.

Although the processing flow itself is similar to the method described in the first embodiment, due to difference of algorithms of the existing secure search scheme or the existing encryption scheme, the contents of the processing are a little different.

Thus, explanation will be given focusing on the difference from the processing flow described in the first embodiment.

Since Step 1101 is the same as that in the first embodiment, description of it will be omitted.

In Step S2802, the group determination key generation unit 308 extracts a user secret key for secure search, a public parameter, and the number of hierarchical layers of the group determination key having already been issued, from the user secret key management unit 305.

The group determination key generation unit 308 specifies the (L'+1)th hierarchical layer of the group determination key to be newly issued.

Next, the group determination key generation unit 308 specifies 0 (zero) as the (L'+1)th information in the grouping information of the tag ID hierarchical structure.

The group determination key generation unit 308 specifies wildcards as other information: from the first to the L'-th information, from the (L'+2) th to the L-th information, and keyword information.

For this tag ID hierarchical structure, the group determination key generation unit 308 generates a tag ID predicate vector by combining the group name and the user name embedded in a user secret key, and generates a tag ID attribute vector by combining the group name and the user name received in S1101.

The group determination key generation unit 308 generates a group determination key (for an encrypted tag) corresponding to the (L'+1) th hierarchical layer by performing a search query generation function (Delegate function) of the existing secure search scheme, based on input of the user secret key for secure search and the tag ID predicate vector generated above.

Furthermore, by the same procedure as Step S2405, the group determination key generation unit 308 generates a tag (R, C), based on input of the tag ID attribute vector generated above, and treats the tag (R, C) as a group determination key (for a search query).

The group determination key generation unit 308 combines the generated group determination key (for an encrypted tag) and group determination key (for a search query) in order to obtain a group determination key, and sends the group determination key to the data center apparatus 401, with the group name and user name associated with the index to be reconstructed.

Since Steps S1103 and S1104 are the same as those in the first embodiment, description of them will be omitted.

In Step S1105, the index management unit 405 extracts the encrypted tag and the management number associated with the L'-th hierarchical node selected in Step S1104 or S1107, and further extracts a tag from the encrypted tag.

The index management unit 405 acquires the (L'+1)th information to be relocated to the (L'+1)th hierarchical layer from the tag by the same procedure as Step S2503.

The index management unit 405 determines, based on the (L'+1)th information, a child node to which the encrypted tag and the management number are to be relocated, among child nodes of the selected L'-th hierarchical node, and stores the encrypted tag and the management number to be newly associated with the (L'+1)th hierarchical node after deleting the association with the L'-th hierarchical node.

This is performed for all the encrypted tags associated with the selected L'-th hierarchical layer.

Since Steps S1106 and S1107 are the same as those in the first embodiment, description of them will be omitted.

By performing the steps described above, the access terminal apparatus 301 newly generates a group determination key and requests the data center apparatus 401 to reconstruct index information, and the data center apparatus 401 reconstructs index information under its management, and increases the number of hierarchical layers of the index information by one layer.

As described above, as an encrypted tag includes grouping information which was generated from a keyword, and the data center apparatus 401 receives a group determination key from a user, it becomes possible to perform grouping of encrypted tags in accordance with the keyword by using the grouping information (for an encrypted tag).

When performing searching, since a group of encrypted tag of search target can be uniquely specified by using a search query and a group determination key (for a search query), it becomes unnecessary to perform determination processing of the existing secure search technology for all the encrypted tags, so that what is necessary is to perform the determination processing of the existing secure search technology for only encrypted tags belonging to a specific group. Thus, the time for performing secure search can be greatly reduced.

For example, in a situation where L' group determination keys are disclosed to the data center apparatus 401, since it is possible to divide M encrypted tags into $2^{L'}$ groups, $M/2^{L'}$ encrypted tags are averagely included in each group.

Therefore, search processing is accelerated to $2^{L'}$ times the speed according to the present Embodiment.

Information for grouping is set per bit in different elements of a tag ID hierarchical structure and encrypted, and a group determination key used for determining the information included in the tag ID hierarchical structure is disclosed by a user, so that the data center apparatus 401 can generate information used for grouping.

Therefore, the user can adjust the layer of grouping according to the number of group determination keys to be disclosed.

For example, in a situation where L' group determination keys are disclosed, let us assume that search time becomes time T as the number of stored encrypted data increases, and therefore, impediments occur in the operation.

Then, since encrypted tags can be divided into double groups by newly disclosing group determination keys corresponding to the (L'+1)th hierarchical layer, search time can be reduced to T/2.

In the meantime, in the world of cryptography algorithm development, that encrypted data cannot be grouped by a keyword included in the encrypted data is evaluated as being cryptography with high security.

Therefore, a user who would like to protect the confidentiality of data does not desire the data center apparatus 401 to unnecessarily perform grouping of encrypted data.

According to the present Embodiment, depending upon a user request layer for security and a response time in search processing, a user himself or herself can control to provide a minimum necessary group determination key only, to the data center apparatus 401.

Therefore, even when information of L bits has been added as grouping information, the balance between security and rapidity can be adjusted by the user, by adjusting the number of group determination keys to be disclosed.

Furthermore, since only a legitimate user who has a user secret key can adjust the number of group determination keys to be disclosed, it is possible to prevent fraud which lowers security, such as fraudulently generating or disclosing a group determination key by a third party.

Furthermore, it is configured such that the data center apparatus 401 generates the i-th information by using a group determination key (for an encrypted tag) and a group determination key (for a search query).

Therefore, even the value which is set as grouping information is not known by the data center apparatus 401. Accordingly, even if it is a hash value of a keyword, it is difficult to infer the keyword, thereby improving the security.

Furthermore, the scheme according to the present Embodiment is an extension scheme that improves search performance by including grouping information in a tag of the existing secure search based on inner-product predicate encryption.

Therefore, the system described in the present Embodiment can be applied not only to the existing secure search scheme described in the present Embodiment but also to various proposed existing secure search schemes to improve their search performance.

An example applied to the scheme of Non-Patent Literature 5 is described in the present Embodiment. Furthermore, the present Embodiment can be applied to the scheme of Non-Patent Literature 3, or to all other existing secure search schemes, such as other inner-product predicate encryption and a function encryption.

Furthermore, the system described in the present Embodiment is a high speed system not dependent on what is used as the existing secure search scheme.

Thus, it is also possible to use RSA (registered trademark) encryption, and the like which are generally used.

In the present Embodiment, there has been described a method of accelerating the secure search technology based on probabilistic encryption.

Generally, from a viewpoint of search time for secure search, the scheme based on deterministic encryption is faster, but however, it has a problem that a plain text is able to be inferred by analyzing frequency of appearance of encrypted data.

On the other hand, as to the scheme based on probabilistic encryption, since frequency of appearance of encrypted data has no relation to frequency of appearance of a keyword, it is safe against the inference of a plain text by analyzing frequency of appearance, but it has a problem that search processing takes a lot of time.

However, since the present Embodiment is based on probabilistic encryption, it has an advantage in that searching is performed at high speed, whereas security remains against the analysis by frequency of appearance.

Furthermore, it is configured such that encrypted data or indexes are generated and managed for each set of a group name and a user name.

Therefore, when a user performs searching, it is not necessary to perform searching of index information which includes encrypted data that the user is not allowed to read, thereby greatly improving the search processing.

The disclosure range of encrypted data is determined by a group name and a user name. Generally, it is expected that the number of encrypted data stored for each disclosure range may be different from each other.

In the present Embodiment, disclosure of a group determination key is performed for an index associated with a set of a group name and a user name.

Therefore, the balance between security and rapidity can be adjusted for each disclosure range.

When acquiring an encrypted tag to be a search target from index information, not only an encrypted tag associated with a node specified by using the i-th information generated from a search query with a group determination key, but also encrypted tags associated with all nodes higher order than the node are search targets.

Therefore, even if a search query is received while index information is being reconstructed after additionally receiving a group determination key, it is possible to perform checking without excluding the encrypted tag to be a search target.

Since a plurality of group names and user names are received when generating encrypted data, even if there are a plurality of users and groups as disclosure destinations, it is possible according to the present system to disclose encrypted data to a plurality of disclosure destinations and increase the search speed without depending on the number of disclosure destinations.

Since a keyword to be associated with encrypted data may be automatically extracted from a text, may be specified by a user, or may be generated by combining both of them, it is possible to add a keyword which would be specified at the time of searching, as intended by the user.

Furthermore, since a tag and grouping information are unified, an attack such as replacing grouping information does not occur, and therefore, it can be used safely.

Since it is configured such that high-speed common key encryption such as AES and Camellia (registered trademark) can be used when encrypting data, even if data has a large size, such as video data and music data, it is possible to perform encryption at high speed.

Since the key management server apparatus 201 has a user ID information database, even if a user does not know a group name or user name of a user who is able to decrypt encrypted data, a proper group name or user name can be acquired based on another information, such as an e-mail address known by the user. Therefore, it is possible to prevent a disclosure range of encrypted data from being set mistakenly.

Besides, it can help to generate an encrypted tag, for example.

(Non-Binary Tree Also Applicable)

In the present Embodiment, an example of configuring binary-tree-structured index information has been described.

However, there is no need to restrict to an index generated in a binary tree structure. As long as an index is generated from grouping information, it may be in a more general tree structure, or in a hash table structure.

Besides, it is not necessary to store a binary tree which is generated as index information in a disk while maintaining its structure. As shown as an example, it may be given an assigned node number and stored in a tabular form, or may be stored in other data format.

(No Need to Restrict Grouping Information to 1 Bit)

In the present Embodiment, the i-th bit of a bit sequence generated from a keyword is used as the i-th information.

However, it is not necessary to use bits one by one. The i-th information may be generated using information of two or more bits.

For example, it is also possible to generate a bit sequence of 2L bits from a keyword, and its (2i−1)th bit and 2i-th bit may be used as the i-th information.

(Information Used for Grouping Information)

In the present Embodiment, an example is described in which 1-bit information, such as 0 or 1, is included in the i-th information of grouping information.

However, it is sufficient if a left-side child node or a right-side child node of a binary tree is selected by using the information. Therefore, it does not necessarily need to be a value of 0 or 1.

For example, it may be 1 and −1, or alternatively, other value may be used.

Furthermore, an example is described in which, when generating a group determination key of the (L'+1)th hierarchical layer, 0 is specified as the (L'+1)th information.

However, it does not necessarily need to set 0, and it is also possible to set 1.

In the case of 1 or −1 being set as the i-th information, −1 or other value may be used.

When a tag is decrypted by using a group determination key (for an encrypted tag), or when a group determination key (for a search query) is decrypted by using a trap door, the i-th information is regarded as 0 if the decryption was performed correctly, and the i-th information is regarded as 1 if the decryption was not performed correctly.

However, this assignment of 0 or 1 may be reversed.

(Non-Hash Value Also Applicable)

In the present Embodiment, as it has been exemplified, a hash function such as SHA-2 is used when generating a bit sequence of L bits from a keyword. However, any algorithm is preferable as long as a bit sequence of L bits can be obtained from it.

For example, a hash function other than SHA-2 may be used, or alternatively, a keyed hash such as HMAC, common key encryption such as AES, or public key encryption such as RSA (registered trademark) encryption may also be used.

When using a keyed hash, common key encryption, or public key encryption, a hash key, a common key, or a secret key needs to be distributed in addition to a user secret key for secure search.

It is also possible to generate a random number of L bits by a pseudo random number generation algorithm, using a keyword as a seed of a random number.

In addition, a correspondence table between a keyword and an L-bit sequence may also be used.

Particularly, when using a correspondence table of an L-bit sequence, since generation frequency of the L-bit sequence can be equalized in consideration of appearance frequency of a keyword, it can be expected that security may be further improved.

(The Number of Group Determination Keys to be Disclosed)

In the present Embodiment, there is described an example based on an assumption that a user discloses a group determination key one by one. However, there is no need to restrict to one by one each time. Thus, it is also possible to disclose two or three group determination keys at a time.

(Time to Generate Group Determination Key)

In the present Embodiment, a group determination key is generated when a user reconstructs an index.

However, a group determination key may be generated at any time, as long as, prior to reconstruction of an index.

Furthermore, instead of by the user, a group determination key may be generated by the key management server apparatus 201 at the time of issuing a user secret key.

(No Restriction to the Number of ID Hierarchical Layers)

In the present Embodiment, there is described an example of specifying a user or a group being able to decrypt and search, by using two kinds of information, a group name and a user name, in the tag ID hierarchical structure, and the decrypter ID hierarchical structure.

However, there is no need to restrict to these two kinds. For example, three kinds, a department name, a division name, and a name may be used, or only a name may also be used.

It is also possible to flexibly specify a recipient because attribute of the recipient can be specified by using conditions, such as "AND" or "OR", in the inner-product predicate encryption.

(Arbitrary Vectorization Method)

In the present Embodiment, as a method of converting the tag ID hierarchical structure to a tag ID predicate vector or a tag ID attribute vector, there is described an example where the tag ID predicate vector should be (v1, v2)=(1, −"group name"), and the tag ID attribute vector should be (x1, x2)= ("group name", 1).

However, it is also possible to use (v1, v2)=(1, −"group name") and (x1, x2)=("group name", 1), for example, or other conversion method.

There is no restriction to the method of converting the tag ID hierarchical structure to a tag ID predicate vector or a tag ID attribute vector, and various methods generally known can be used.

The same can be applied to the decrypter ID hierarchical structure.

(No Need to Use ID in Common)

In the present Embodiment, there is described an example of setting the same value as a group name and setting the same value as a user name between the tag ID hierarchical structure and the decrypter ID hierarchical structure when generating tagged encrypted data.

However, it is also possible to set, not the same values, but different values.

For example, when intending to allow the user only to perform searching and not intending to allow him or her to decrypt encrypted data itself, the group name and the user name of the user should be set in the tag ID hierarchical structure, and the group name and the user name of another user who is able to decrypt should be set in the decrypter ID hierarchical structure.

(Hierarchization of Key Management Server Apparatus 201)

In the present Embodiment, an example of there being one key management server apparatus 201 is described, but, however, there is no need to restrict to one.

For example, in the scheme of Non-Patent Literature 5 or other secure search scheme, there exists a description that a key management server apparatus also has a hierarchical structure, and functions are separately operated by a plurality of apparatuses.

It is also possible that the key management server apparatus of the present Embodiment has a hierarchical structure to be utilized.

(Non-Inner-Production Predicate Encryption Also Applicable)

In the present Embodiment, there is described an example of using the existing secure search scheme and the existing encryption scheme based on inner-production predicate encryption.

However, there is no need to restrict to the scheme based on inner-production predicate encryption. Function encryption realizing similar features, common key encryption such as AES, Camellia (registered trademark) or HMAC, or public key encryption such as RSA (registered trademark) encryption can also be used.

(Public Parameter can be Used in Common)

In the present Embodiment, there is described an example of using inner-product predicate encryption described in Non-Patent Literature 5 for the existing secure search scheme or the existing encryption scheme, and using public parameters being different from each other.

However, it is also possible to use a part of information of a public parameter, such as an elliptic curve to be used, in common. Therefore, it is acceptable to standardize what can be standardized.

(The Number of Keywords)

In the present Embodiment, the case of using one search keyword is described. However, it does not necessarily need to restrict to one search keyword.

For example, in the case of there being a plurality of search keywords, it is also possible to generate a search query for each keyword and transmit all the search queries to the data center apparatus 401.

At that time, it is also possible to transmit arbitrary conditions, such as to acquire encrypted data which was determined to be "hit" by one search query or to acquire encrypted data which was "hit" by both the search queries A and B.

(No Need to Check Tags)

In the present Embodiment, all the encrypted tags acquired from the index management unit 405 are collated with search queries.

However, with respect to encrypted data that was determined to be "hit" in searching, it does not necessarily need to check encrypted tags associated with the encrypted data since afterwards. Besides in the case that returning ten results is sufficient as search results, if search results more than the specified number are found, it does not necessarily need to check the subsequent encrypted tags.

(Necessity or Unnecessity of User ID Information Database)

In the present Embodiment, a user ID information database is provided in the key management server apparatus 201, and a user secret key is generated based on the data therein.

However, the user ID information database is not indispensable. A user ID may be specified by the administrator of the key management server apparatus 201 when issuing a user secret key, or may be received from the access terminal apparatus 301.

(Assumption of "Access Terminal Apparatus 301=User", IC Card Usage)

The present Embodiment is described on the assumption that the access terminal apparatus 301 is operated by one user.

However, it is also possible to have a structure in which the access terminal apparatus 301 is not exclusively used by one user, but used by a plurality of persons.

In that case, since one user secret key is assigned to each user in the user secret key management unit 305, it is desirable to keep a plurality of user secret keys and to determine which user secret key should be used, after authenticating an operator by the access terminal apparatus 301.

Furthermore, it is also possible to store and manage a user secret key in an employee ID card, and the like.

In that case, the user secret key management unit 305 is a function equivalent to an IC card. However, in the case of performing all processing that uses a user secret key by an IC card, a part of processing of the search query generation unit 306, the data decryption unit 307, and the group determination key generation unit 308 may be performed by the IC card according to necessity.

(Encryption Scheme for Data Body)

In the present Embodiment, there is described an example of automatically using AES or Camellia (registered trademark) when encrypting data. The method to be used may be determined in advance in the system, or may be set by the user.

(Search Result Returning Method)

In the present Embodiment, there is described an example of returning all the encrypted data that was hit as a result of search. However, it does not necessarily need to return all the encrypted data once at the time of search.

For example, it is also possible to return some of hit encrypted data, or alternatively, return only the number or only the list of encrypted data.

(System Configuration Variation)

In the present Embodiment, there is described an example where the key management server apparatus 201 and the access terminal apparatus 301 are in a company and the data center apparatus 401 exists as an external service connected to the Internet, etc.

However, the present invention is not limited to such a system configuration.

For example, the data center apparatus 401 may be in a company, and the key management server apparatus 201 and the access terminal apparatus 301 may be connected to a network outside the company.

In the present Embodiment, unlike the first embodiment, it has been described that the grouping bit sequence generation unit 2301 (an index derive bit sequence, the concealing processing unit) of the access terminal apparatus 301 uses innerproduct predicate encryption.

In the present Embodiment, it has been described that the grouping bit sequence generation unit 2301 extracts a bit sequence of L bits, where the number L is the same as the maximum number of hierarchical layers of nodes of index information, from a hash value of a storage keyword, and treats the remaining bits of the hash value or the whole of the hash value as keyword information; and the encrypted tag generation unit 303 encrypts the bit sequence of L bits and the keyword information, treats the encrypted bit sequence of L bits and encrypted keyword information as an encrypted tag, and transmits the encrypted tag to the data center apparatus 401.

In other words, the grouping bit sequence generation unit 2301 generates a storage index derive bit sequence, whose number of bits is the same as the maximum number specified as allowed bit positions, from a bit sequence of random numbers uniquely obtained from a storage keyword, and treats the remaining bits of the random number bit sequence or the whole of the random number bit sequence as keyword information; and the encrypted tag generation unit 303 encrypts the storage index derive bit sequence and the keyword information, treats the encrypted storage index derive bit sequence and encrypted keyword information as tag data, and transmits the tag data to the data center apparatus 401 (data storage apparatus).

In the present Embodiment, it has been described that the grouping bit sequence generation unit 2301 extracts a bit sequence of L bits, where the number L is the same as the maximum number of hierarchical layers of nodes of index information, from a hash value of a search keyword, and treats the remaining bits of the hash value or the whole of the hash value as keyword information; and the encrypted tag generation unit 303 encrypts the bit sequence of L bits and the keyword information, treats the encrypted bit sequence of L bits and keyword information as a trapdoor, and transmits the trapdoor to the data center apparatus 401.

In other words, the grouping bit sequence generation unit 2301 generates a search index derive bit sequence, whose number of bits is the same as the maximum number specified as allowed bit positions, from a bit sequence of random numbers uniquely obtained from a search keyword, and treats the remaining bits of the random number bit sequence or the whole of the random number bit sequence as keyword information; and the encrypted tag generation unit 303 encrypts the search index derive bit sequence and the keyword information, treats the encrypted search index derive bit sequence and encrypted keyword information as an encrypted search keyword, and transmits the encrypted search keyword to the data center apparatus 401 (data storage apparatus).

In the present Embodiment, when receiving tagged encrypted data, the index management unit 405 of the data center apparatus 401 decrypts an encrypted tag with a group determination key. If the decryption was performed correctly, the bit value is specified as 0, and if the decryption was not performed correctly, the bit value is specified as 1. In such a way, L' bit values are derived to be node numbers.

In other words, when receiving a storage request, the index management unit 405 decrypts an encrypted bit at an allowed bit position in encrypted bits in tag data, with an allowed bit decryption key. If the decryption was performed correctly, the bit value is specified as 0, and if the decryption was not performed correctly, the bit value is specified as 1. In such a way, a bit value of each bit of a storage index value is derived based on a decryption result, and the storage index value is derived by combining each derived bit value.

In the present Embodiment, when receiving a search query, the index management unit 405 of the data center apparatus 401 decrypts a trapdoor with a group determination key. If the decryption was performed correctly, the bit value is specified as 0, and if the decryption was not performed correctly, the bit value is specified as 1. In such a way, L' bit values are derived to be node numbers.

In other words, when receiving a search request, the index management unit 405 decrypts an encrypted bit at an allowed bit position in encrypted bits in an encrypted search keyword, with an allowed bit decryption key. If the decryption was performed correctly, the bit value is specified as 0, and if the decryption was not performed correctly, the bit value is specified as 1. In such a way, a bit value of each bit of a search index value is derived based on a decryption result, and the search index value is derived by combining each derived bit value.

Lastly, an example of the hardware configuration of the key management server apparatus 201, the access terminal apparatus 301, and the data center apparatus 401 described in the first and second embodiments will be explained.

Figure 35:
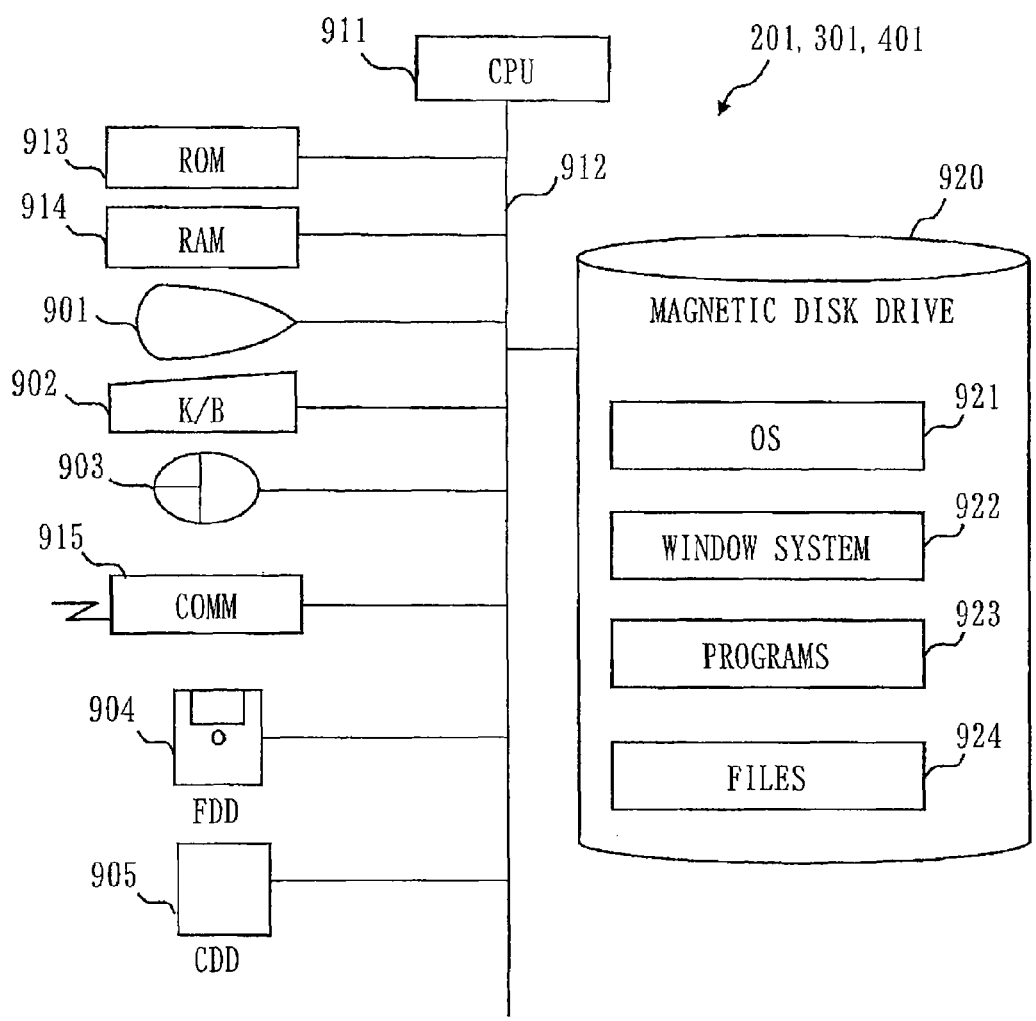
FIG. 35 shows a hardware configuration example of a key management server apparatus 201 and the like according to the first and second embodiments.

FIG. 35 shows an example of hardware resources of the key management server apparatus 201, the access terminal apparatus 301, and the data center apparatus 401 described in the first and second embodiments.

It should be noted that FIG. 35 shows merely an example of the hardware configuration of the key management server apparatus 201, the access terminal apparatus 301, and the data center apparatus 401. Therefore, the hardware configuration of the key management server apparatus 201, the access terminal apparatus 301, and the data center apparatus 401 is not limited to the one shown in FIG. 35, but other configuration may also be employed.

Furthermore, the key management server apparatus 201, the access terminal apparatus 301, and the data center apparatus 401 may also have different hardware configurations from each other.

As shown in FIG. 35, the key management server apparatus 201, the access terminal apparatus 301, and the data center apparatus 401 each include a CPU 911 (Central Processing Unit, and also referred to as a central processing device, a processing device, an arithmetic device, a microprocessor, a microcomputer, or a processor) to execute programs.

The CPU 911 is connected, for example, to a ROM (Read Only Memory) 913, a RAM (Random Access Memory) 914, a communication board 915, a display device 901, a keyboard 902, a mouse 903, and a magnetic disk drive 920, via a bus 912, and controls these hardware devices.

Furthermore, the CPU 911 may be connected to an FDD 904 (Flexible Disk Drive) and a CDD 905 (Compact Disk Drive).

In place of the magnetic disk drive 920, a storage device, such as an SSD (Solid State Drive), an optical disk device, or a memory card (registered trademark) read/write device may be used.

The RAM 914 is an example of a volatile memory. The storage media of the ROM 913, the FDD 904, the CDD 905, and the magnetic disk drive 920 are examples of nonvolatile memories. These are examples of storage devices.

For example, the key storage unit 203, the user ID information management unit 206, the user secret key management unit 305, the index management unit 405, and the encrypted data management unit 404 that are described in the first and second embodiments store various keys, index information, encrypted data, tag data, etc. in the RAM 914, the magnetic disk drive 920, or the like.

The communication board 915, the keyboard 902, the mouse 903, the FDD 904, and the like are examples of input devices.

The communication board 915, the display device 901, and the like are examples of output devices.

The communication board 915 is connected to the network as shown in FIG. 1.

For example, the communication board 915 may be connected not only to the in-house LAN (Local Area Network) and the Internet but also to a WAN (Wide Area Network), an SAN (Storage Area Network) and the like.

The magnetic disk drive 920 stores an operating system 921 (OS), a window system 922, programs 923, and files 924.

While utilizing the operating system 921 and the window system 922, the CPU 911 executes each program of the programs 923.

The RAM 914 temporarily stores at least a part of programs of the operating system 921 and application programs to be executed by the CPU 911.

The RAM 914 also stores various kinds of data needed for processing by the CPU 911.

The ROM 913 stores a BIOS (Basic Input/Output System) program. The magnetic disk drive 920 stores a boot program.

At the time of startup of the key management server apparatus 201, the access terminal apparatus 301, and the data center apparatus 401, the BIOS program in the ROM 913 and the boot program in the magnetic disk drive 920 are executed, so that the operating system 921 is started by the BIOS program and the boot program.

The programs 923 store programs for executing functions each described as a "--- unit" in the first and second embodiments. The programs are read and executed by the CPU 911.

As items of a "- file" or a "- database", the files 924 store information, data, signal values, variable values, and parameters that indicate results of processing described as "determination of -", "calculation of -", "comparison of -", "evaluation of -", "updating of -", "setting of -", "storage of -", "registration of -", "selection of -", "derivation of -", "generation of -", "extraction of -", "acquisition of -", "specification of -", "encryption of -", "decryption of -", "input of -", "output of -" and the like described in the first and second embodiments.

The "-file" and "-database" are stored in a storage medium, such as a disk or a memory.

Information, data, signal values, variable values, and parameters stored in the storage medium, such as a disk or a memory, are read into a main memory or a cache memory by the CPU 911 via a read/write circuit.

The read information, data, signal values, variable values, and parameters are used for operations of the CPU, such as extraction, search, reference, comparison, computation, calculation, processing, edit, output, print, display, and the like.

During the operations of the CPU, such as extraction, search, reference, comparison, computation, calculation, processing, edit, output, print, or display, the information, data, signal values, variable values, and parameters are temporarily stored in the main memory, a register, the cache memory, a buffer memory, or the like.

The arrows in the flowcharts explained in the first and second embodiments mainly indicate input/output of data or signals.

Data and signal values are recorded in a memory of the RAM 914, a flexible disk of the FDD 904, a compact disk of the CDD 905, a magnetic disk of the magnetic disk drive 920, or other recording medium, such as an optical disk, a mini disk, or a DVD.

The data and signals are transmitted online through the bus 912, a signal line, a cable, or other transmission medium.

What is described as a "-unit" in the explanation of the first and second embodiments may be a "-circuit", a "-device", or "-equipment", or alternatively, may be a "-step", a "-procedure", or "-processing."

That is, it is possible to comprehend each of the data processing apparatus and the data storage apparatus as a method, according to the steps, procedures, and processing described in the flowcharts explained in the first and second embodiments.

What is described as a "-unit" may be implemented by firmware stored in the ROM 913.

Alternatively, it may be implemented by software alone or by hardware alone, such as an element, a device, a substrate, or a wiring line, or alternatively, implemented by a combination of software and hardware, or further by a combination of software, hardware, and firmware.

Firmware and software are stored, as programs, in a recording medium, such as a magnetic disk, a flexible disk, an optical disk, a compact disk, a mini disk, and a DVD.

The programs are read and executed by the CPU 911.

That is, each program causes a computer to function as a "-unit" described in the first and second embodiments. Alternatively, each program causes a computer to execute the procedure and method of a "-unit" described in the first and second embodiments.

Thus, each of the key management server apparatus 201, the access terminal apparatus 301, and the data center apparatus 401 described in the first and second embodiments is a computer including a CPU being a processing device; a memory, magnetic disk, or the like being a storage device; a keyboard, mouse, communication board, or the like being an input device; and a display device, communication board, or the like being an output device.

As described above, functions indicated as "-units" are implemented by using these processing device, storage device, input device, and output device.

REFERENCE SIGNS LIST

| | |
|---|---|
| 201: key management server apparatus | 202: master key generation unit |
| 203: key storage unit | 204: user secret key generation unit |
| 205: PKG-side data transmission/reception unit | |
| 206: user ID information management unit | |
| 301: access terminal apparatus | 302: data encryption unit |
| 303: encrypted tag generation unit | 304: tagged encrypted data generation unit |
| 305: user secret key management unit | 306: search query generation unit |
| 307: data decryption unit | |
| 308: group determination key generation unit | |
| 309: terminal-side data transmission/reception unit | |
| 310: grouping information generation unit | 401: data center apparatus |
| 402: center-side data transmission/reception unit | |
| 403: storage request processing unit | 404: encrypted data management unit |
| 405: index management unit | 406: search processing unit |
| 2301: grouping bit sequence generation unit | |

The invention claimed is:

1. A data processing apparatus connected to a data storage apparatus that stores a plurality of encrypted data and tag data being related to each of the plurality of encrypted data and being collated when the plurality of encrypted data are searched, the data processing apparatus comprising:
  circuitry configured to:
    specify a keyword of storage target data being a target to be stored in the data storage apparatus, as a storage keyword;
    specify a bit position where disclosure of a bit value to the data storage apparatus is allowed, as an allowed bit position;
    generate a bit sequence from the storage keyword by performing a generation procedure, as a storage index derive bit sequence;
    perform concealing processing to disclose the bit value at the allowed bit position in the storage index derive bit sequence to the data storage apparatus, and to conceal bit values at other than the allowed bit position in the storage index derive bit sequence from the data storage apparatus, and cause the data storage apparatus to derive a storage index value, which is to be attached to the tag data by the data storage apparatus when the tag data to be related to encrypted data of the storage target data is stored, from the bit value disclosed at the allowed bit position in the storage index derive bit sequence;
    generate, for the respective allowed bit positions, a decryption key used for decrypting an encrypted bit at the allowed bit position, as an allowed bit decryption key;
    transmit the allowed bit decryption key to the data storage apparatus;
    encrypt the storage index derive bit sequence by an encryption scheme in which the encrypted bit at the allowed bit position is decrypted with the allowed bit decryption key and encrypted bits at other than the allowed bit position are not decrypted with the allowed bit decryption key; and
    transmit a storage request including the encrypted data of the storage target data, the tag data to be related to the encrypted data of the storage target data, and an encrypted storage index derive bit sequence to the data storage apparatus.

2. The data processing apparatus according to claim 1, wherein the data processing apparatus is connected to the data storage apparatus that specifies tag data to be collated with an encrypted search keyword, when receiving a search request including the encrypted search keyword and a search index derive bit sequence from which an index value of the tag data to be collated with the encrypted search keyword is derived by disclosure of the bit value at the bit position where disclosure is allowed, based on the index value acquired by disclosure of a bit value in the search index derive bit sequence, and that performs searching of the plurality of encrypted data by collating specified tag data with the encrypted search keyword, and
  the circuitry is further configured to generate the storage index derive bit sequence from which the storage index value to be compared with the index value acquired from the search index derive bit sequence in the data storage apparatus is derived by disclosure of the bit value at the allowed bit position to the data storage apparatus.

3. The data processing apparatus according to claim 1, wherein the circuitry is further configured to:
  specify a new allowed bit position sequentially, and
  perform the concealing processing and increase a number of bits of the storage index value when the new allowed bit position is specified, the concealing processing disclosing a bit value at the new allowed bit position newly specified to the data storage apparatus in addition to the bit value at the allowed bit position currently existing in the storage index derive bit sequence.

4. The data processing apparatus according to claim 1, wherein the circuitry is further configured to:
  generate a decryption key to which user information on a user who is allowed to access the storage target data is reflected, as the allowed bit decryption key, and
  encrypt the storage index derive bit sequence by using an encryption key to which the user information on the user who is allowed to access the storage target data is reflected.

5. The data processing apparatus according to claim 1, wherein the circuitry is further configured to:
  specify a new allowed bit position sequentially,
  generate, when the new allowed bit position is specified, a new allowed bit decryption key used for decrypting an encrypted bit at the new allowed bit position specified, and
  transmit the generated new allowed bit decryption key to the data storage apparatus.

6. The data processing apparatus according to claim 5, wherein the data processing apparatus is connected to the data storage apparatus that specifies tag data to be collated with an encrypted search keyword, and performs searching of the plurality of encrypted data by collating specified tag data with the encrypted search keyword, the circuitry is further configured to:
specify a search keyword which causes the data storage apparatus to perform searching of the plurality of encrypted data,
generate a bit sequence from the specified search keyword based on a same generation procedure as that of the storage index derive bit sequence, as a search index derive bit sequence,
encrypt the search index derive bit sequence by the encryption scheme in which the encrypted bit at the allowed bit position, where disclosure of the bit value to the data storage apparatus is allowed, is decrypted with the allowed bit decryption key held by the data storage apparatus, and the encrypted bits at other than the allowed bit position are not decrypted with the allowed bit decryption key,
cause the data storage apparatus to derive a search index value, which is to be compared with the storage index value by the data storage apparatus when extracting the tag data to be collated with the encrypted search keyword, from the bit value at the allowed bit position which is to be disclosed to the data storage apparatus by decrypting the encrypted bit at the allowed bit position in an encrypted search index derive bit sequence, and
transmit a search request including the encrypted search keyword and the encrypted search index derive bit sequence to the data storage apparatus.

7. The data processing apparatus according to claim 6, wherein the circuitry is further configured to encrypt the search index derive bit sequence with an encryption key to which user information on a user of the data processing apparatus is reflected.

8. A data storage apparatus that is connected to a data processing apparatus and stores encrypted data transmitted from the data processing apparatus, the data storage apparatus comprising:
circuitry configured to:
store, for respective allowed bit positions where decryption is allowed, an allowed bit decryption key used for decrypting an encrypted bit at an allowed bit position;
receive a storage request including encrypted data of storage target, tag data to be collated when the encrypted data is searched, and an encrypted bit sequence generated using a storage keyword specified for the encrypted data of storage target from the data processing apparatus;
store the encrypted data of storage target included in the storage request, relating the encrypted data of storage target to the tag data;
decrypt the encrypted bit at the allowed bit position in the encrypted bit sequence included in the storage request with the allowed bit decryption key;
derive an index value from a bit value obtained by decryption; and
store the index value derived and the tag data included in the storage request, relating the index value and the tag data to each other.

9. The data storage apparatus according to claim 8, wherein the circuitry is further configured to:
store the allowed bit decryption key, relating the allowed bit decryption key to user information,
receive the storage request including user information on a user who is allowed to access the encrypted data of storage target, and
decrypt the encrypted bit at the allowed bit position in the encrypted bit sequence included in the storage request, with the allowed bit decryption key corresponding to user information which is identical to the user information included in the storage request, and
derive an index value.

10. The data storage apparatus according to claim 9, wherein the circuitry is further configured to:
store the allowed bit decryption key to which user information is reflected, relating the allowed bit decryption key to the user information, and
receive the storage request including the encrypted bit sequence encrypted with an encryption key to which the user information on the user who is allowed to access the encrypted data of storage target is reflected.

11. The data storage apparatus according to claim 9, wherein the circuitry is further configured to:
derive an index value by combining bit values acquired by decrypting the encrypted bit sequence included in the storage request,
store the index value derived, the tag data included in the storage request, and undecrypted bits in the encrypted bit sequence, relating the index value, the tag data and the undecrypted bits to the user information included in the storage request,
acquire, when a new allowed bit position is specified, a new allowed bit decryption key to be used for decrypting an encrypted bit at the new allowed bit position, and user information related to the new allowed bit decryption key,
extract encrypted bits related to user information identical to the acquired user information,
decrypt an encrypted bit related to the new allowed bit position in extracted encrypted bits with the new allowed bit decryption key, and
derive a new index value by adding a bit value obtained by decryption to an index value corresponding to common user information.

12. The data storage apparatus according to claim 9, wherein
the data storage apparatus is connected to a plurality of data processing apparatuses, and
the circuitry is further configured to:
receive, from a search request data processing apparatus that requests to search the encrypted data in the plurality of data processing apparatuses, a search request including an encrypted search keyword, an encrypted bit sequence generated by using a search keyword before being encrypted, and user information on a user of the search request data processing apparatus,
decrypt the encrypted bit at the allowed bit position in the encrypted bit sequence included in the search request by using the allowed bit decryption key related to user information identical to the user information included in the search request,
derive an index value from a bit value at the allowed bit position obtained by decryption,
extract tag data related to a same index value as the index value derived,
collate the extracted tag data with the encrypted search keyword included in the search request,
specify tag data generated from a same keyword as the search keyword in the extracted tag data, and
acquire encrypted data related to the specified tag data.

13. The data storage apparatus according to claim 12, wherein the circuitry is further configured to:
store the allowed bit decryption key, to which user information is reflected, relating the allowed bit decryption key to the user information, and receive the search request including the bit sequence encrypted with an encryption key to which the user information on the user of the search request data processing apparatus is reflected.

14. The data storage apparatus according to claim 12, wherein the circuitry is further configured to:
store the index value derived and the tag data included in the storage request, relating the index value and the tag data to the user information included in the storage request, and when the search request is received,
decrypt the encrypted bit at the allowed bit position in the encrypted bit sequence included in the search request by using the allowed bit decryption key related to user information identical to the user information included in the search request,
derive an index value from the bit value at the allowed bit position obtained by decryption, and
extract tag data related to the same index value as the index value derived, from tag data related to user information identical to the user information included in the search request.

\* \* \* \* \*